US011089147B2

(12) United States Patent
Reyes et al.

(10) Patent No.: US 11,089,147 B2
(45) Date of Patent: Aug. 10, 2021

(54) SYSTEMS, DEVICES, AND METHODS FOR GENERATING MESSAGES

(71) Applicant: GOOGLE LLC, Mountain View, CA (US)

(72) Inventors: Gabriel Reyes, Dexter, MI (US); Lee Payne, Waterloo (CA); Samarth Singhal, Kitchener (CA); Sushant Kulkarni, Kitchener (CA); Angela Krone, Mississauga (CA); Samuel Legge, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/456,455

(22) Filed: Jun. 28, 2019

(65) Prior Publication Data

US 2020/0007672 A1 Jan. 2, 2020

Related U.S. Application Data

(60) Provisional application No. 62/692,484, filed on Jun. 29, 2018.

(51) Int. Cl.
*H04M 1/72436* (2021.01)
*H04M 1/60* (2006.01)
*G02B 27/01* (2006.01)
*H04M 1/72451* (2021.01)
*H04M 1/72454* (2021.01)
*H04M 1/72463* (2021.01)
*H04L 12/58* (2006.01)

(52) U.S. Cl.
CPC .... *H04M 1/72436* (2021.01); *G02B 27/0172* (2013.01); *H04L 51/00* (2013.01); *H04M 1/6066* (2013.01); *H04M 1/72451* (2021.01); *H04M 1/72454* (2021.01); *H04M 1/72463* (2021.01); *G02B 2027/014* (2013.01); *G02B 2027/0141* (2013.01)

(58) Field of Classification Search
CPC .......... H04M 1/6066; H04M 1/72563–72577; G02B 27/017–2027/0178
See application file for complete search history.

(56) References Cited

U.S. PATENT DOCUMENTS

| 8,169,409 | B2* | 5/2012 | Castagnet | ......... H04M 1/72436 345/171 |
| 9,922,646 | B1* | 3/2018 | Blanksteen | ............. G06F 3/167 |
| 10,387,461 | B2* | 8/2019 | Sharifi | ..................... H04L 51/22 |
| 10,547,574 | B2* | 1/2020 | Pham | ..................... G06F 40/56 |
| 2006/0119583 | A1* | 6/2006 | Potera | ............... H04M 1/72436 345/171 |

(Continued)

*Primary Examiner* — Gennadiy Tsvey

(57) ABSTRACT

Systems, devices, and methods for generating and sending messages are described. messages are autonomously generated by at least one processor by identifying environmental context of a device, system, or user, such that minimal input is required from the user. Environmental context can include at least time, date, calendar entries, user activity, location, physical environment, message history, and relationship between users. Messages can also be generated by generating a first portion of a message, and having the user select a second portion to complete the message. Recipients for a message can be autonomously determined based on environmental context and content of a message to be sent.

13 Claims, 34 Drawing Sheets

(56) References Cited

U.S. PATENT DOCUMENTS

| | | | | |
|---|---|---|---|---|
| 2007/0135145 | A1* | 6/2007 | Lee | H04M 1/72436 455/466 |
| 2008/0077675 | A1* | 3/2008 | Graef | G06Q 10/107 709/206 |
| 2008/0126077 | A1* | 5/2008 | Thorn | G06F 40/263 704/8 |
| 2009/0111486 | A1* | 4/2009 | Burstrom | H04M 1/72457 455/456.3 |
| 2010/0100371 | A1* | 4/2010 | Yuezhong | G06F 40/56 704/9 |
| 2011/0197145 | A1* | 8/2011 | Huang | G06Q 10/107 715/752 |
| 2011/0302249 | A1* | 12/2011 | Orr | G06Q 10/107 709/206 |
| 2013/0185051 | A1* | 7/2013 | Buryak | G06F 40/58 704/2 |
| 2013/0212190 | A1* | 8/2013 | Patil | G06N 5/04 709/206 |
| 2014/0004889 | A1* | 1/2014 | Davis | H04W 4/12 455/466 |
| 2014/0035823 | A1* | 2/2014 | Khoe | G06F 3/0237 345/171 |
| 2014/0039874 | A1* | 2/2014 | Pelosi | H04M 1/72436 704/8 |
| 2014/0145962 | A1* | 5/2014 | Radhakrishnan | H04W 4/029 345/171 |
| 2015/0072658 | A1* | 3/2015 | Panttaja | H04W 4/12 455/412.2 |
| 2015/0334529 | A1* | 11/2015 | Jain | H04W 4/025 455/456.6 |
| 2016/0050535 | A1* | 2/2016 | Mansfield | H04W 4/12 455/456.3 |
| 2016/0313797 | A1* | 10/2016 | Daguet | G06F 3/044 |
| 2016/0357761 | A1* | 12/2016 | Siracusa | H04M 1/72569 |
| 2017/0005960 | A1* | 1/2017 | Volach | H04L 51/066 |
| 2017/0063741 | A1* | 3/2017 | Shivashankaraiah | H04M 15/00 |
| 2017/0195272 | A1* | 7/2017 | Weksler | H04M 1/2746 |
| 2018/0032585 | A1* | 2/2018 | Kadiyala | H04M 1/72448 |
| 2018/0063044 | A1* | 3/2018 | Mikhailov | H04L 67/22 |
| 2018/0097926 | A1* | 4/2018 | Osman | G06F 9/454 |
| 2018/0136794 | A1* | 5/2018 | Cassidy | G06F 3/04817 |
| 2018/0225279 | A1* | 8/2018 | Cruz Huertas | G06F 40/289 |
| 2018/0278553 | A1* | 9/2018 | Yu | G06F 40/56 |
| 2019/0227822 | A1* | 7/2019 | Azmoon | G06F 40/35 |

* cited by examiner

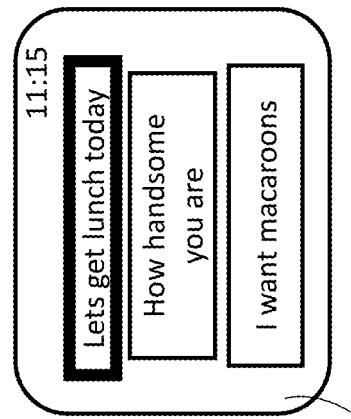
Figure 10C
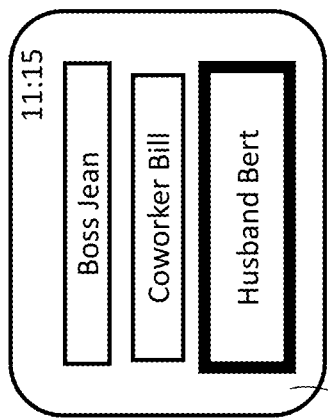
Figure 10B
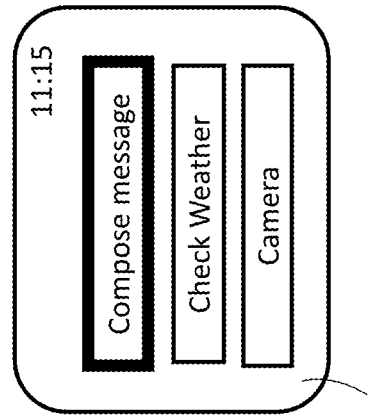
Figure 10A

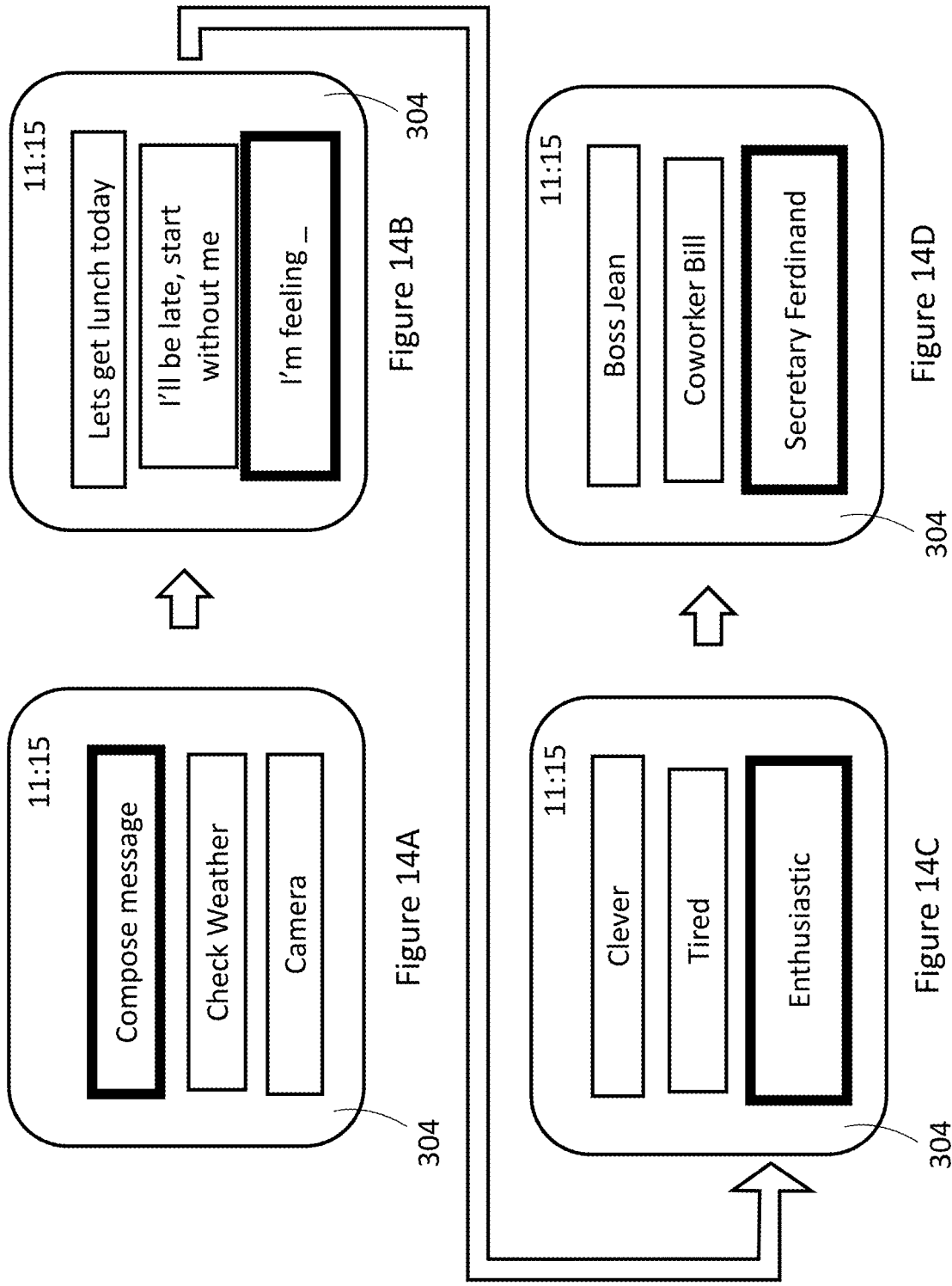

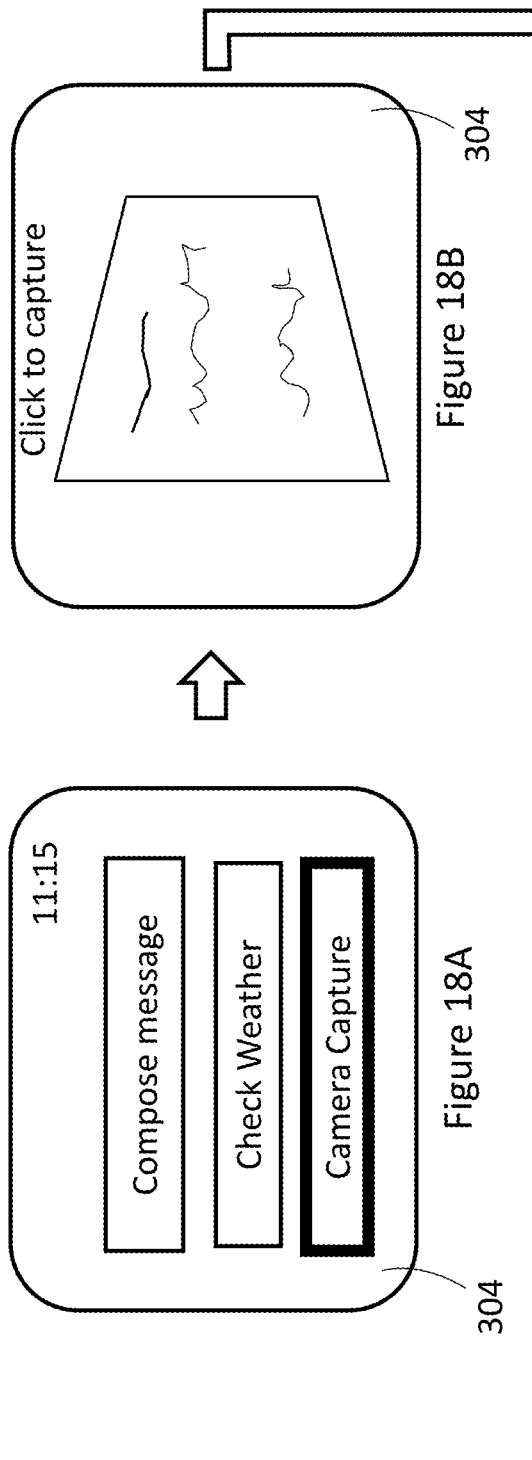

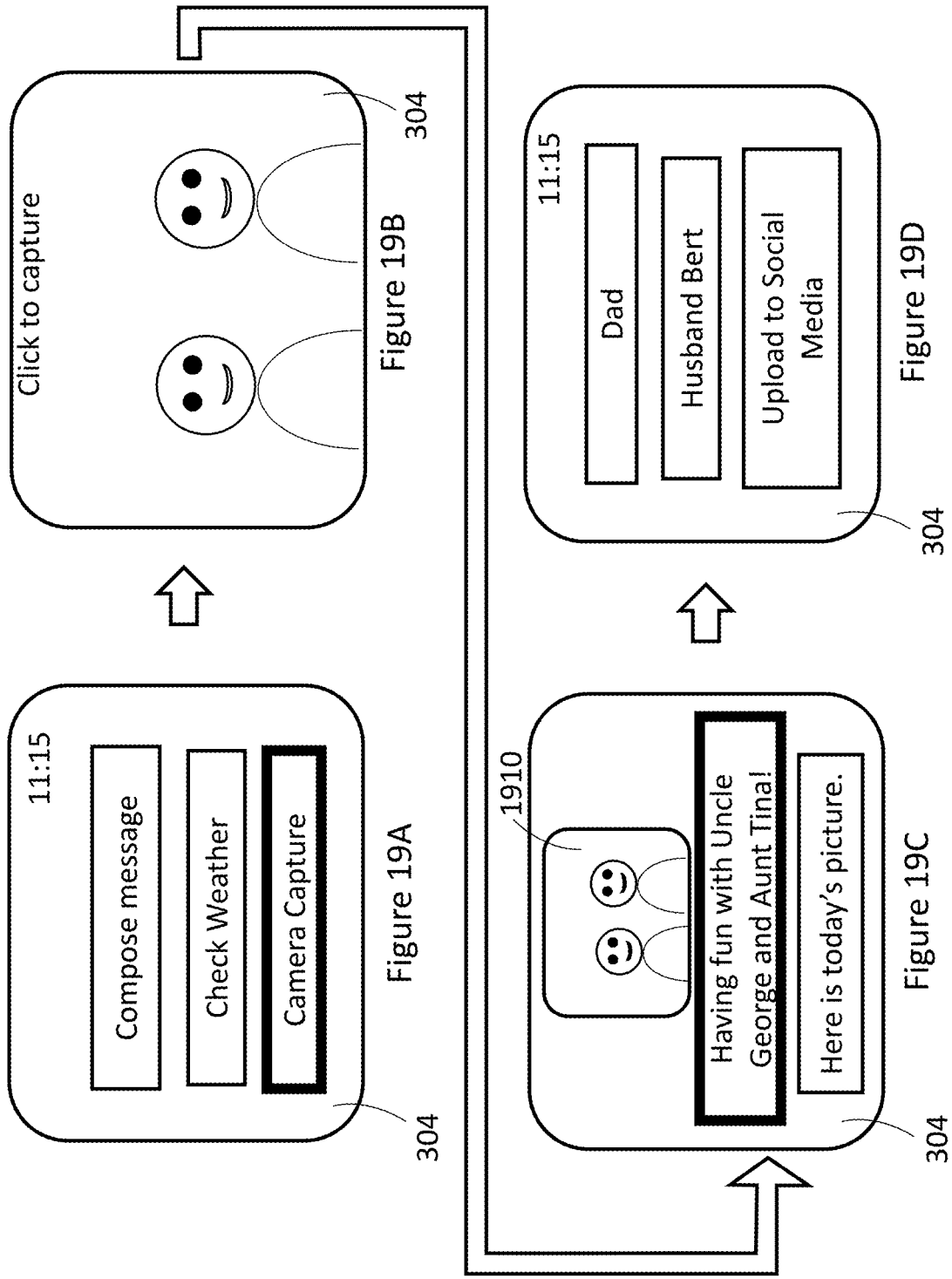

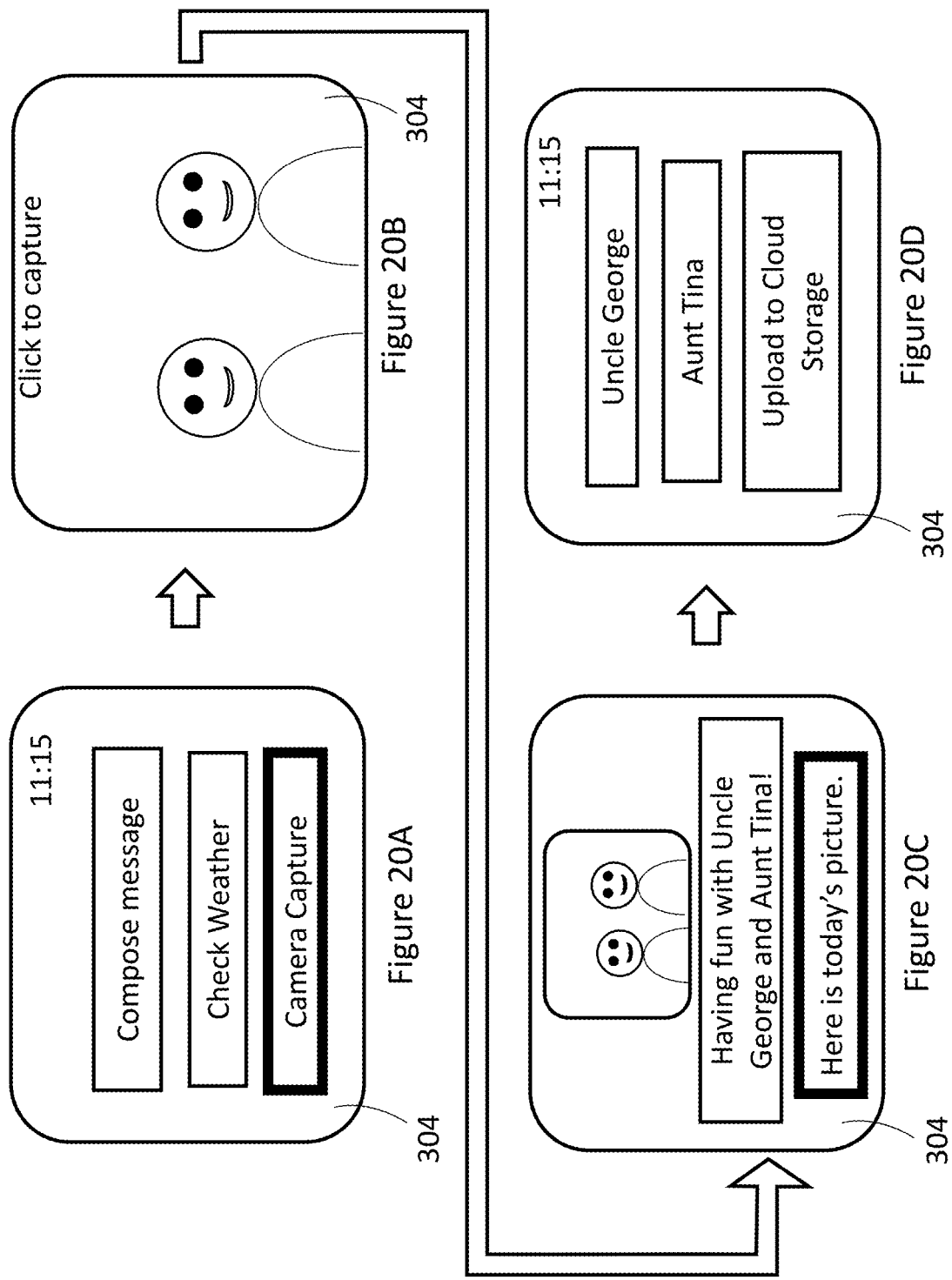

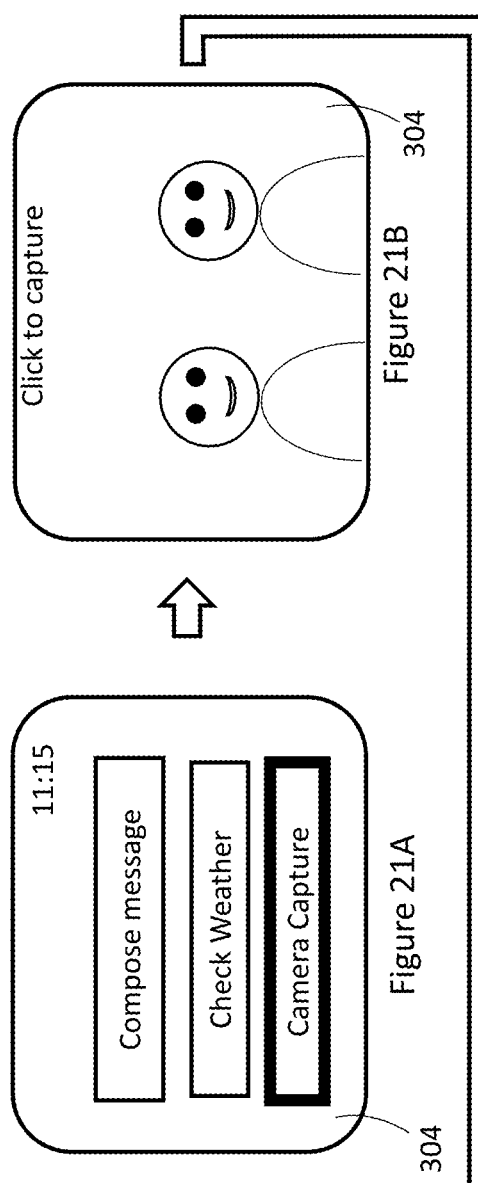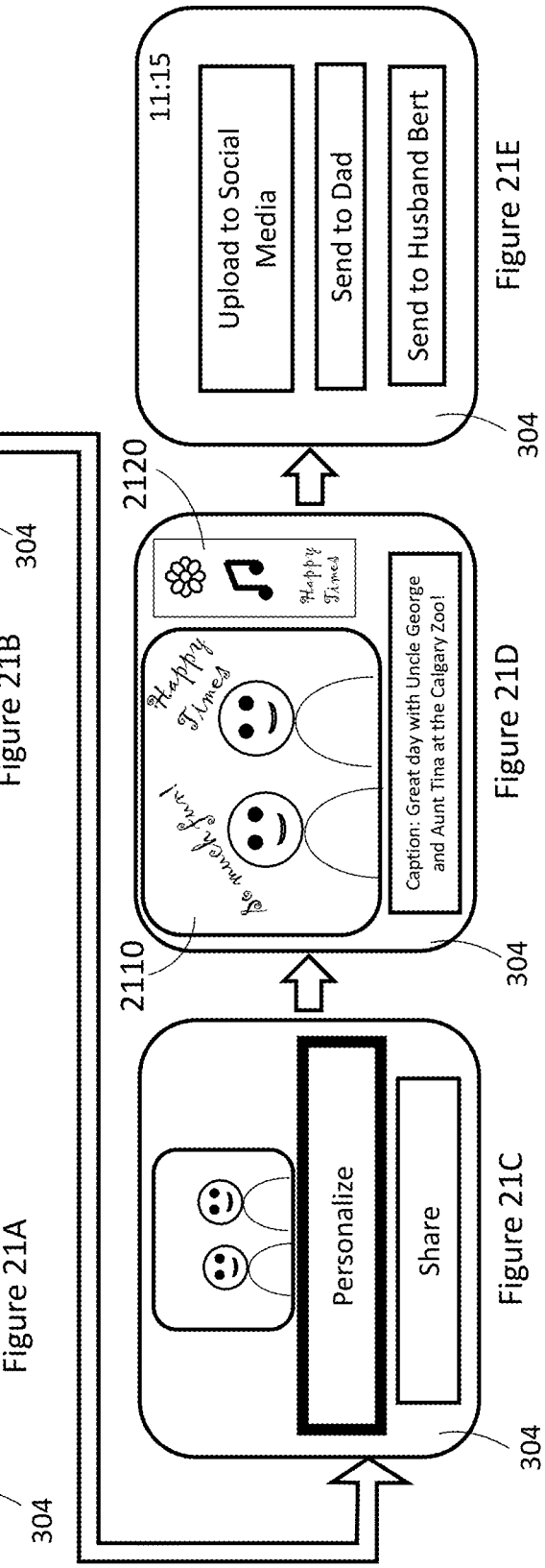

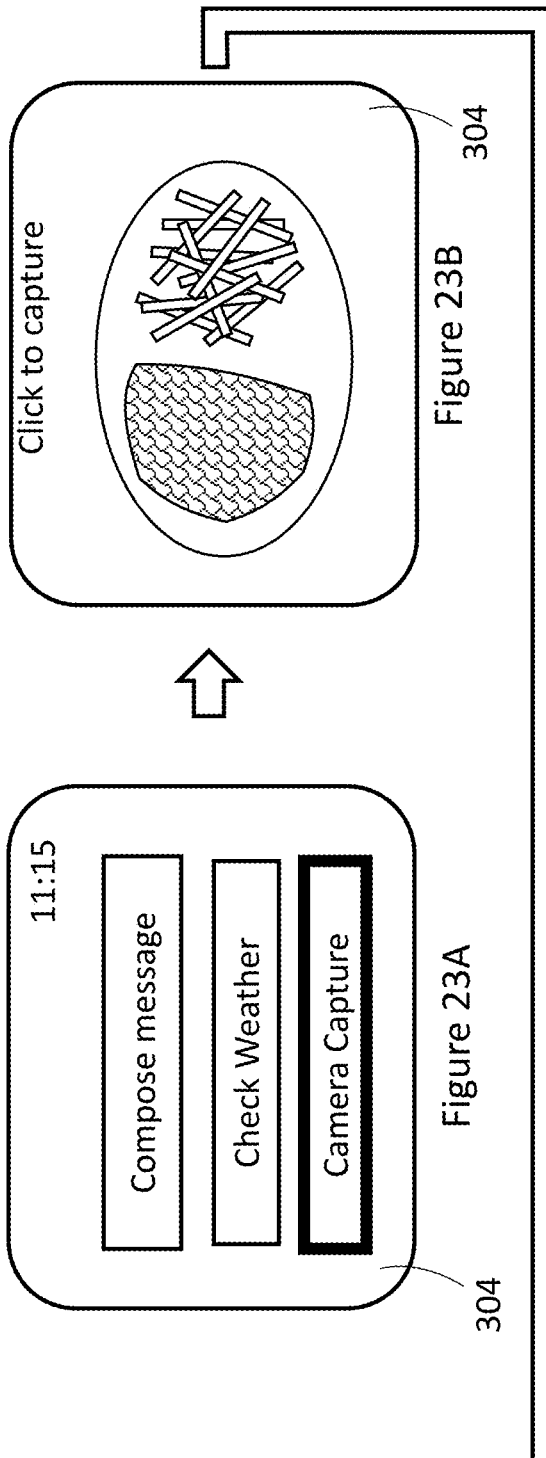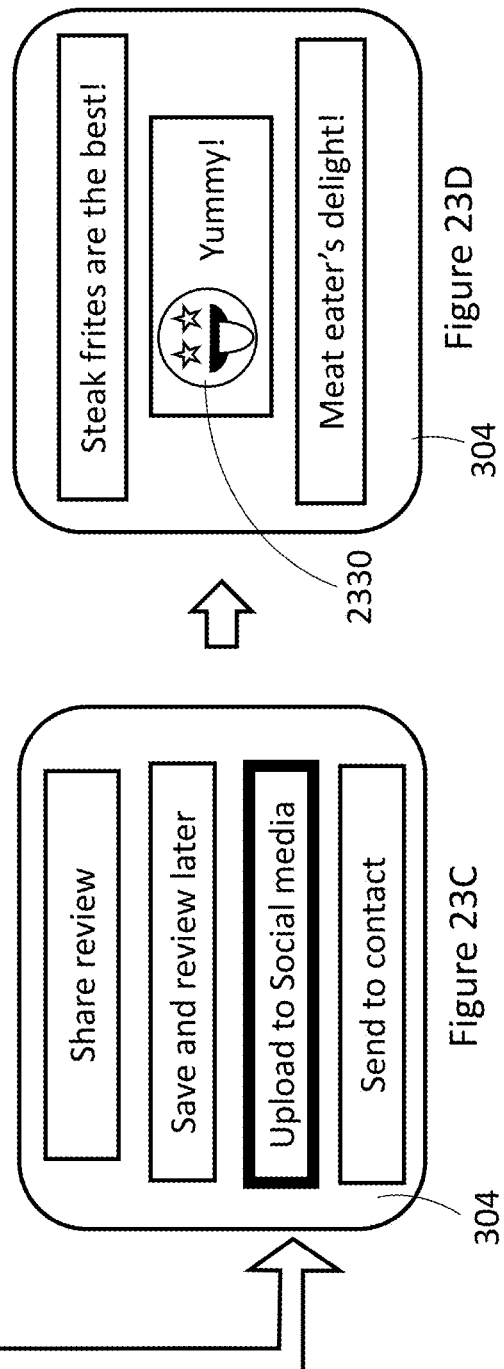
Figure 23A
Figure 23B
Figure 23C
Figure 23D

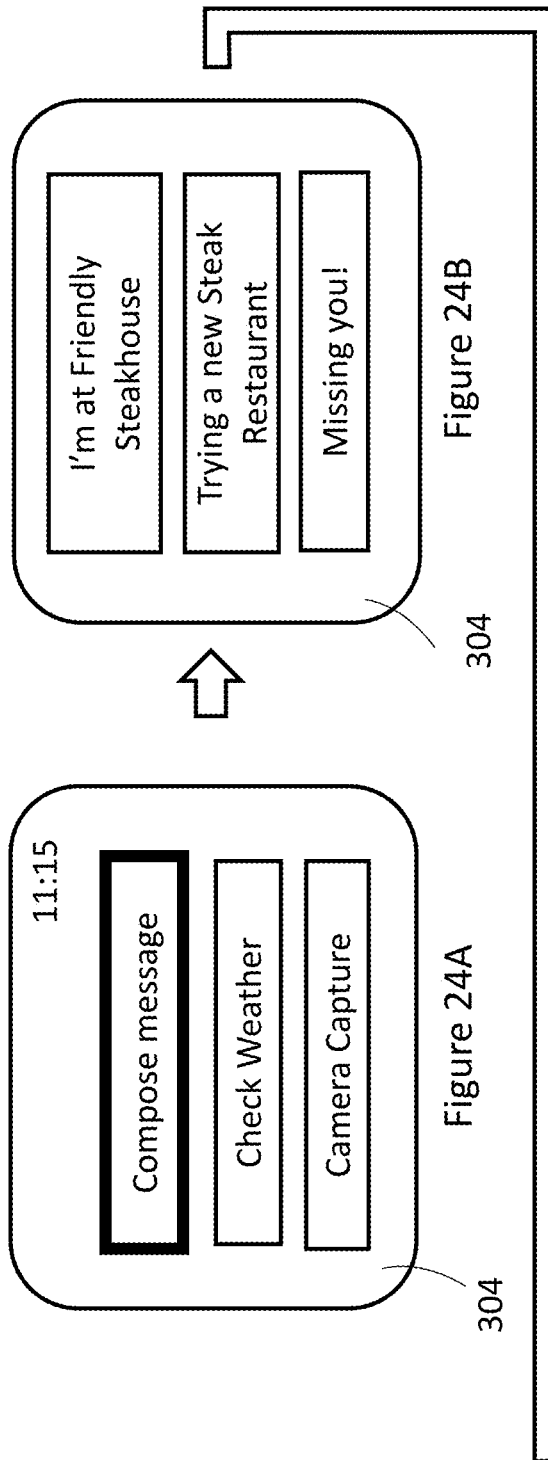
Figure 24A
Figure 24B
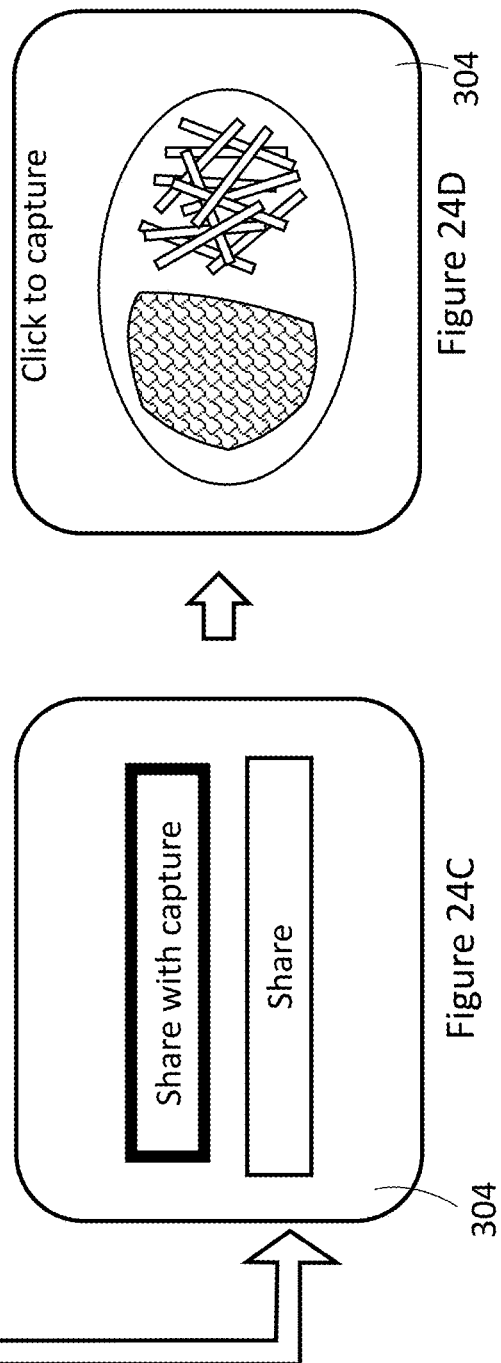
Figure 24D
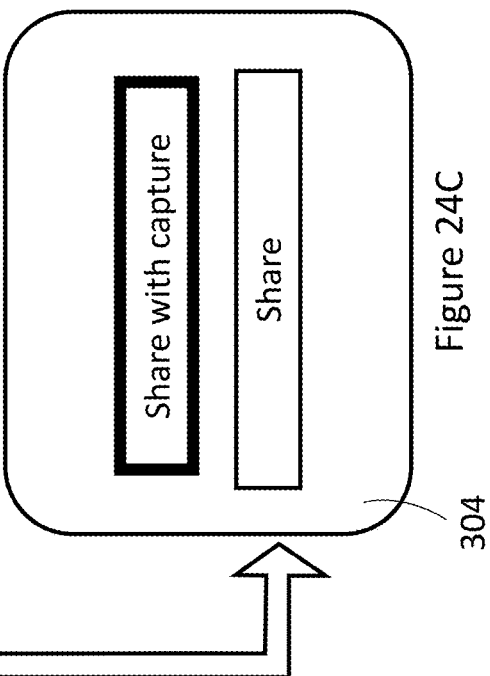
Figure 24C

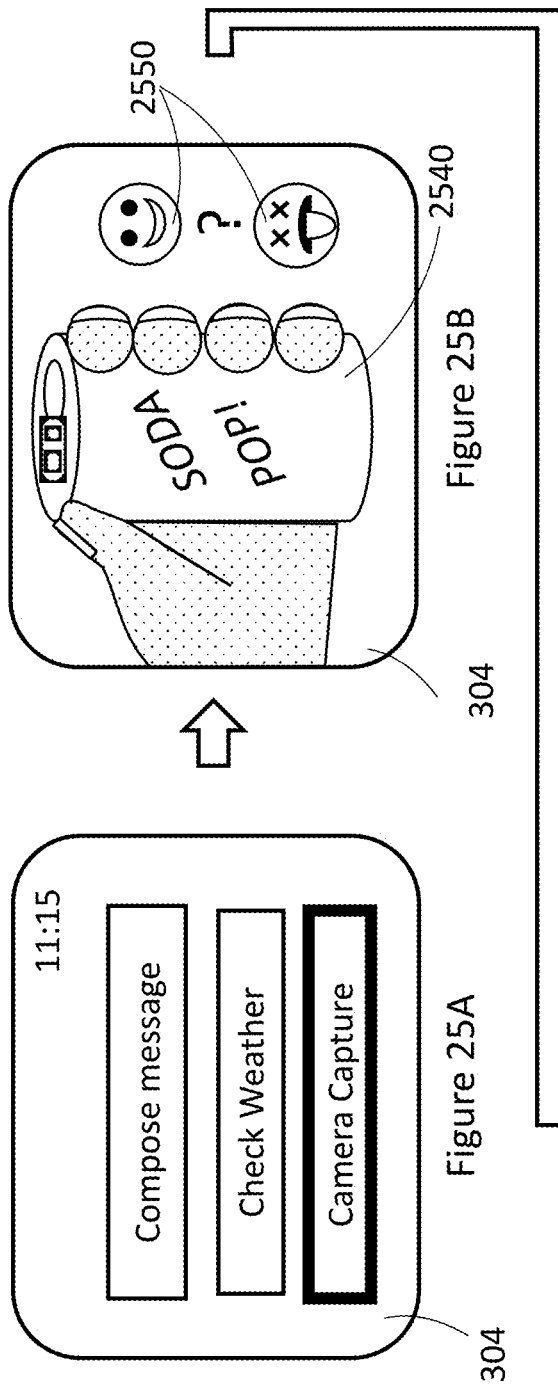
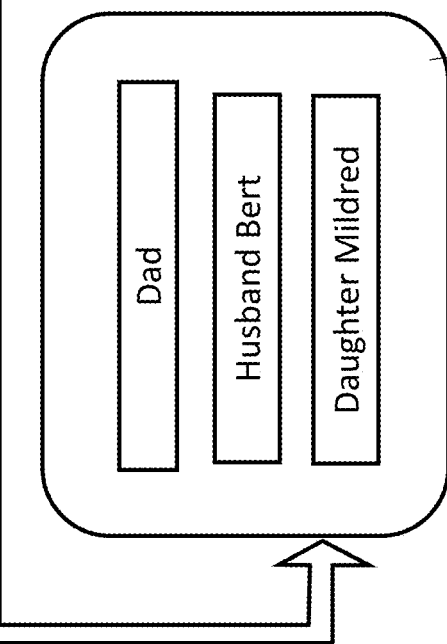
Figure 25A
Figure 25B
Figure 25C

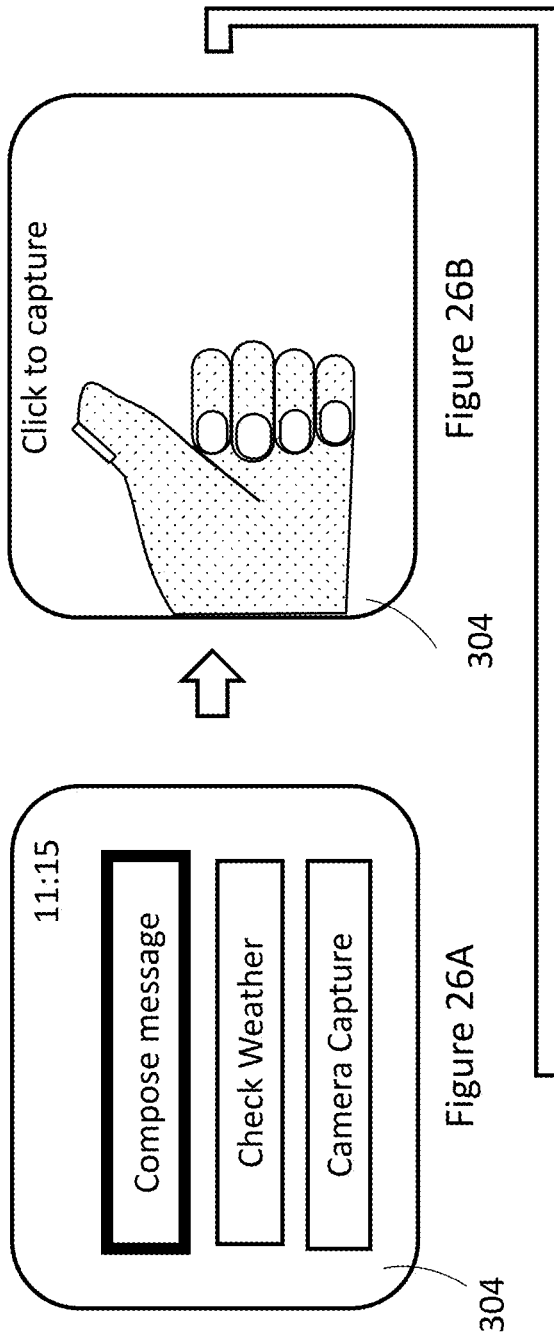
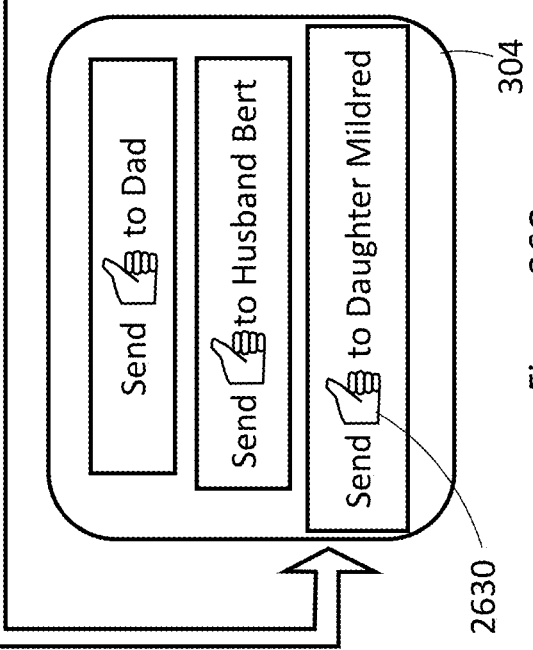
Figure 26A
Figure 26B
Figure 26C

SYSTEMS, DEVICES, AND METHODS FOR GENERATING MESSAGES

CROSS-REFERENCE TO RELATED APPLICATIONS

This application claims the benefit of U.S. Provisional Application No. 62/692,484, filed Jun. 29, 2018, titled "Systems, Devices, and Methods for Generating Conversation Starter Messages", the content of which is incorporated herein in its entirety by reference.

TECHNICAL FIELD

The present systems, devices, and methods generally relate to communication content, and particularly, to the generation of messages.

BACKGROUND

Description of the Related Art

Portable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, earphones may be considered a portable electronic device whether they are operated wirelessly or through a wire connection.

The convenience afforded by the portability of electronic devices has fostered a huge industry. Smartphones, audio players, laptop computers, tablet computers, and ebook readers are all examples of portable electronic devices.

Wearable Electronic Devices

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, and the like. Examples of wearable electronic devices include digital wristwatches, electronic armbands, electronic rings, electronic ankle-bracelets or "anklets," head-mounted electronic display units, hearing aids, and so on.

Some types of wearable electronic devices that have the electronic displays described above may include wearable heads-up displays. A wearable heads-up display is a head-mounted display that enables the user to see displayed content but does not prevent the user from being able to see their external environment. A typical head-mounted display (e.g., well-suited for virtual reality applications) may be opaque and prevent the user from seeing their external environment, whereas a wearable heads-up display (e.g., well-suited for augmented reality applications) may enable a user to see both real and virtual/projected content at the same time. A wearable heads-up display is an electronic device that is worn on a user's head and, when so worn, secures at least one display within a viewable field of at least one of the user's eyes at all times, regardless of the position or orientation of the user's head, but this at least one display is either transparent or at a periphery of the user's field of view so that the user is still able to see their external environment. Examples of wearable heads-up displays include: Google Glass®, Optinvent Ora®, Epson Moverio®, and Sony Glasstron®.

Text Entry

It is highly desirable to be able to input text to an electronic device, for example to provide control instructions, to write a message, or to prepare documents. However, one problem with wearable electronic devices and portable electronic devices today is that the user is forced to use inefficient and/or unergonomic mechanisms for text entry. For example, modern smartphones attempt to mimic the traditional keyboard by displaying an on-screen keyboard. This on-screen keyboard typically occupies nearly half of the screen space of the smartphone, and thus significantly occludes displayed content. Further, many of the functions of the keyboard, such as punctuation and numbers, are often relegated to secondary keyboards, forcing the user to switch back-and-forth between different keyboards to achieve normal text input. Further still, such on-screen keyboards typically have a form factor which causes users to use only two fingers to input text, significantly reducing efficiency of the keyboard. Additionally, on-screen keyboards are highly prone to inaccuracy and frequently detect a key different from the key which the user intended to enter, which is highly inefficient and frustrating to the user.

Text entry on wearable electronic devices suffers from even greater problems than those faced by smartphones. A smartwatch, for example, has an even smaller screen than a smartphone, and thus faces the same problems described above regarding smartphones, but to a much greater magnitude. This has led to many smartwatches simply having no mechanism for text entry.

Wearable heads-up displays have even greater struggles for text entry than the devices mentioned above. For example, wearable heads-up displays do not typically employ touchscreens, and thus cannot use touch based on-screen keyboards like in smartphones. Further, using a non-touch based on-screen keyboard, such as by having a user move a cursor using a joystick or buttons on the wearable heads-up display is incredibly inefficient, forcing the user to scroll across an entire keyboard for each individual key. Further still, using an additional device, such as a portable keyboard connected to the wearable heads-up display, increases overall bulk of the system, and forces the user to carry an additional component around, and to retrieve the additional component each time it is needed. This significantly hampers a number of the key advantages of using a wearable electronic device, such as maintaining your hands free for other tasks, and reducing the number and weight of components that need to be carried around.

To some extent the above issues related to text entry have seen solutions in the form of speech-to-text entry, where the user speaks to the device and the device converts the user's speech to text. However, these systems have many drawbacks, such as lack of privacy. If a user wishes to send a private message, but is in a public space, then it is simply not possible to send the speech-to-text message privately, since everyone around the user will hear what is being said to the device. Further, these systems are also highly conspicuous, and draw attention to the user in situations where it may be considered rude or socially inappropriate to communicate vocally through your device, such as on a crowded bus or train. Further still, these systems can be prone to inaccuracy, due to the difficulty involved in a computer processor trying to process human speech.

User-to-User Messaging

A key feature of portable electronic devices is the ability to communicate information between users of the devices, even when the users are far apart. Presently, this is typically achieved with messaging, where a user of one device sends a string of characters (e.g., text) and/or images (e.g., "emoji") to another device as a message. The advantages of communicating with such messages are numerous. For example, the size of the message can be kept to a minimum, since text strings and Unicode emoji require only a small amount of data, and thus bandwidth usage can be kept small when using such messages. Additionally, message-type communications do not require immediate attention by the recipient, but instead can be reviewed anytime at the recipient's convenience. For at least these reasons, it is highly desirable to provide an effective means of enabling the creation of messages for communication on electronic devices, and particularly on portable or wearable electronic devices that have limited means for text input.

Content Submission Messaging

Another feature of portable electronic devices is the ability to communicate information between a user of a device and a content hub, even when the users are far apart. For example, a user can submit a review to a restaurant website, or to a third-party review aggregation site such as TripAdvisor® or Yelp®. As another example, a user can submit content to social media services such as Facebook®. Such content submitted by the user can be considered as a "message", and can contain for example text, emojis, images, video, audio, etc. It is highly desirable to provide an effective means of enabling the creation of such messages on electronic devices, and particularly on portable or wearable electronic devices that have limited means for text input.

BRIEF SUMMARY

According to a broad aspect, the description describes a processor-based method of initiating a communication between a first system and a second system, wherein the first system includes at least one processor, an output device communicatively coupled to the at least one processor, a wireless communications module communicatively coupled to the at least one processor, and a non-transitory processor-readable storage medium communicatively coupled to the at least one processor, and wherein the non-transitory processor-readable storage medium stores processor-executable instructions that, when executed by the at least one processor, cause the first system to perform the method, may be summarized as including identifying, by the at least one processor, an environmental context parameter; generating, by the at least one processor, at least one candidate message based on the environmental context parameter; presenting, by the output device, the at least one candidate message; receiving, by the at least one processor, a first input from a user of the first system, the first input indicative of a selection of one of the at least one candidate message as a selected message; and transmitting, by the wireless communications module, the selected message.

The first system may include a wearable heads-up display ("WHUD") having at least one processor, a display communicatively coupled to the at least one processor of the WHUD, a first wireless communications module communicatively coupled to the at least one processor of the WHUD, and a non-transitory processor-readable storage medium communicatively coupled to the at least one processor of the WHUD; the first system may include a peripheral device having a second wireless communications module; identifying, by the at least one processor, an environmental context parameter may include identifying, by the at least one processor of the WHUD, an environmental context parameter; generating, by the at least one processor, at least one candidate message based on the environmental context parameter may include generating, by the at least one processor of the WHUD, at least one candidate message based on the environmental context parameter; presenting, by the output device, the at least one candidate message may include displaying, by the display of the WHUD, the at least one candidate message; receiving, by the at least one processor, a first input from a user of the first system may include receiving, by the at least one processor of the WHUD, a first input from a user of the first system, the first input indicative of the selection of one of the at least one candidate message as the selected message; and transmitting, by the wireless communications module, the selected message may include: transmitting, by the first wireless communications module of the WHUD, the selected message; receiving, by the second communications module of the peripheral device, the selected message; and transmitting, by the second wireless communications module of the peripheral device, the selected message.

The first system may include a wearable heads-up display ("WHUD") having a display; the first system may include a peripheral device having at least one processor, a wireless communications module communicatively coupled to the at least one processor of the peripheral device, and a non-transitory processor-readable storage medium communicatively coupled to the at least one processor of the peripheral device; identifying, by the at least one processor, an environmental context parameter may include identifying, by the at least one processor of the peripheral device, an environmental context parameter; generating, by the at least one processor, at least one candidate message based on the environmental context parameter may include generating, by the at least one processor of the peripheral device, at least one candidate message based on the environmental context parameter; presenting, by the output device, the at least one candidate message may include displaying, by the display of the WHUD, the at least one candidate message; receiving, by the at least one processor, a first input from a user of the first system may include receiving, by the at least one processor of the peripheral device, a first input from a user of the first system, the first input indicative of a selection of one of the at least one candidate message as the selected message; and transmitting, by the wireless communications module, the selected message may include transmitting, by the wireless communications module of the peripheral device, the selected message.

The WHUD may further include a wireless receiver communicatively coupled to the display, the method further including: transmitting, by the wireless communications module of the peripheral device, the at least one candidate message; and receiving, by the wireless receiver of the WHUD, the at least one candidate message before displaying, by the display of the WHUD, the at least one candidate message. Identifying, by the at least one processor, an environmental context parameter may include identifying, by the at least one processor, an environmental context parameter of the first system. Identifying, by the at least one processor, an environmental context parameter may include identifying, by the at least one processor, and environmental context parameter of a user of the first system.

The first system may further include a clock communicatively coupled to the at least one processor; identifying, by the at least one processor, an environmental context parameter may include identifying, by the at least one processor, a time of day based on an output of the clock; and generating, by the at least one processor, at least one candidate message may include generating, by the at least one processor, at least one greeting appropriate for the time of day.

The first system may further include a clock communicatively coupled to the at least one processor; identifying, by the at least one processor, an environmental context parameter may include identifying, by the at least one processor, a date based on an output of the clock; and generating, by the at least one processor, at least one candidate message may include generating, by the at least one processor, at least one greeting appropriate for the date.

The first system may further include a clock communicatively coupled to the at least one processor; identifying, by the at least one processor, an environmental context parameter may include identifying, by the at least one processor, a time of day and a date based on an output of the clock and identifying at least one relevant calendar entry in a calendar based on the time of day and the date; and generating, by the at least one processor, at least one candidate message may include generating, by the at least one processor, at least one candidate message based on the at least one relevant calendar entry.

The first system may further include at least one input sensor communicatively coupled to the at least one processor; identifying, by the at least one processor, an environmental context parameter may include identifying, by the at least one processor, an activity performed by the user of the first system based on input sensor data provided by the at least one input sensor; and generating, by the at least one processor, at least one candidate message may include generating, by the at least one processor, at least one candidate message based on the activity performed by the user of the first system.

The method may further include receiving, by a receiver of the first system, input sensor data, wherein identifying, by the at least one processor, an environmental context parameter may include identifying, by the at least one processor, an activity performed by the user of the first system based on the input sensor data; and generating, by the at least one processor, at least one candidate message may include generating, by the at least one processor, at least one candidate message based on the activity performed by the user of the first system.

The first system may further include a location sensor communicatively coupled to the at least one processor; identifying, by the at least one processor, an environmental context parameter may include identifying, by the at least one processor, a location of the first system based on an output of the location sensor; and generating, by the at least one processor, at least one candidate message may include generating, by the at least one processor, at least one candidate message based on the location of the first system.

The first system may further include at least one physical environment sensor communicatively coupled to the at least one processor; identifying, by the at least one processor, an environmental context parameter may include identifying, by the at least one processor, at least a physical environment of the first system based on an output of the physical environment sensor; and generating, by the at least one processor, at least one candidate message may include generating, by the at least one processor, at least one candidate message based on the physical environment of the first system.

The method may further include determining, by the at least one processor, at least one candidate recipient for the selected message based on at least one of a content of the selected message and the environmental context parameter; presenting, by the output device, the at least one candidate recipient for the selected message; and receiving, by the at least one processor, a second input from the user of the first system, the second input indicative of a selection of one of the at least one candidate recipient as a selected recipient, wherein transmitting, by the wireless communications module, the selected message includes transmitting, by the wireless communications module, the selected message to the selected recipient.

The method may further include autonomously modifying, by the at least one processor, the selected message based on the selected recipient. Receiving, by the at least one processor, a second input from the user of the first system, the second input indicative of a selection of one of the at least one candidate recipient as a selected recipient may be performed prior to receiving, by the at least one processor, a first input from a user of the first system, the first input indicative of a selection of one of the at least one candidate message as the selected message.

The method may further include determining, by the at least one processor, a communication vernacular based on a communication history between the user of the first system and the selected recipient, wherein generating, by the at least one processor, at least one candidate message based on the environmental context parameter further includes generating, by the at least one processor, the at least one candidate message based on the communication vernacular.

The method may further include determining, by the at least one processor, a relationship between the user of the first system and the selected recipient, wherein generating, by the at least one processor, at least one candidate message based on the environmental context parameter further includes generating, by the at least one processor, the at least one candidate message based on the determined relationship.

The method may further include autonomously determining, by the at least one processor, a recipient of the selected message based on at least one of a content of the selected message and the environmental context parameter.

The method may further include, prior to generating, by the at least one processor, at least one candidate message: determining, by the at least one processor, at least one candidate recipient based on the environmental context parameter; presenting, by the output device, the at least one candidate recipient; and receiving, by the at least one processor, a second input from the user of the first system, the second input indicative of a selected recipient from the at least one candidate recipient, wherein transmitting, by the wireless communications module, may include transmitting the selected message to the selected recipient.

Generating, by the at least one processor, at least one candidate message based on the environmental context parameter may include generating, by the at least one processor, at least two candidate messages based on the environmental context parameter, and receiving, by the at least one processor, a first input from a user of the first system may include receiving, by the at least one processor, the first input from the user of the first system indicative of a selection of one of the at least two candidate messages.

Generating, by the at least one processor, at least one candidate message may include generating, by the at least one processor, a first portion of a message; generating, by the at least one processor, at least two candidate second portions to complete the message based on at least the first portion of the message; receiving, by the at least one processor, a second input from a user of the first system, the second input indicative of a selected second portion from the at least two candidate second portions, generating, by the at least one processor, a complete message by combining the first portion and the selected second portion.

In another broad aspect, the subject description describes a first system which initiates a communication between the first system and a second system which may be summarized as including at least one processor; an output device communicatively coupled to the at least one processor; a wireless communications module communicatively coupled to the at least one processor; and a non-transitory processor-readable storage medium communicatively coupled to the at least one processor; wherein the non-transitory processor-readable storage medium stores processor-executable instructions that, when executed by the at least one processor, cause the first system to: identify, by the at least one processor, an environmental context parameter; generate, by the at least one processor, at least one candidate message based on the environmental context parameter; cause a presentation, by the output device, of the at least one candidate message; receive, by the at least one processor, a first input from a user of the first system, the first input indicative of a selected message from the at least one candidate message; and cause a transmission, by the wireless communications module, of the selected message.

The first system may further include a wearable heads-up display ("WHUD") which may include the at least one processor, a display communicatively coupled to the at least one processor, a first wireless communications module communicatively coupled to the at least one processor, and the non-transitory processor-readable storage medium communicatively coupled to the at least one processor; and a peripheral device comprising a second wireless communications module; wherein the processor-executable instructions that, when executed by the at least one processor, cause the first system to transmit, by the wireless communications module, the selected message, cause the first system to: transmit, by the first wireless communications module of the WHUD, the selected message; receive, by the second wireless communications module of the peripheral device, the selected message; and transmit, by the second wireless communications module of the peripheral device, the selected message.

The first system may further include a wearable heads-up display ("WHUD") comprising a display; and a peripheral device comprising the at least one processor, the wireless communications module communicatively coupled to the at least one processor, and the non-transitory processor-readable storage medium communicatively coupled to the at least one processor.

The WHUD may further include a wireless receiver communicatively coupled to the output device, the processor-executable instructions further comprising processor-executable instructions that, when executed by the at least one processor, cause the first system to: transmit, by the wireless communications module of the peripheral device, the at least one candidate message; and receive, by the wireless receiver of the WHUD, the at least one candidate message. The environmental context parameter may represent an environmental context of the first system. The environmental context parameter may represent an environmental context of a user of the first system.

The first system may further include a clock communicatively coupled to the at least one processor, wherein the processor-executable instructions that, when executed by the at least one processor, cause the first system to identify, by the at least one processor, an environmental context parameter cause the at least one processor to identify a time of day based on an output of the clock; and the processor-executable instructions that, when executed by the at least one processor, cause the first system to generate, by the at least one processor, at least one candidate message cause the at least one processor to generate at least one greeting appropriate for the time of day.

The first system may further include a clock communicatively coupled to the at least one processor, wherein the processor-executable instructions that, when executed by the at least one processor, cause the first system to identify, by the at least one processor, an environmental context parameter cause the at least one processor to identify a date based on an output of the clock; and the processor-executable instructions that, when executed by the at least one processor, cause the first system to generate, by the at least one processor, at least one candidate message cause the at least one processor to generate at least one greeting appropriate for the date.

The first system may further include a clock communicatively coupled to the at least one processor, wherein the processor-executable instructions that, when executed by the at least one processor, cause the first system to identify, by the at least one processor, an environmental context parameter cause the at least one processor to identify a time of day and a date based on an output of the clock and identify at least one relevant calendar entry in a calendar based on the time of day and the date; and the processor-executable instructions that, when executed by the at least one processor, cause the first system to generate, by the at least one processor, at least one candidate message cause the at least one processor to generate at least one candidate message based on the at least one relevant calendar entry.

The first system may further include at least one input sensor communicatively coupled to the at least one processor, wherein the processor-executable instructions that, when executed by the at least one processor, cause the first system to identify, by the at least one processor, an environmental context parameter cause the at least one processor to identify an activity performed by the user of the first system based on input sensor data provided by the at least one input sensor; and the processor-executable instructions that, when executed by the at least one processor, cause the first system to generate, by the at least one processor, at least one candidate message cause the at least one processor to generate at least one candidate message based on the activity performed by the user of the first system. The at least one input sensor may include at least one sensor selected from a group consisting of: an electromyography sensor, a mechanomyography sensor, an accelerometer, a gyroscope, an electrocardiography sensor, a photoplethysmography sensor, a blood pressure sensor, a global positioning system sensor, and a compass. The processor-executable instructions that, when executed by the at least one processor, may cause the first system to identify, by the at least one processor, an environmental context parameter may cause the at least one processor to identify an activity performed by the user of the first system based on input sensor data received from a sensing device; and the processor-executable instructions that, when executed by the at least one processor, may cause the first system to generate, by the at least one processor, at least one candidate message may cause the at least one processor to generate at least one candidate message based on the activity performed by the user of the first system.

The first system may further include a location sensor communicatively coupled to the at least one processor, wherein the processor-executable instructions that, when executed by the at least one processor, cause the first system to identify, by the at least one processor, an environmental context parameter cause the at least one processor to identify a location of the first system based on an output of the location sensor; and the processor-executable instructions that, when executed by the at least one processor, cause the first system to generate, by the at least one processor, at least one candidate message cause the at least one processor to generate at least one candidate message based on the location of the first system.

The first system may further include at least one physical environment sensor communicatively coupled to the at least one processor, wherein the processor-executable instructions that, when executed by the at least one processor, cause the first system to identify, by the at least one processor, an environmental context parameter cause the at least one processor to identify at least a physical environment of the first system based on an output of the physical environment sensor; and the processor-executable instructions that, when executed by the at least one processor, cause the first system to generate, by the at least one processor, at least one candidate message cause the at least one processor to generate at least one candidate message based on the physical environment of the first system. The at least one physical environment sensor may include at least one sensor selected from a group consisting of: a camera and a microphone.

The non-transitory processor-readable storage medium may store further processor-executable instructions that, when executed by the at least one processor, may cause the first system to: determine, by the at least one processor, at least one candidate recipient for the selected message based on at least one of a content of the selected message and the environmental context parameter; present, by the output device, the at least one candidate recipient for the selected message; and receive, by the at least one processor, a second input from the user of the first system, the second input indicative of a selected recipient from the at least one candidate recipient, wherein the processor-executable instructions that, when executed by the at least one processor, cause the first system to transmit, by the wireless communications module, the selected message cause the wireless communications module to transmit the selected message to the selected recipient.

The non-transitory processor-readable storage medium may store further processor-executable instructions that, when executed by the at least one processor, may cause the first system to modify, by the at least one processor, the selected message based on the selected recipient.

The non-transitory processor-readable storage medium may store further processor-executable instructions that, when executed by the at least one processor, may cause the first system to determine, by the at least one processor, a communication vernacular based on a communication history between the user of the first system and the selected recipient, wherein the processor-executable instructions that, when executed by the at least one processor, may cause the first system to generate, by the at least one processor, at least one candidate message cause the at least one processor to generate at least one candidate message based on the communication vernacular.

The non-transitory processor-readable storage medium may store further processor-executable instructions that, when executed by the at least one processor, may cause the first system to determine, by the at least one processor, a relationship between the user of the first system and the selected recipient, wherein the processor-executable instructions that, when executed by the at least one processor, may cause the first system to generate, by the at least one processor, at least one candidate message may cause the at least one processor to generate at least one candidate message based on the determined relationship. The non-transitory processor-readable storage medium may store further processor-executable instructions that, when executed by the at least one processor, may cause the first system to, by the at least one processor, autonomously determine a recipient of the selected message based on at least one of a content of the selected message and the environmental context parameter.

The non-transitory processor-readable storage medium may store further processor-executable instructions that, when executed by the at least one processor, may cause the first system to: prior to generation, by the at least one processor, of at least one candidate message: determine, by the at least one processor, at least one candidate recipient based on the environmental context parameter; present, by the output device, the at least one candidate recipient; and receive, by the at least one processor, a second input from the user of the first system, the second input indicative of a selected recipient from the at least one candidate recipient, and the processor-executable instructions that, when executed by the at least one processor, cause the first system to transmit, by the wireless communications module, the selected message may cause the wireless communications module to transmit the selected message to the selected recipient.

The processor-executable instructions that, when executed by the at least one processor, may cause the first system to generate, by the at least one processor, at least one candidate message based on the environmental context parameter may cause the at least one processor to generate at least two candidate messages based on the environmental context parameter; and the processor-executable instructions that, when executed by the at least one processor, may cause the first system to receive, by the at least one processor, a first input from a user of the first system, may cause the at least one processor to receive a first input indicative of a selected message from the at least two candidate messages.

The non-transitory processor-readable storage medium may store further processor-executable instructions that, when executed by the at least one processor, may cause the first system to generate, by the at least one processor, a first portion of a message; the processor-executable instructions which may cause the first system to generate, by the at least one processor, at least one candidate message may cause the at least one processor to generate at least two candidate second portions to complete the message based on at least the first portion of the message; the processor-executable instructions which may cause the first system to receive, by the at least one processor, a first input from a user of the first system may cause the at least one processor to receive a first input from a user of the first system indicative of a selected second portion from the at least two candidate second portions; and the non-transitory processor-readable storage medium may store further processor-executable instructions that, when executed by the at least one processor, may cause the first system to generate, by the at least one processor, a complete message by combining the first portion and the selected second portion.

In another broad aspect, the subject description describes a processor-based method of initiating a communication between a first system and a second system, wherein the first system includes at least one processor, an output device communicatively coupled to the at least one processor, a wireless communications module communicatively coupled to the at least one processor, and a non-transitory processor-readable storage medium communicatively coupled to the at least one processor, and wherein the non-transitory processor-readable storage medium stores processor-executable instructions that, when executed by the at least one processor, cause the first system to perform the method, may be summarized as including generating, by the at least one processor, a first portion of a message; presenting, by the output device, the first portion of the message; generating, by the at least one processor, at least two candidate second portions to complete the message based on at least the first portion of the message; presenting, by the output device, the at least two candidate second portions; receiving, by the at least one processor, a first input from a user of the first system, the first input indicative of a selection of one of the at least two candidate second portions as a selected second portion; generating, by the at least one processor, a complete message by combining the first portion and the selected second portion; and transmitting, by the wireless communications module, the complete message from the first system.

The first system may include a wearable heads-up display ("WHUD") having at least one processor, a display communicatively coupled to the at least one processor of the WHUD, a first wireless communications module communicatively coupled to the at least one processor of the WHUD, and a non-transitory processor-readable storage medium communicatively coupled to the at least one processor of the WHUD; the first system may include a peripheral device having a second wireless communications module; generating, by the at least one processor, a first portion of a message may include generating, by the at least one processor of the WHUD, a first portion of a message; presenting, by the output device, the first portion of the message may include displaying, by the display of the WHUD, the first portion of the message; generating, by the at least one processor, at least two candidate second portions to complete the message based on at least the first portion of the message may include generating, by the at least one processor of the WHUD, at least two candidate second portions to complete the message based on at least the first portion of the message; presenting, by the output device, the at least two candidate second portions may include displaying, by the display of the WHUD, the at least two candidate second portions; receiving, by the at least one processor, a first input from a user of the first system may include receiving, by the at least one processor of the WHUD, a first input from a user of the first system, the first input indicative of a selection of one of the at least two candidate second portions as the selected second portion; generating, by the at least one processor, a complete message by combining the first portion and the selected second portion may include generating, by the at least one processor of the WHUD, a complete message by combining the first portion and the selected second portion; and transmitting, by the wireless communications module, the complete message from the first system may include: transmitting, by the first wireless communications module of the WHUD, the complete message; receiving, by the second wireless communications module of the peripheral device, the complete message; and transmitting, by the second wireless communications module of the peripheral device, the complete message.

The first system may include a wearable heads-up display ("WHUD") having a display; the first system may include a peripheral device having at least one processor, a wireless communications module communicatively coupled to the at least one processor of the peripheral device, and a non-transitory processor-readable storage medium communicatively coupled to the at least one processor of the peripheral device; generating, by the at least one processor, a first portion of a message may include generating, by the at least one processor of the peripheral device, a first portion of a message; presenting, by the output device, the first portion of the message may include displaying, by the display of the WHUD, the first portion of the message; generating, by the at least one processor, at least two candidate second portions to complete the message based on at least the first portion of the message may include generating, by the at least one processor of the peripheral device, at least two candidate second portions to complete the message based on at least the first portion of the message; presenting, by the output device, the at least two candidate second portions may include displaying, by the display of the WHUD, the at least two candidate second portions; receiving, by the at least one processor, a first input from a user of the first system may include receiving, by the at least one processor of the peripheral device, a first input from a user of the first system, the first input indicative of a selection of one of the at least two candidate second portions as the selected second portion; generating, by the at least one processor, a complete message by combining the first portion and the selected second portion may include generating, by the at least one processor of the peripheral device, a complete message by combining the first portion and the selected second portion; and transmitting, by the wireless communications module, the selected message may include transmitting, by the wireless communications module of the peripheral device, the complete message.

The WHUD may further include a wireless receiver communicatively coupled to the display, and the method may further include transmitting, by the wireless communications module of the peripheral device, the first portion of the message; receiving, by the wireless receiver of the WHUD, the first portion of the message before displaying, by the display of the WHUD, the first portion of the message; transmitting, by the wireless communications module of the peripheral device, the at least two candidate second portions; and receiving, by the wireless receiver of the WHUD, the at least two candidate second portions before displaying, by the display of the WHUD, the at least two candidate second portions. At least one of the at least two candidate second portions may be a text string, and presenting, by the output device, the at least two candidate second portions may include presenting the text string by the output device. At least one of the at least two candidate second portions may be a non-text image, and presenting, by the output device, the at least two candidate second portions may include displaying the image by the output device.

The method may further include identifying, by the at least one processor, an environmental context parameter, wherein generating, by the at least one processor, a first portion of a message includes generating, by the at least one processor, the first portion of the message based on the environmental context parameter, wherein the environmental context parameter represents an environmental context including at least one context selected from a group consisting of: a time, a date, a calendar entry in a calendar, a location, a physical environment, and an activity performed by the user. Generating, by the at least one processor, at least two candidate second portions to complete the message based on at least the first portion of the message may include generating, by the at least one processor, the at least two candidate second portions based on the environmental context parameter, wherein the environmental context parameter represents an environmental context including at least one context selected from a group consisting of: a time, a date, a calendar entry in a calendar, a location, a physical environment, and an activity performed by the user.

The method may further include autonomously determining, by the at least one processor, at least one recipient of the complete message based on at least one of a content of the complete message and the environmental context parameter.

The method may further include determining, by the at least one processor, at least one candidate recipient for the complete message based on at least one of a content of the complete message and the environmental context parameter; presenting, by the output device, the at least one candidate recipient for the complete message; and receiving, by the at least one processor, a second input from the user of the first system, the second input indicative of a selected recipient from the at least one candidate recipient, wherein transmitting, by the wireless communications module, the complete message includes transmitting, by the wireless communications module, the complete message to the selected recipient.

In another broad aspect, the subject description describes a first system which initiates a communication between the first system and a second system may be summarized as including at least one processor; an output device communicatively coupled to the at least one processor; a wireless communications module communicatively coupled to the at least one processor; and a non-transitory processor-readable storage medium communicatively coupled to the at least one processor;

wherein the non-transitory processor-readable storage medium stores processor-executable instructions that, when executed by the at least one processor, cause the first system to: generate, by the at least one processor, a first portion of a message; present, by the output device, the first portion of the message; generate, by the at least one processor, at least two candidate second portions to complete the message based on at least the first portion of the message; present, by the output device, the at least two candidate second portions; receive, by the at least one processor, a first input from a user of the first system, the first input indicative of a selection of one the at least two candidate second portions as a selected second portion; generate, by the at least one processor, a complete message by combining the first portion and the selected second portion; and transmit, by the wireless communications module, the complete message from the first system.

The first system may further include a wearable heads-up display ("WHUD") which comprises the at least one processor, a display communicatively coupled to the at least one processor, a first wireless communications module communicatively coupled to the at least one processor, and the non-transitory processor-readable storage medium communicatively coupled to the at least one processor; and a peripheral device comprising a second wireless communications module; wherein the processor-executable instructions that, when executed by the at least one processor, cause the first system to transmit, by the wireless communications module, the selected message, cause the first system to: transmit, by the first wireless communications module of the WHUD, the complete message; receive, by the second wireless communications module of the peripheral device, the complete message; and transmit, by the second wireless communications module of the peripheral device, the complete message.

The first system may further include a wearable heads-up display ("WHUD") comprising a display; and a peripheral device comprising the at least one processor, the wireless communications module communicatively coupled to the at least one processor, and the non-transitory processor-readable storage medium communicatively coupled to the at least one processor.

The WHUD may further include a wireless receiver communicatively coupled to the display, the processor-executable instructions further including processor-executable instructions that, when executed by the at least one processor, cause the first system to transmit, by the wireless communications module of the peripheral device, the first portion of the message; receive, by the wireless receiver of the WHUD, the first portion of the message; transmit, by the wireless communications module of the peripheral device, the at least two candidate second portions; and receive by the wireless receiver of the WHUD, the at least two candidate second portions. At least one of the at least two candidate second portions may be a text string, and the processor-executable instructions that, when executed by the at least one processor, cause the first system to display, by the display, the at least two candidate second portions may cause the display to display the text string. At least one of the at least two candidate second portions may be a non-text image, and the processor-executable instructions that, when executed by the at least one processor, cause the first system to display, by the display, the at least two candidate second portions may cause the display to display the image.

The non-transitory processor-readable storage medium may store further processor-executable instructions that, when executed by the at least one processor, may cause the at least one processor to identify an environmental context parameter; and the processor-executable instructions that, when executed by the at least one processor, may cause the first system generate, by the at least one processor, a first portion of a message may cause the at least one processor to generate the first portion of the message based on the environmental context parameter, wherein the environmental context parameter represents an environmental context including at least one context selected from a group consisting of: a time, a date, a calendar entry in a calendar, a location, a physical environment, and an activity performed by the user. The processor-executable instructions that, when executed by the at least one processor, may cause the first system to generate, by the at least one processor, at least two candidate second portions to complete the message based on at least the first portion of the message may cause the at least one processor to generate the at least two candidate second portions based on the environmental context parameter, wherein the environmental context parameter represents an environmental context including at least one context selected from a group consisting of: a time, a date, a calendar entry in a calendar, a location, a physical environment, and an activity performed by the user.

The non-transitory processor-readable storage medium may store further processor-executable instructions that, when executed by the at least one processor, may cause the at least one processor to autonomously determine at least one recipient of the complete message based on at least one of a content of the complete message and the environmental context parameter.

The non-transitory processor-readable storage medium may store further processor-executable instructions that, when executed by the at least one processor, may cause the first system to determine, by the at least one processor, at least one candidate recipient for the complete message based on at least one of a content of the complete message and the environmental context parameter; present, by the output device, the at least one candidate recipient for the complete message; and receive, by the at least one processor, a second input from the user of the first system, the second input indicative of a selection of one of the at least one candidate recipient as a selected recipient, wherein the processor-executable instructions that, when executed by the at least one processor, cause the first system to transmit, by the wireless communications module, the complete message cause the wireless communications module to transmit the complete message to the selected recipient.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 10A, 10B, and 10C are representations of user interfaces which present image representations including user selectable messages in response to execution of the method of FIG. 7 with the acts being performed in a different order.

FIGS. 14A, 14B, 14C, 14D, 15A, 15B, 15C, and 15D are representations of user interfaces which present image representations including user selectable messages in response to execution of the method of FIG. 13.

FIGS. 18A, 18B, 18C, 18D, 19A, 19B, 19C, 19D, 20A, 20B, 20C, 20D, 21A, 21B, 21C, 21D, 21E, 22A, 22B, 22C, 22D, 23A, 23B, 23C, 23D, 24A, 24B, 24C, 24D, 25A, 25B, 25C, 26A, 26B, and 26C are representations of user interfaces which present image representations including user selectable messages in at least nine illustrated implementations of the methods of FIG. 16 and FIG. 17.

DETAILED DESCRIPTION

In the following description, certain specific details are set forth in order to provide a thorough understanding of various disclosed implementations or embodiments. However, one skilled in the relevant art will recognize that implementations or embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the implementations or the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations or embodiments.

The various embodiments described herein provide systems, devices, and methods for generating messages and are particularly well-suited for use in portable electronic devices or wearable electronic devices, but are also fully applicable in non-portable electronic devices as well.

Figure 1A:
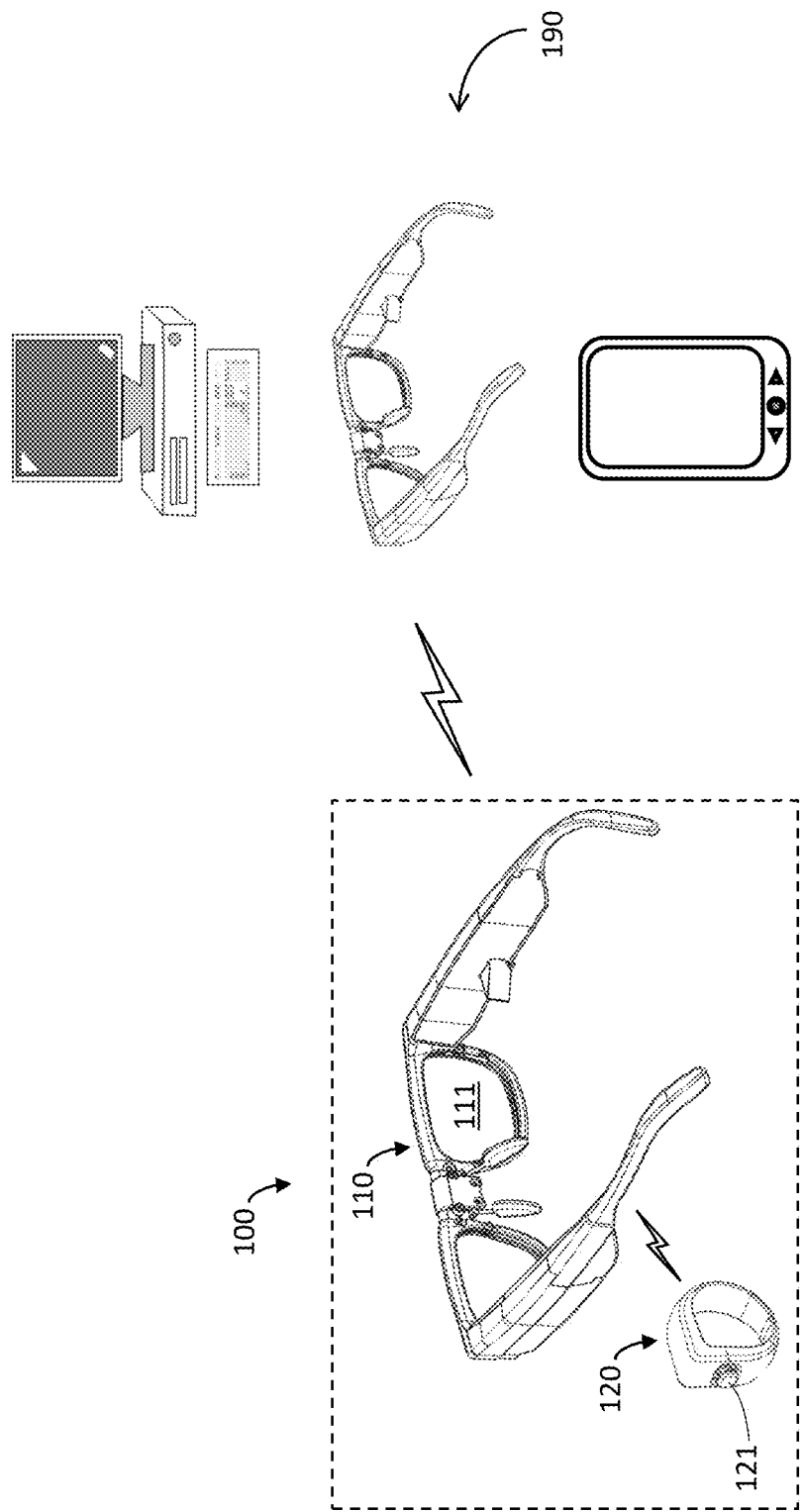
FIGS. 1A, 1B, and 1C are schematic diagrams showing exemplary systems which can exchange messages in the subject systems, devices, and methods.

FIG. 1A shows an exemplary first system 100 and second system 190 between which messages may be exchanged in accordance with the present systems, devices, and methods. First system 100 generates and sends a message to at least a second system 190. The message can be sent to a single system 190 but may also be sent to a plurality of systems 190, or via a plurality of systems (e.g., intermediary servers between a sender and intended recipient(s)). System(s) 190 may include any appropriate system(s) capable of receiving a message, including but not limited to a phone, smartphone, laptop, desktop computer, tablet, smartwatch, smartglasses, personal digital assistant, or any combination thereof. System(s) 190 could also include a system identical to the first system 100. In the example of FIG. 1A, system 100 includes a wearable heads-up display ("WHUD") 110 and a control ring 120. The WHUD 110 includes an output device 101, on which content can be displayed to a user of the WHUD 110 when worn on the head of the user. Though not illustrated in the FIG. 1A, WHUD 110 also includes at least one processor, a non-transitory processor-readable storage medium, and a wireless communications module which can include a wireless receiver, a wireless transmitter, and/or a wireless transceiver. WHUD 110 could for example be one of the WHUDs disclosed in U.S. Non-Provisional patent application Ser. No. 15/145,576, U.S. Non-Provisional patent application Ser. No. 15/167,458, or U.S. Non-Provisional patent application Ser. No. 15/046,254, all of which are incorporated herein by reference in their entirety, and which further includes various processor-executable instructions described herein for performing communications. Control ring 120 includes a control pad 121 which can receive a user input. Further, although not illustrated in the FIG. 1A, control ring 120 also includes a wireless communications module, and may optionally include at least one processor and a non-transitory processor-readable storage medium. Control ring 120 could for example be one of the rings disclosed in U.S. Provisional Patent Application Ser. No. 62/607,816, U.S. Provisional Patent Application Ser. No. 62/607,819, or U.S. Provisional Patent Application Ser. No. 62/671,248, all of which are incorporated herein by reference in their entirety.

Control ring 120 in use is worn on a finger of a user, and the user can provide input to the WHUD 110 via the control ring 120. In the case of FIG. 1A, the control pad 121 is a pressable joystick or rocker switch, which allows the user to input directional commands by applying force, with or without haptic feedback, for example by tilting the joystick, as well as a confirm command by pressing the joystick inwards (e.g., depressing). Control ring 120 communicates the user input to the WHUD 110 by the wireless communications module on the control ring 120. The WHUD 110 receives the user input with the wireless receiver thereon. Control ring 120 advantageously provides a convenient input mechanism which can be used quickly and inconspicuously.

One skilled in the art will recognize that the above hardware description is merely an exemplary hardware arrangement, and many different systems could be employed within the context of the present disclosure. For example, control ring 120 and WHUD 110 do not necessarily need to communicate wirelessly, but instead control ring 120 could communicate with the WHUD 110 via a wired connection. Further, control ring 120 is not limited to a ring worn a finger of the user, but could also be any other type of control device, such as for example a band worn on a user's arm or a control pad held in a user's hand. Further still, control pad 121 could be replaced by any appropriate input mechanism known in the art, such as tactile buttons or a touch-sensitive trackpad, for example.

Figure 1B:
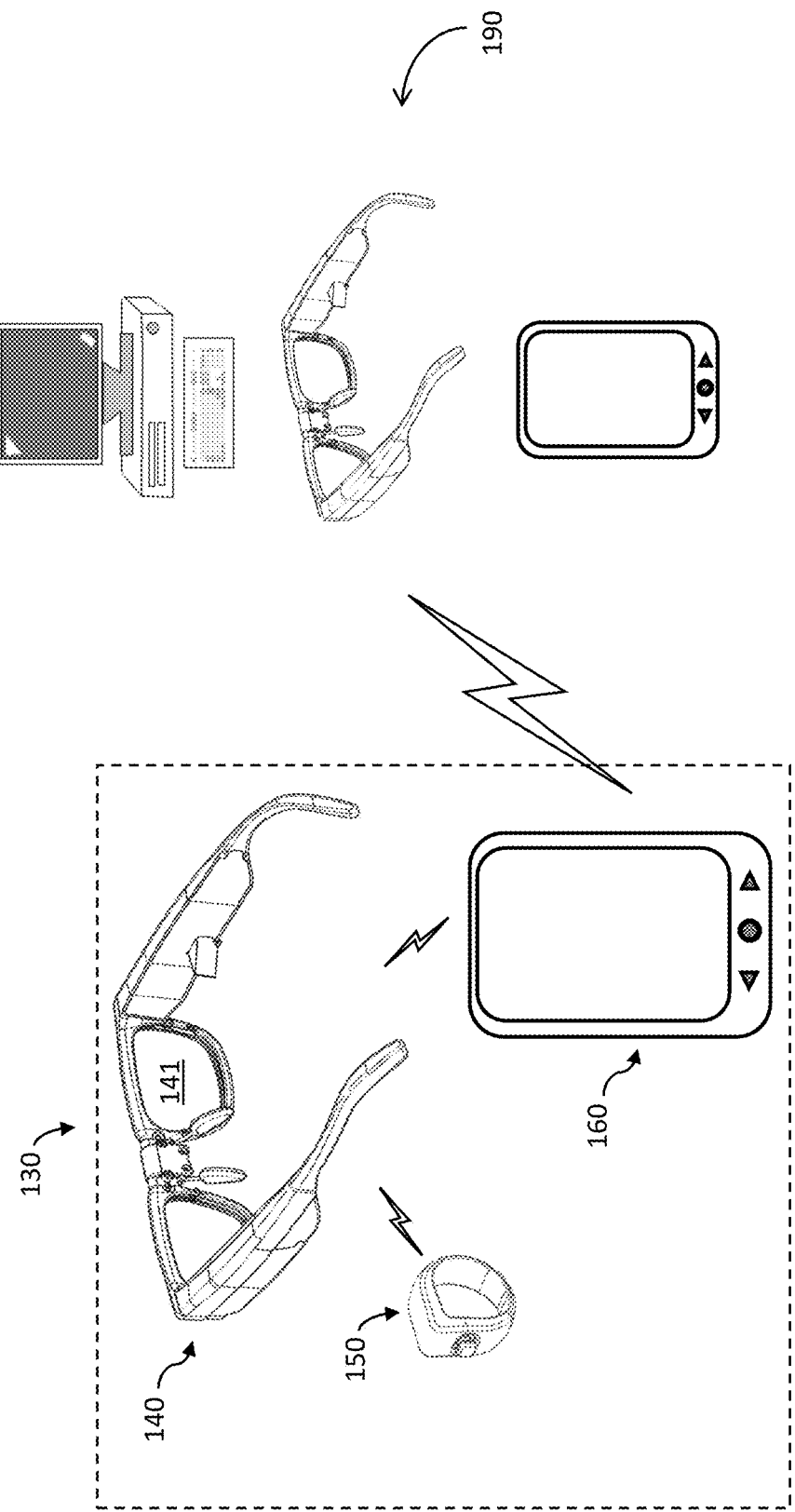

FIG. 1B illustrates a system 130 which is an alternative to the system 100 in FIG. 1A. System 130 includes a WHUD 140, a control ring 150, and a peripheral device 160. WHUD 140 can include all of the same components as WHUD 110, and the discussion above regarding WHUD 110 fully applies to WHUD 140. Control ring 150 can include all of the same components as control ring 120, and the discussion above regarding control ring 120 fully applies to control ring 150. Peripheral device 160 can include at least a wireless communications module. Peripheral device 160 can also optionally include a wireless receiver, at least one processor, a non-transient processor-readable storage medium, an output device, and a user input mechanism. The purpose of peripheral device 160 is to provide an additional device for performing some of the functionality that would otherwise be performed by the WHUD, such that the WHUD 140 can be lighter and/or the system 130 as a whole can be more powerful. As an example, peripheral device 160 could be a typical smartphone, which includes at least a processor and long-range communication hardware such as 2G, 3G, 4G, LTE, and/or any other suitable communication hardware. Instead of putting long-range wireless communication hardware on WHUD 140, the WHUD 140 can instead use short range communication such as Bluetooth®, Zigbee®, or similar to communicate with a user's smartphone, which in turn can perform long-range wireless communication with second system 190. This arrangement is advantageous in that a single set of short-range wireless communication hardware can be included on the WHUD 140 to communicate with both the control ring 150 and the peripheral device 160, thus reducing the bulk and weight of WHUD 140. Additionally, peripheral device 160 can be used to implement more functionality than just communication. For example, at least some of the processing performed by the system 130 can be performed by the peripheral device 160 instead of the WHUD 140. As an example, the WHUD 140 could include minimal hardware, which includes only the display 141, hardware required to control the display 141, and wireless communication hardware for communicating with the peripheral device 160. The peripheral device 160 could process and render image data to send to the WHUD 140, such that the WHUD 140 need only display the pre-rendered data. Such a system would advantageously reduce the amount of hardware which is required on the WHUD, thus reducing bulk, weight, and power consumption of the WHUD. The reduced power consumption also allows for the WHUD to use a smaller battery, further reducing bulk and weight.

One skilled in the art will appreciate that control ring 150 does not necessarily need to communicate with WHUD 140. Specifically, in the implementation where the peripheral device 160 processes and renders image data to send to WHUD 140 for display, control ring 150 could send inputs from a user to the peripheral device 160 instead of to WHUD 140. Peripheral device 160 may process the received inputs and alter the rendering of image data to be sent to WHUD 140 based on the received inputs if needed.

Although FIG. 1B shows the control ring 150 and peripheral device 160 as being separate devices, one skilled in the art will appreciate that it is within the scope of the present systems, devices, and methods for the control ring 150 and peripheral device 160 to be coupled together or even to be the same device. For example, the control ring 150 could be implemented as a band worn on a user's forearm during use, and the peripheral device 160 could also be attached to the same band. Alternatively, in addition to the previously described components, the control ring 150 could include at least one processor, a non-transitory processor-readable storage medium, and wireless communication hardware, and the control ring 150 could perform much of the processing instead of the WHUD 140, and/or could perform the long-range communication instead of the WHUD 140, such that the control ring 150 effectively serves as the peripheral device 160.

One example of a system in which a peripheral device performs much of the processing for a WHUD is discussed in U.S. patent application Ser. No. 14/704,663 (Publication No. US 2015/0325202), which is incorporated herein by reference in its entirety.

As another implementation to minimize hardware components carried by a WHUD, the present systems, devices, and method also allow for processing to be performed by at least one, possibly many, processors to perform processing for the WHUD over a computer network, such as a "cloud" environment. As an example, any of the WHUD 110, control ring 120, WHUD 140, control ring 150, and peripheral device 160 could communicate with at least one remote processor, such as a user's home desktop computer or a centralized server which handles many devices, via the Internet, such that the at least one remote processor performs processing for the systems 100 and 130. The results of the processing can be sent back to the systems 100 and 130, where the results can be displayed on the displays 111 or 141, or be further processed by the at least one processor of the WHUDs or the peripheral device 160.

Figure 1C:
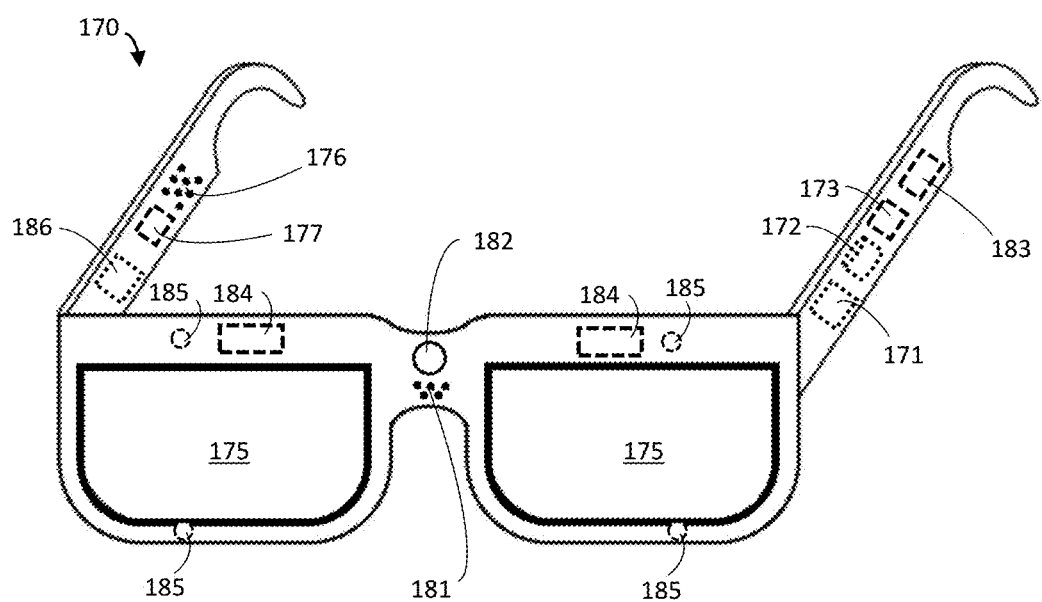

FIG. 1C is a schematic view of an exemplary first system 170, which includes many hardware components. The hardware components illustrated in FIG. 1C and discussed below, could also be implemented in first system 100 and first system 130 discussed above, as well as any of the other systems discussed herein, such as system 300 discussed below. One skilled in the art will appreciate that each of the illustrated components in FIG. 1C is not required to achieve the present systems, devices, and methods, but rather that the components illustrated in FIG. 1C are exemplary components which can be implemented in the present systems, devices, and methods.

First system 170 as shown in FIG. 1C includes multiple output devices which can be used to present information to a user. These output devices can include, for example, display 175, speaker 176, haptic output interface 177, and any other output device as appropriate for a particular application. A WHUD in accordance with the present systems, devices, and methods can optionally include a plurality, all, or a combination of these output devices as shown in FIG. 1C, but only requires only a single output device, such as a single display 175, a single speaker 176, or a single haptic output interface 177. Notably, although the term "Wearable heads-up display" implies that a device which includes a display, similar head-wearable devices exist which do not require a display, but instead present output to a user by a speaker. Further, a first system in accordance with the present systems, devices, and methods can also include a plurality of any or all of the described output devices, such as a plurality of displays 175, a plurality of speakers 176, and/or a plurality of haptic output interfaces 177.

First system 170 as shown in FIG. 1C includes multiple sensors, which can be used to capture input which can indicate an environmental context of the user, and which can be used to capture input from the user which provides instructions to the first system 170. These sensors can include microphone 181, camera 182, inertial measurement unit ("IMU") 183, eye-tracking system 184, proximity sensors 185, location sensor 186, and any other sensor as appropriate for a particular application. A WHUD in accordance with the present systems, devices, and methods can optionally include a plurality, all, or a combination of these sensors as shown in FIG. 1, but only requires a single sensor, such as a single microphone 181, a single camera 182, a single inertial measurement unit 183, a single eye-tracking system 184, a single proximity sensor 185, or a single location sensor 186. Further, a WHUD in accordance with the present systems, devices, and methods can also include a plurality of any or all of the described sensors, such as a plurality of microphones 181, a plurality of cameras 182, a plurality of inertial measurement units 183, a plurality of eye-tracking systems 184, a plurality of proximity sensors 185, and/or a plurality of location sensor 186. Since the above described sensors can be used to capture and measure information indicating environmental context of a user of the first system, throughout this specification the term "user context sensor" can refer to any of the above described sensors, or any other sensors which can be carried by a system in accordance with the present invention, as appropriate for a given application. However, one skilled in the art will appreciate that the above described sensors can be more than just "user context sensors", in that the above described sensors can perform functions beyond just capturing user context, such as capturing user instructions, for example.

WHUD 170 as shown in FIG. 1C also includes at least one processor 171 and a non-transitory processor-readable storage medium 172 communicatively coupled to the at least one processor 171. The at least one processor 171 can be any suitable component which can execute instructions or logic, including but not limited to a micro-controller, microprocessor, multi-core processor, integrated-circuit, ASIC, FGPA, programmable logic device, or any appropriate combination of these components. The non-transitory processor-readable storage medium 172 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The non-transitory processor-readable storage medium 172 can store processor executable instructions which, when executed by the at least one processor 171, cause the first system 170 to implement the present systems, devices, and methods. Further, each of the output devices and sensors can be communicatively coupled to the at least one processor 171. That is, the at least one processor 171 can be communicatively coupled to at least display 175, speaker 176, haptic output interface 177, microphone 181, camera 182, inertial measurement unit 183, eye tracking system 184, proximity sensors 185, and location sensor 186.

Optionally, first system 170 can include wireless communication hardware, such as a wireless receiver, a wireless transmitter, and/or a wireless transceiver, for communicating with peripheral devices and/or external servers and content providers. FIG. 1C illustrates an exemplary wireless communications module 173.

Certain elements of FIG. 1C are drawn in dashed lines, to indicate that these devices or structures are not normally visible at the current perspective of first system 170 as shown in FIG. 1C, because the dashed elements are enclosed within a housing of the first system 170, or are occluded by other features such as the support structure or housing of first system 170. However, one skilled in the art will appreciate that these devices or structures do not necessarily have to be enclosed in the housing or behind other features of first system 170, but can be carried external to the housing or partially external as appropriate for a given application. Further, one skilled in the art will appreciate that although the output devices and sensors are shown at certain locations of the support structure of first system 170, one skilled in the art will appreciate that any of the output devices and sensors can be relocated to any location on the support structure as appropriate for a particular application.

One skilled in the art will also appreciate that systems 100 130, and 170 could be replaced by any appropriate systems having at least one processor, a non-transitory processor-readable storage medium, a wireless communications module, an output device, and a user input mechanism. In this regard, FIGS. 2A-2D illustrate several alternative hardware arrangements for a first system which could be used instead of the hardware arrangement of first system 100 shown in FIG. 1A, the hardware arrangement of first system 130 shown in FIG. 1B, or the hardware arrangement of first system 170 shown in FIG. 1C.

Figure 2A:
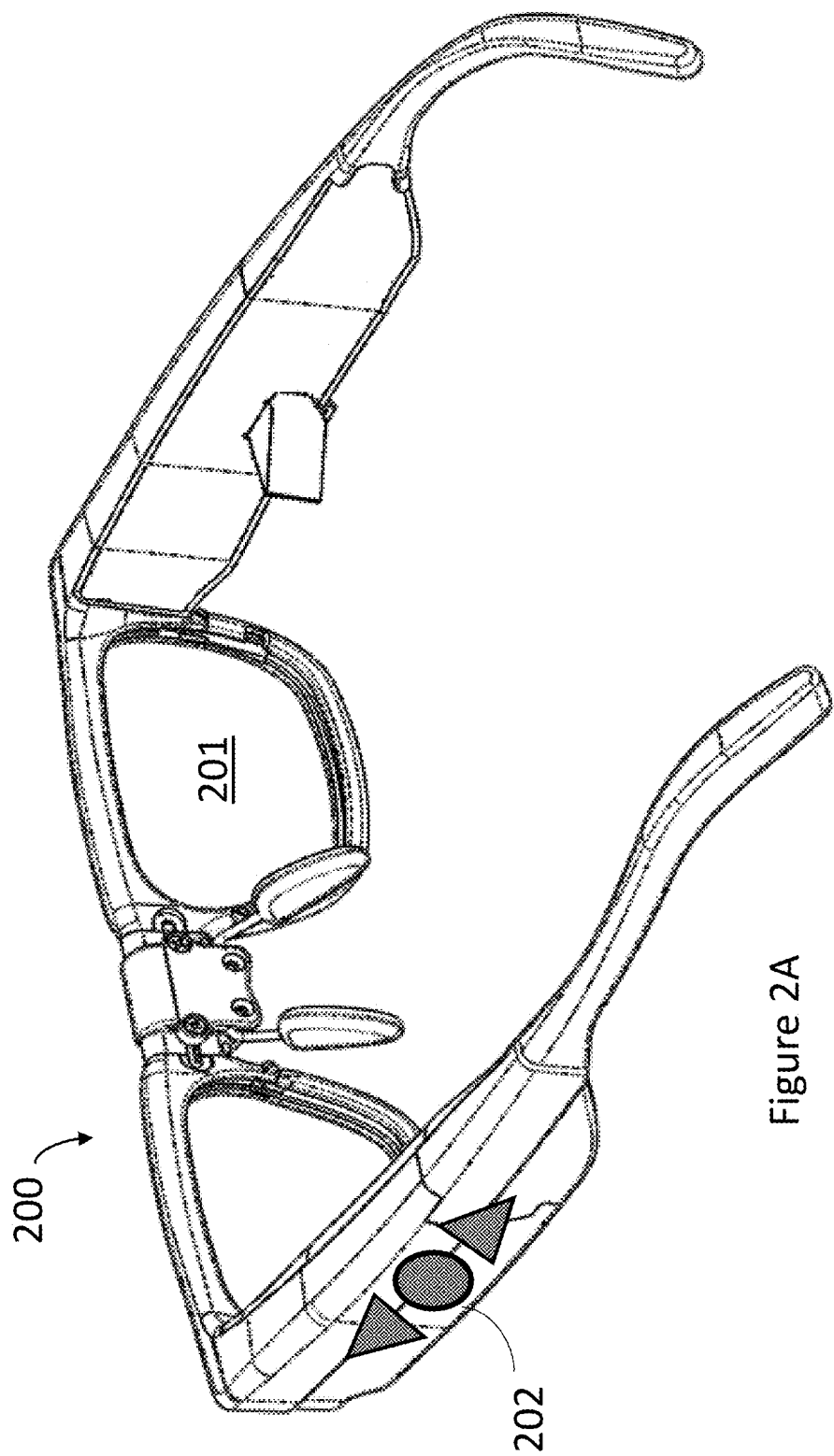
FIG. 2A is an isometric view of a wearable heads-up display on which messages can be generated and transmitted, according to at least one illustrated implementation.

FIG. 2A shows a WHUD 200 which includes a display 201 and input buttons 202. The placement of the input buttons 202 directly on the WHUD 200 obviate the need for wireless or wired communications between a separate control device. The input buttons 202 could be replaced by any appropriate input mechanism, such as a touch-sensitive trackpad or joystick for example.

Figure 2B:
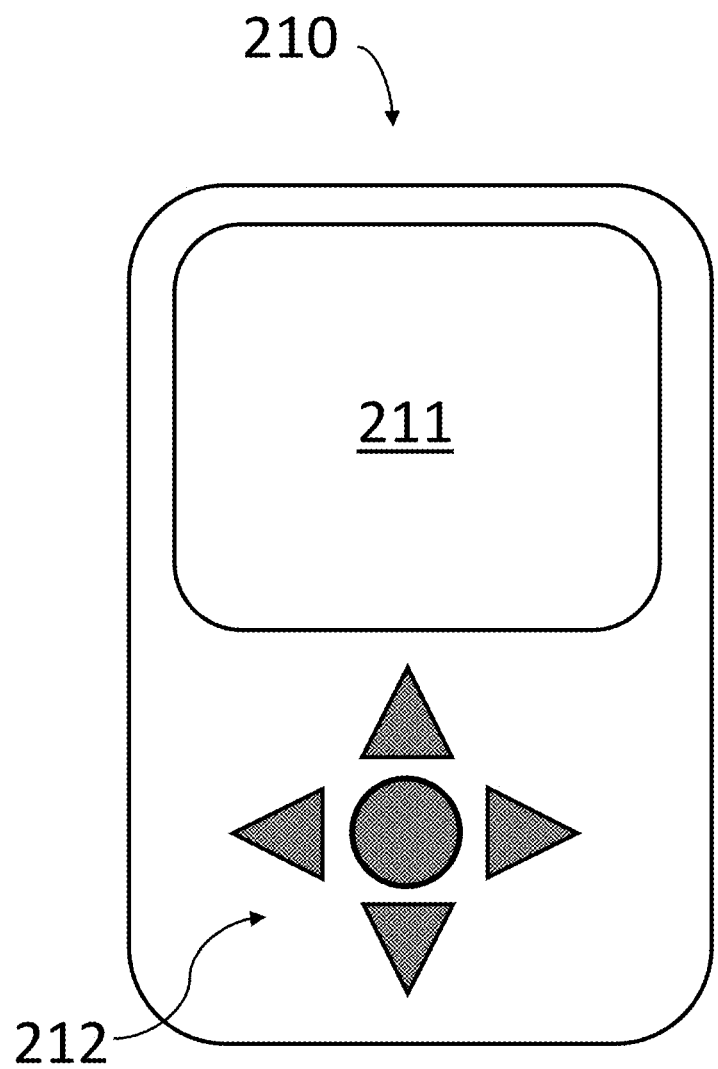
FIGS. 2B, 2C, and 2D are front plan views of handheld or laptop processor-based devices on which messages can be generated and transmitted, according to three respective illustrated implementations.

FIG. 2B shows a portable electronic device 210 which includes a display 211 and input buttons 212. The user can interact with the portable electronic device 210 using the input buttons 212. Portable electronic device 210 could be a device carried in the hand of a user, or could be worn on the user's body in any number of ways. For example, portable electronic device 210 could be strapped to a user's wrist, thus functioning as a smart watch.

Figure 2C:
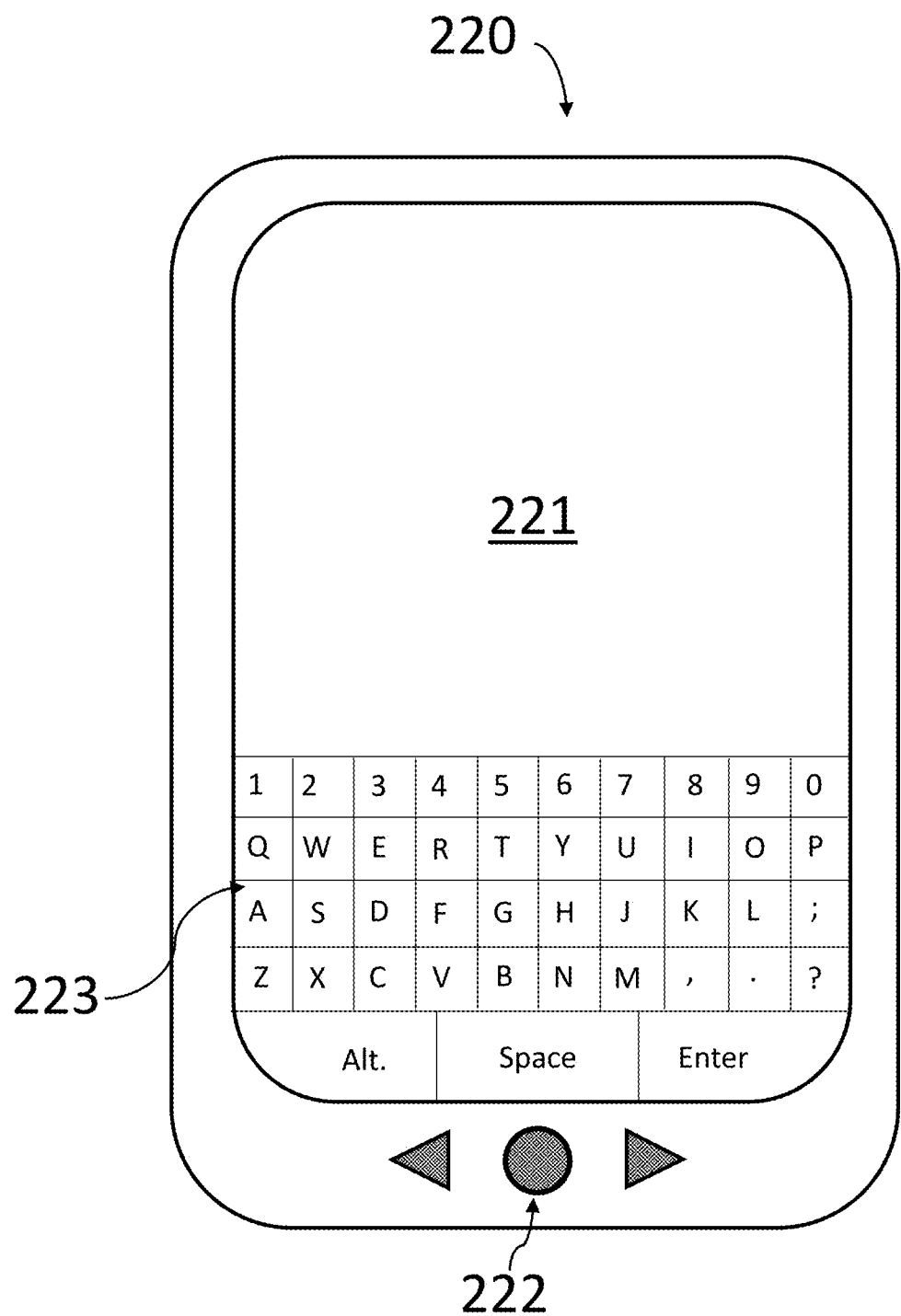

FIG. 2C shows a smartphone 220 which includes a touchscreen display 221. The user of the smartphone 220 can provide text input using the keyboard 223 displayed on the touchscreen display 221. Optionally, the smartphone 220 may also include input buttons 222.

Figure 2D:
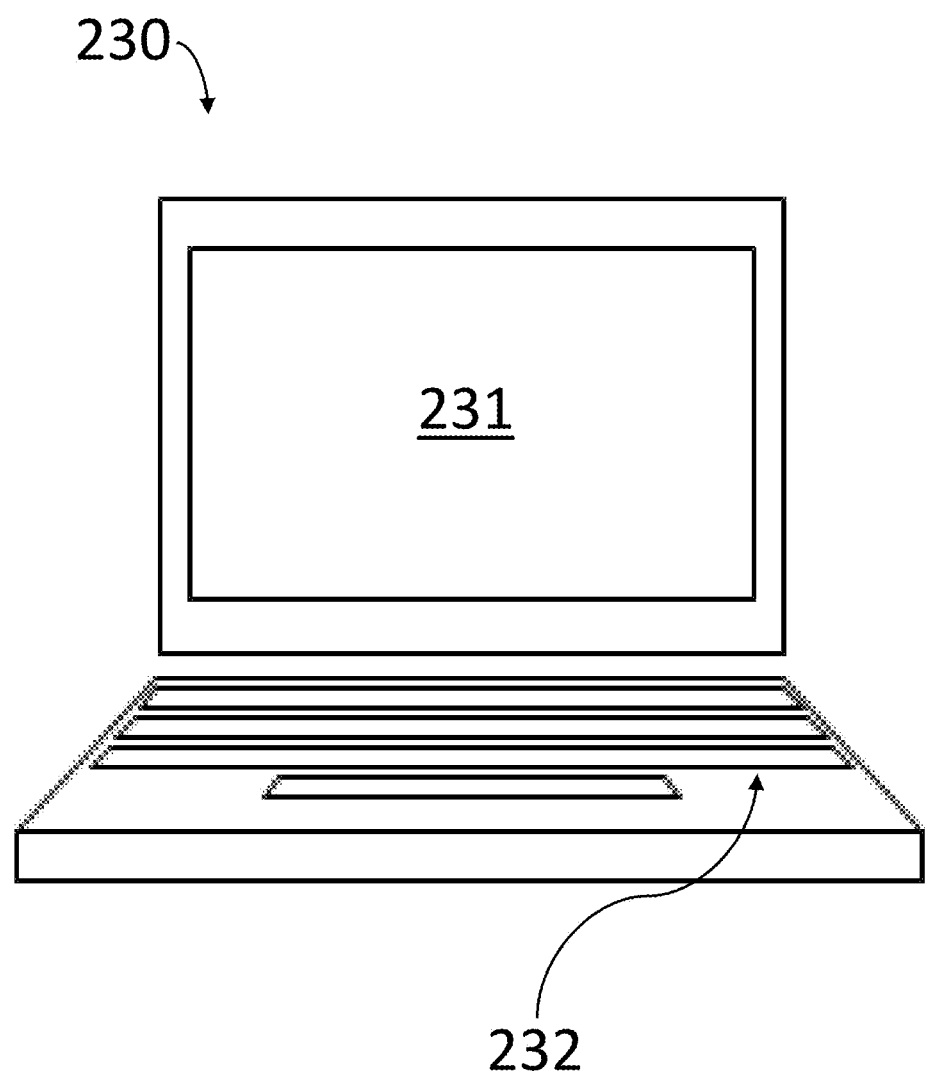

FIG. 2D shows a laptop computer 230 which includes a display 231 and keyboard 232. The user can interact and provide text to the laptop via the keyboard 232, among other possible inputs such as a trackpad or peripheral mouse.

Although not specifically denoted in the above figures, the systems of FIGS. 2A-2D each include at least one processor, a non-transitory processor-readable storage medium, and a wireless communications module. Further, features illustrated and described with reference to FIGS. 1A, 1B, and 1C, such as the user input mechanisms, output devices, and sensors, could be implemented in any of the devices of FIGS. 2A-2D.

Figure 3A:
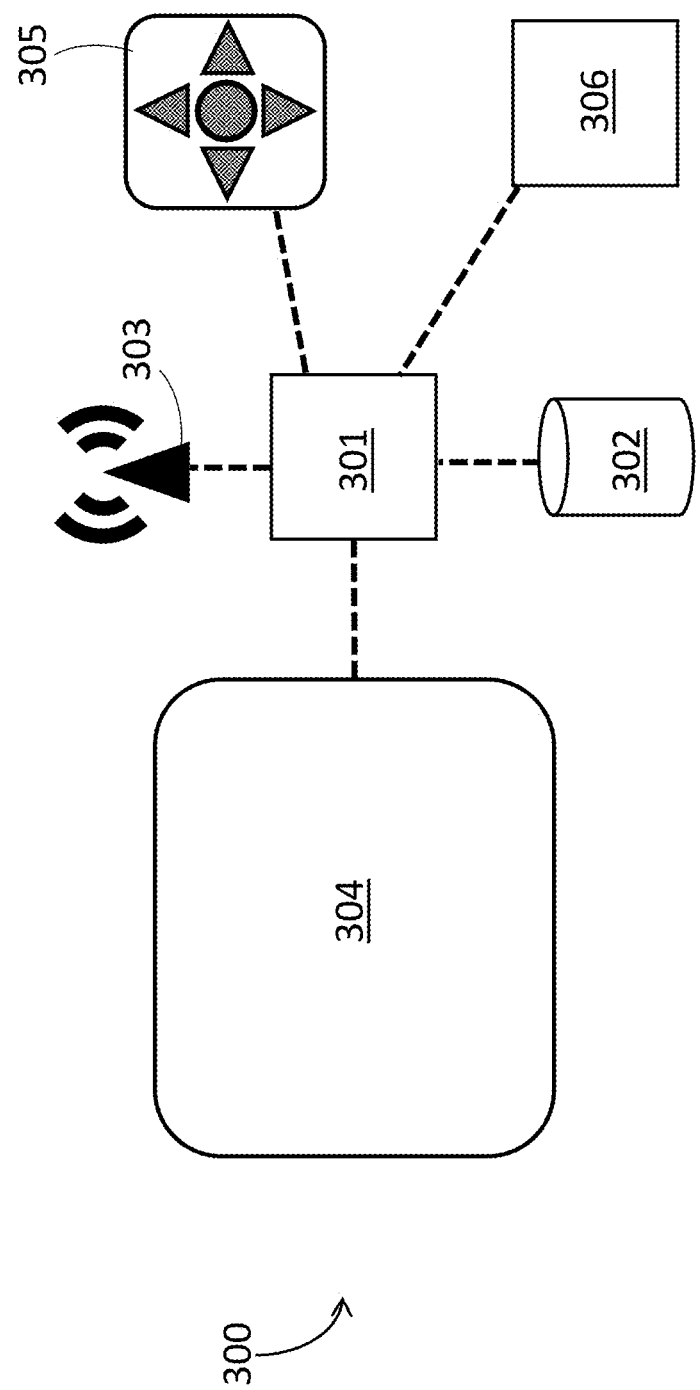
FIG. 3 is a schematic diagram that illustrates an example of a system which is used for reference to describe the subject systems, devices, and methods, according to at least one illustrated implementation.

FIG. 3 illustrates an exemplary first system 300 that will be referenced when describing the illustrative implementations of methods, systems, and devices below. FIG. 3 shows a system 300, which includes at least one processor 301, a non-transitory processor-readable storage medium 302, a wireless communications module 303, at least one output device 304, a user input mechanism 305, and optionally one or more sensors 306. Output device 304 could for example comprise a display device, an audio output device, or both. The inclusion of any sensors 306 is optional, and could include for example any of the sensors discussed with reference to FIG. 1C, such as microphone 181, camera 182, inertial measurement unit ("IMU") 183, eye-tracking system 184, proximity sensors 185, location sensor 186, and any other sensor as appropriate for a particular application. Further, user input mechanism 305 could be a sensor of the one or more sensors 306. As an example, user input mechanism 305 could comprise a microphone which can receive instructions from a user. Alternatively or additionally, user input mechanism 305 could be a dedicated input device, such as a touchpad or buttons. The system 300 in FIG. 3 is representative of any of the exemplary hardware arrangements illustrated in FIGS. 1A, 1B, 1C and 2A-2D, as well as any other suitable hardware arrangements including at least one processor, a non-transitory processor-readable storage medium, a wireless communications module, an output device, and a user input mechanism. The at least one processor can be any suitable component which can execute instructions or logic, including but not limited to a microcontroller, microprocessor, multi-core processor, integrated-circuit, ASIC, FGPA, programmable logic device, or any appropriate combination of these components. The non-transitory processor-readable storage medium can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The wireless communications module can be any suitable component which can transmit signals wirelessly for reception by other device. The wireless communications module could also be for example a radio or a transceiver, capable of receiving signals in addition to sending signals.

Although the term "system 300" used hereinafter can refer to a single physical device where all the components are included in the same housing, "system 300" can also refer to systems which have multiple physically separate components housed separately. Further, the connections shown between components of system 300 can be either wired or wireless connections. For example, even though system 300 is shown as including user input mechanism 305, this still encompasses hardware arrangements like that shown in FIG. 1A, in which the user input mechanism is a control ring 120 that is a physically separate piece of hardware from the WHUD 110. Similarly, system 300 is also representative of hardware arrangements like those shown in FIG. 1B. For example, at least one processor 301, non-transitory processor-readable storage medium 302, output device 304, user input mechanism 305, and sensors 306 can all be carried by a WHUD, but wireless communications module 303 can be carried on a peripheral device such that communication between wireless communications module 303 and at least one processor 301 is wireless (such as Bluetooth®, Zigbee®, or similar), such that at least one processor 301 uses wireless communications module 303 carried on a different device as a gateway to a larger network, such as the Internet, As another example, system 300 is also representative of alternative implementations of FIG. 1B such as implementations in which the at least one processor 301 can be located on a different piece of physical hardware from output device 304. Particularly, at least one processor 301, non-transitory processor-readable storage medium 302, and user input mechanism 305 could all be carried on a band which is wearable on a user's arm, and communicate with a WHUD which in use is carried on the head of a user and includes output device 304. Additionally, although the user input mechanism 305 is shown as a plurality of directional buttons and a confirm button, one skilled in the art will appreciate that any appropriate user input mechanism can be used, including a touchscreen, a touch-sensitive trackpad, a track wheel, switches, and/or a gesture detection system as described in, for example, U.S. Non-Provisional patent application Ser. No. 14/520,081, U.S. Non-Provisional patent application Ser. No. 14/567, 826, or U.S. Non-Provisional patent application Ser. No. 14/737,081, all of which are incorporated by reference herein in their entirety.

Figure 4:
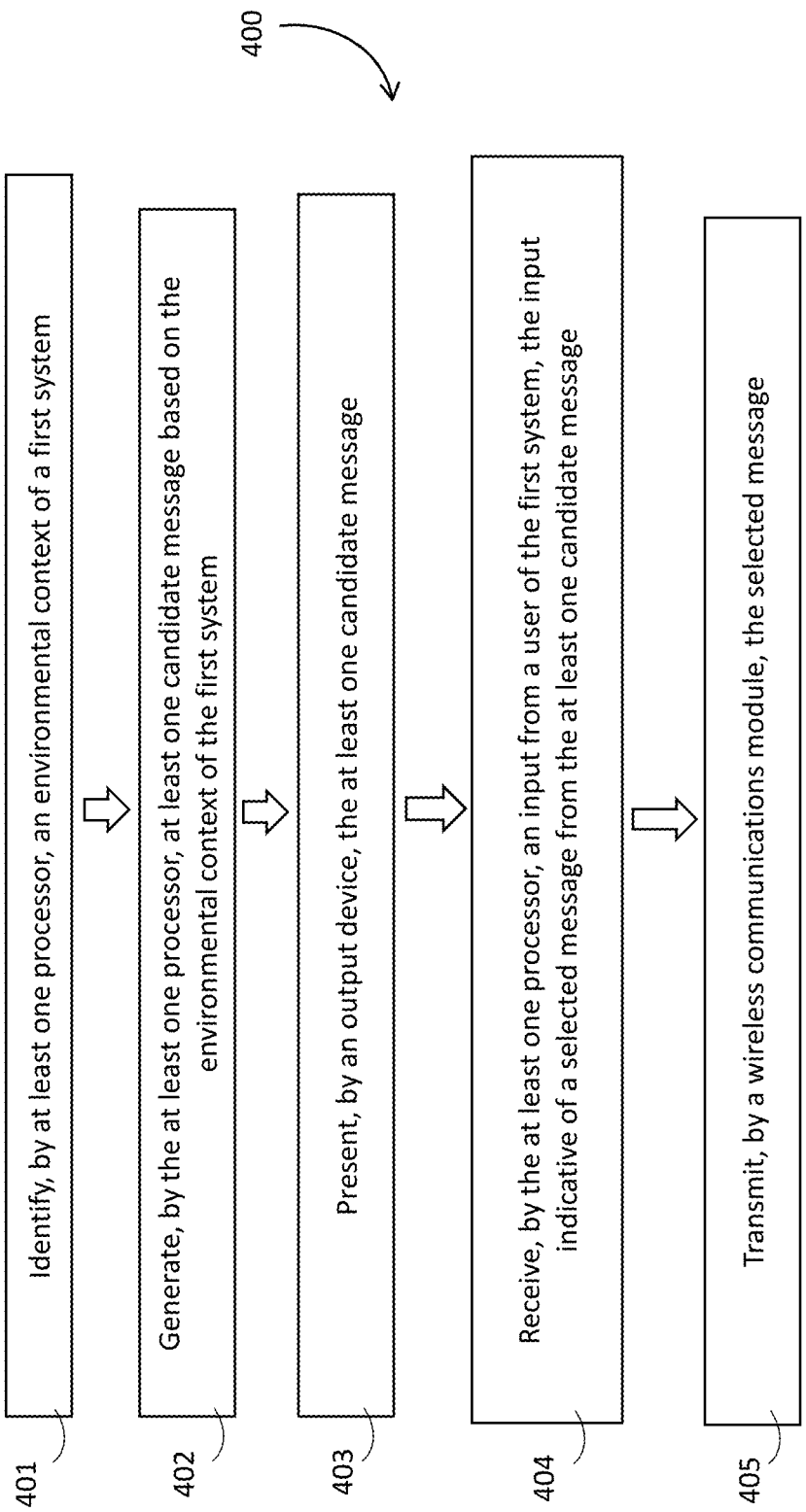
FIG. 4 is a flow diagram that illustrates an exemplary method for generating a message, according to at least one illustrated implementation.

FIG. 4 is a flowchart which illustrates an exemplary method 400 in accordance with the present disclosure. Although method 400 is described with reference to system 300 shown in FIG. 3, method 400 is equally applicable to any hardware arrangement having at least one processor, a non-transitory processor-readable storage medium, a wireless communications module, an output device, and a user input mechanism. Method 400 can be embodied as a set of processor-executable instructions stored on the non-transitory processor-readable storage medium 302, which can be executed by the at least one processor 301. Method 400 includes 5 acts 401, 402, 403, 404, and 405, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 401, the at least one processor 301 identifies an environmental context parameter. As is discussed in more detail below, an environmental context parameter refers to data which represents environmental context of system 300 or of a user of system 300, which may have relevance to the content included in a message and/or relevance to selection of a recipient or recipients of a message. At 402, the at least one processor 301 generates at least one candidate message based on the environmental context parameter. At 403, the output device 304 presents the at least one candidate message to the user. At 404, the at least one processor 301 receives an input from the user indicative of a selected message from the at least one candidate message. At 405, the wireless communications module 303 transmits the selected message from the first system, to be received by one or a plurality of other systems or devices. Each of these acts is discussed in more detail below.

As discussed above regarding FIG. 1B, although it is possible to perform all of the acts of methods herein on a single device, it is also possible to remove some of the hardware from the device (such as a WHUD), and utilize a peripheral device comprising said hardware instead, in order to reduce bulk in the display device. In the case of method 400, acts 401, 402, and 404 could be performed by a processor of a WHUD, act 403 could be performed by an output device of the WHUD, and act 405 could be performed by a wireless communications module of a peripheral device communicatively coupled to the WHUD, such that the processing and presenting acts are performed on the WHUD, and the peripheral device is used as a wireless transmission gateway. Alternatively, acts 401, 402, and 404 could be performed by at least one processor on a peripheral device, act 403 could be performed by an output device on a WHUD communicatively coupled to the peripheral device, and act 405 could be performed by a wireless communications module on the peripheral device, such that the peripheral device performs processing and transmission, whereas the WHUD performs displaying.

Identifying an environmental context parameter and generating at least one candidate message, such as in acts 401 and 402 of method 400, is discussed in more detail below. As mentioned above, an environmental context parameter refers to data which represents environmental context of system 300 or of a user of system 300, which may have relevance to the content included in a message and/or relevance to selection of a recipient or recipients of a message.

For example, system 300 can include a clock, and the environmental context parameter can include a current time of day as identified by at least one processor 301 based on an output of the clock. The at least one processor 301 may use the identified current time of day to generate a message which includes a greeting appropriate for a time of day. For example, the at least one processor 301 could generate a message which says "Good morning" if the clock outputs a current time which is before 11:00 AM. As another example, the at least one processor 301 could generate a message that says "Free for lunch?" if the current time output by the clock is between 10:00 AM and 12:00 PM.

The environmental context can also include a current date as identified by the at least one processor 301 based on the output of the clock. The at least one processor 301 may use the identified current date to generate a message which includes a greeting appropriate for the current date. For example, the at least one processor 301 could generate a message that says "Happy New Year!" if the current date output by the clock is January 1. As another example, the at least one processor 301 could generate a message that says "Looking forward to the weekend!" if the current date output by the clock corresponds to a Friday.

Identifying the environmental context parameter may also include the at least one processor 301 identifying a location of system 300 based on location data output by a location sensor on system 300. The at least one processor 301 may then generate at least one candidate message based on the identified location. For example, if the at least one processor 301 identifies that the user of system 300 is at a grocery store, the at least one processor 301 may generate a message like "I'm at the grocery store, need anything?". As another example, if the at least one processor 301 identifies that the user was stationary at a restaurant for a period of time, the at least one processor 301 may generate a message which incorporates information about the restaurant. For example, if the user was stationary at a restaurant called "Yum Food" for a period of over 20 minutes, the at least one processor 301 could generate a message like "I just ate at Yum Food, it was delicious!" The at least one processor 301 identifying the location of the user may involve the at least one processor 301 comparing map data to coordinates output by the location sensor of system 300 (for example GPS coordinates or coordinates determined by cell-phone tower triangulation, BLUETOOTH® (BT) beacons), in order to determine a venue or venues which match the position indicated by the coordinates output by the location sensor of system 300. Further, the at least one processor 301 can also account for arrival time at a venue and departure time from a venue. For example, if the user enters a movie theater at 2:00 PM, and leaves the movie theatre at 4:30 PM, the at least one processor 301 can generate a message like "I really enjoyed the movie." The at least one processor 301 may also retrieve additional information from other sources in order to generate a more detailed message. In the above example, the at least one processor could use the Internet to look up what movies were playing at the movie theatre between the user's arrival time and departure time, and generate a message including this information. For example, if "Great Movie 5" was playing from 2:15 PM to 4:15 PM, the at least one processor 301 could generate a message like "I just saw Great Movie 5, it was greater than the last one!" One skilled in the art will appreciate that the above time frames are merely exemplary, and could be any appropriate times as required by a specific application. This process can be performed completely by the at least one processor 301, or can be performed by a remote server, or may implement a third party service such as Pilgrim by Foursquare®. The map data can be stored on the non-transitory processor-readable storage medium 302, or may be stored on a remote server accessible to the system 300. Alternatively, if the system 300 uses a remote service to identify the location of the user, the map data may not need to be accessible to the system 300 at all, and identification of the location of the user may happen remotely.

Additionally, the environmental context can also include data stored in a calendar accessed by system 300. The calendar can be stored on the non-transitory processor-readable storage medium 302 of system 300, or may be stored elsewhere, such as on a remote server, which is accessed by system 300 over a network or the internet. After identifying the current time and date output by the clock, the at least one processor 301 may review the calendar for any relevant entries based on the current time and date, and generate a message based on at least one relevant calendar entry. The relevancy of a calendar entry can be assessed based on at least the start time of the entry, end time of the entry, name or description of the entry, priority level of the entry, attendees related to the entry, or any other suitable criteria. For example, the at least one processor 301 may identify that the user has a meeting scheduled in the calendar starting in 10 minutes, and may generate helpful messages like "Running late, start without me", or "See you in 10 minutes". As another example, the at least one processor 301 may identify that the user is currently in a meeting that is scheduled to end in 5 minutes, and may generate messages like "Wrapping up, I'll see you soon" or "We still have a lot to do, I will probably be late".

The calendar can include both one-time and recurring meetings, events, or tasks. The calendar can be populated manually, for example by the user manually inputting an event, or can be populated by machine learning. For example, if the user sends a message like "Picking up the kids" at 3:30 PM one day from a given location, the at least one processor 301 may associate that location and time with picking up the kids. Subsequently, the next time the user accesses system 300 near the same location at a similar time, the at least one processor 301 may autonomously generate a message like "Picking up the kids". As a further example, the at least one processor 301 could generate a message that says "On my way home" if the time is close to the time at which the user typically departs from work. This typical departure time could have been manually input by the user during configuration of system 300, or system 300 could use machine learning based on a location sensor (e.g., GPS receiver) in system 300 and/or messaging history, to learn the user's travel patterns over time and determine when the user typically goes home.

The at least one processor 301 may also generate candidate messages based on social norms. For example, if a clock of system 300 outputs that it is currently Friday afternoon, the at least one processor 301 may generate candidate messages like "It's Friday, let's go grab some beers!". Data relating to social norms can be stored on a non-transient processor-readable storage medium 302 of system 300, or can be stored on a remote server accessible to system 300.

Identifying the environmental context parameter may also include the at least one processor 301 identifying the weather relevant to the user. For example, the at least one processor 301 may access an online weather forecast for the current time and date as output by the clock of system 300, and for the region surrounding the location of system 300 as output by a location sensor of system 300. The at least one processor 301 may then generate at least one candidate message based on the current weather. For example, as the user is leaving their house in the morning, the at least one processor 301 may determine that the weather is particularly cold that day, and generate a candidate message like "It's really cold today, make sure to dress warm" to send to the spouse or children of the user. Further, identifying the weather does not need to be limited to the current weather, but can also include future predicted weather. For example, if the user is at work, and there is heavy rain forecasted for the time frame when the user typically heads home, the at least one processor 301 can generate a candidate message like "It's supposed to rain really hard this afternoon, I'll probably be home a little late" intended for the spouse or children of the user. Further still, identifying the weather does not need to be limited to identifying the weather in the immediate region of system 300, but can also include other regions relevant to the user. For example, if the user is at work, and there is heavy hail forecasted in the region of the user's home, the at least one processor 301 may generate a candidate message like "Heavy hail forecasted for this afternoon, make sure to put your car in the garage" directed towards the spouse or children of the user.

Identifying the environmental context parameter may also include the at least one processor 301 identifying the physical environment of the user and/or a current activity being performed by the user. For example, system 300 may include a physical environment sensor 306, such as a camera or microphone, in order to capture data indicative of the physical environment of the user. Such a camera may capture visual data indicative of the physical environment of the user. Alternatively or additionally, a microphone of system 300 may capture audio indicative of the of user's physical environment. The at least one processor 301 can analyze this data indicative of the user's physical environment to determine the physical environment of the user, and potentially a current activity being performed by the user, as discussed in the several examples below. The camera and/or microphone could be carried, for example, on a support structure to be worn on the head of a user, such as a WHUD. Alternatively, if the system 300 does not include a support structure to be worn on a head of a user, the camera and/or microphone can be carried on any appropriate component in system 300, such as on a smartphone, smartwatch, or control ring. The at least one processor 301 can also be carried by the support structure, or can be included in a separate peripheral device, as described above regarding FIG. 1B, for example.

For example, the at least one processor 301 may determine that the physical environment of the user is the inside of a vehicle, and that the user is currently driving, and generate a message like "I'm driving now, I'll call you later", or "Driving home, see you soon." The at least one processor 301 may determine that the user is in a vehicle and driving using many different techniques, for example: analyzing the user's visual surroundings based on images or video captured by at least one camera of system 300 and detecting key features of a vehicle such as a steering wheel, rear view mirrors, or side mirrors, among other features; analyzing the user's auditory surroundings based on audio captured by at least one microphone of system 300, such as to detect the sound of a vehicle engine, the sound of wind passing by the vehicle, or the sound of traffic, among others; analyzing the user's speed and/or acceleration as captured by an inertial motion unit and/or GPS sensor of system 300; or any combination of the above. Further, the above techniques are not limited to driving a motor vehicle, but can include operation of any number of vehicles including for example a car, van, truck, bus, tractor, scooter, moped, motorcycle, airplane, helicopter, boat, ship, vessel, bicycle, or unicycle. Exemplary techniques for detecting when a user is operating a vehicle, and appropriate actions to take upon such detection, are described in at least U.S. Provisional Patent Application Ser. No. 62/750,060.

As another example of a current activity of the user which could be identified by the at least one processor 301, the at least one processor 301 could determine that the user is sitting at their desk working. This could be determined for example by the at least one processor 301 analyzing the user's visual surroundings based on images or video captured by at least one camera of system 300 and detecting key features like a computer monitor, and/or by the at least one processor 301 determining that the user is stationary based on the output of a location sensor of system 300. If the at least one processor 301 identifies that the user is currently working at their desk, but identifies that the time is currently past the time at which the user typically departs work based on the output of a clock of system 300, the at least one processor 301 may generate a candidate message like "Still at work, I'll be home late" directed towards a spouse of the user.

As another example of a current activity of the user which could be identified by the at least one processor 301, the at least one processor 301 could determine that the user is eating, such as by the at least one processor 301 analyzing the user's visual surroundings based on images or video captured by at least one camera of system 300 and detecting food in front of the user. The at least one processor 301 could further identify what food the user is eating based on the captured images or video, and identify where the user is eating based on an output of a location sensor of system 300 as discussed above. If the user is eating spaghetti at a restaurant called "The Best Pasta", the at least one processor 301 could generate a candidate message like "The spaghetti at The Best Pasta is delicious!".

Further, the current activity of the user is not limited only to activities which can be identified by using a camera or microphone to identify a physical environment of the user, but can also include any activity which can be identified by the at least one processor 301 based on data from any input sensors carried by system 300. As non-limiting examples of input sensors, system 300 may include at least one of an electromyography sensor, a mechanomyography sensor, an accelerometer, a gyroscope, an electrocardiography sensor, a photoplethysmography sensor, a blood pressure sensor, a global positioning system sensor, a compass, an eye-tracking sensor, or any combination of these sensors together.

As a further example of a current activity of the user which could be identified by the at least one processor 301, the at least one processor 301 could determine that the user is currently exercising, based on at least a heartrate of the user detected by an electrocardiography sensor or photoplethysmography sensor, blood pressure detected by a blood pressure sensor, muscle activations detected by an electromyography sensor and/or mechanomyography sensor, or state of arousal detected by an eye-tracking sensor detecting pupil dilation. The at least one processor 301 could then generate a message like "Working out, I'll call you soon", or "Pumping iron, I'm awesome!". Further, the input sensors do not necessarily have to be carried by system 300 itself, but could instead be carried by an external sensing device. For example, system 300 could communicate with a sensing device such as a wearable FitBit® monitor which measures heart rate using a photoplethysmography sensor, or any similar device, to receive input sensor data from which to generate a message. In this example, the sensing device would detect input sensor data, such as a heart rate, and transmit this input sensor data to system 300. The at least one processor 301 of system 300 could then identify a current activity being performed by the user based on at least the input sensor data received from the sensing device, and generate at least one candidate message based on the current activity being performed by the user. However, system 300 could also be considered as including such a sensing device.

Identifying the current activity being performed by the user or in which the user is engaged may also include the at least one processor 301 utilizing eye tracking to determine a gaze direction of the user, in order to determine what the user is looking at, so that the at least one processor 301 can generate a message based on what the user is looking at. Exemplary hardware to achieve this goal could include a support structure, such as glasses frames or WHUD frames, to be worn on a head of a user. An eye tracking system can be carried by the support structure and can include, for example, an infrared light source which emits infrared light and an infrared photodetector which receives infrared light reflected from an eye of the user. Exemplary configurations for eye tracking can be found in for example U.S. Non-Provisional patent application Ser. No. 15/167,458, U.S. Non-Provisional patent application Ser. No. 15/827,667, and U.S. Provisional Patent Application Ser. No. 62/658,436, each of which are incorporated by reference herein in their entirety. One skilled in the art will appreciate that the eye tracking hardware need not be limited to infrared light and infrared detectors, but can utilize any appropriate systems or wavelengths of light. The eye tracking system may be paired with a camera on the support structure which captures at least one image of a view seen by a user of system 300. The at least one processor 301 can analyze the output from the eye tracking system and the image(s) captured by the camera carried by the support structure, in order to determine what the user is looking at. The at least one processor 301 may then generate at least one candidate message based on what the user is looking at. For example, if the at least one processor determines that the user is looking at the cheese section of a grocery store, the at least one processor 301 could generate a message like "Do you want mozzarella or cheddar?" The at least one processor 301 may also retrieve additional information from other sources, such as for example searching the Internet for information regarding what the user is looking at. As an example, if the user is looking at a poster for an upcoming movie called "Awesome Movie", the at least one processor 301 could search the Internet for the release date and nearby locations where "Awesome Movie" is playing, and generate a message like "Awesome Movie comes out this weekend, want to get tickets to see it downtown?"

Figure 5:
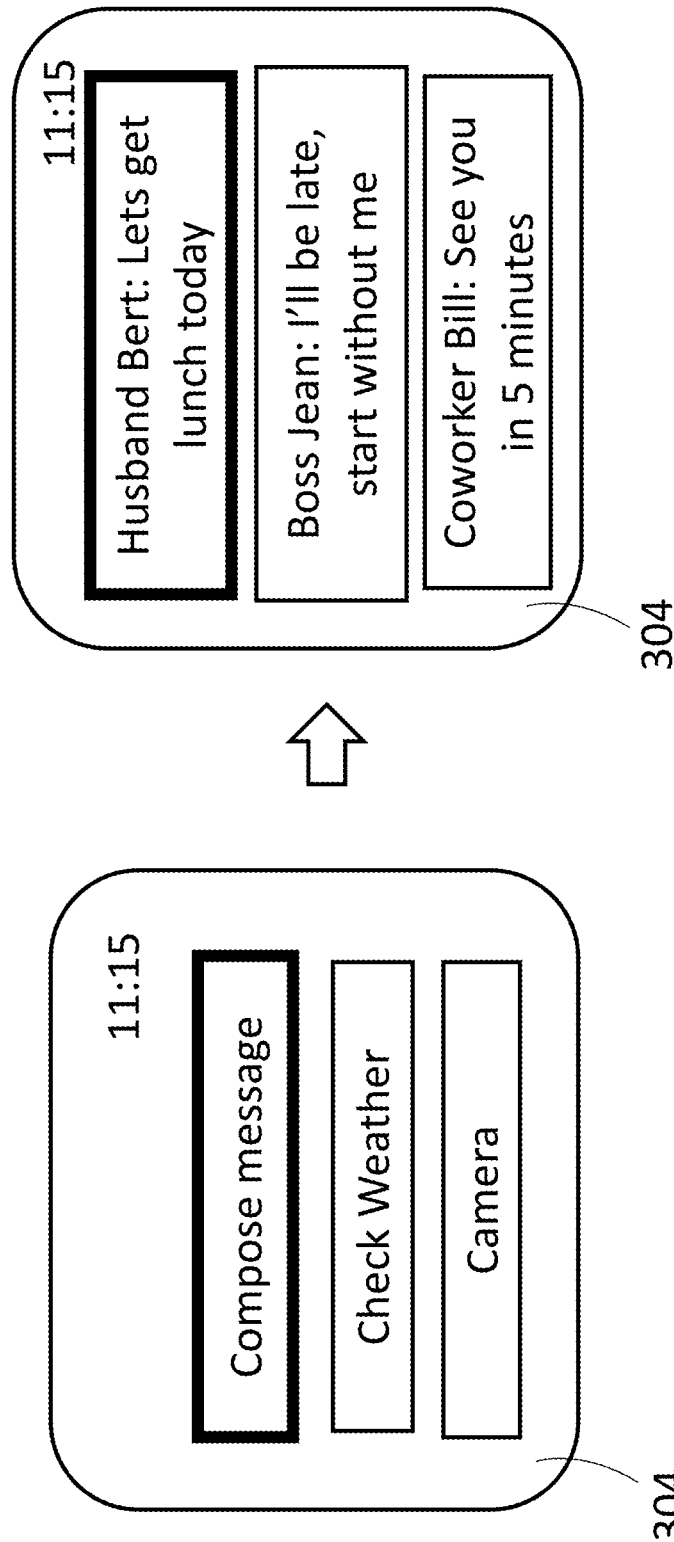
FIGS. 5A, 5B, and 6 are representations of user interfaces which display or present image representations including user selectable messages to a user in response to execution of the method of FIG. 4.
Figure 6:
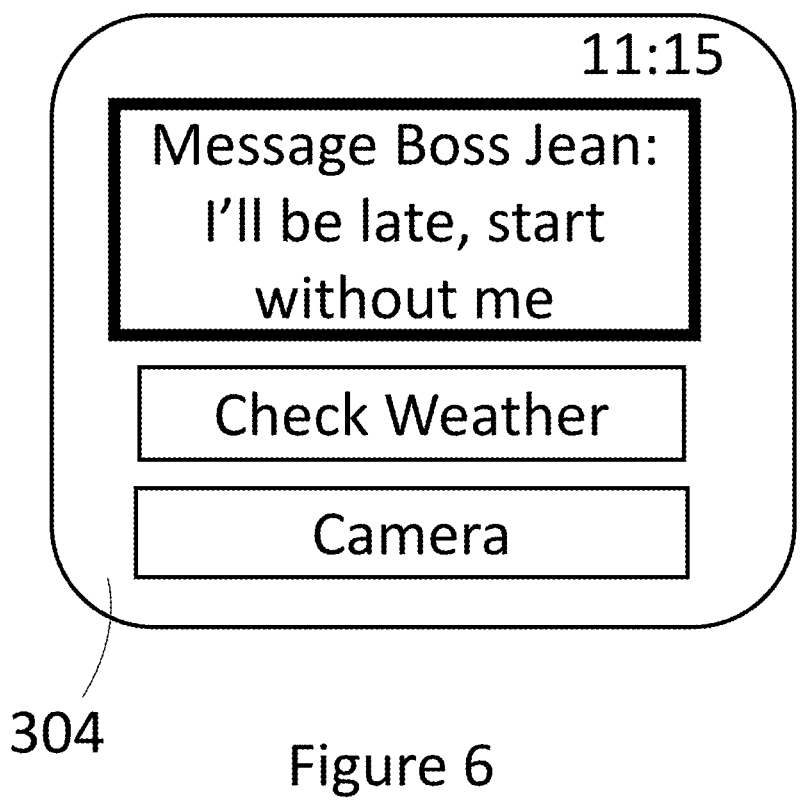

FIGS. 5A-B and 6 show exemplary implementations of user interfaces produced by the subject systems, devices, and methods which display or present image representations including messages to a user in response to execution of the method 400 (FIG. 4). In response to input (e.g., selections) received via the user interfaces, a user of system 300 can provide input through user input mechanism 305 to perform selection, such as in act 404 of method 400. For background, in the system shown in FIGS. 5A-B and 6, the user of system 300 has a calendar which has been synchronized with system 300, which includes an entry for a meeting with Boss Jean, Coworker Bill, and Secretary Ferdinand at 11:20. The current time is 11:15.

FIGS. 5A and 5B represent a sequence of displays or presentations of user interfaces including messages which can be shown or presented to the user, starting from FIG. 5A and proceeding to FIG. 5B. In these Figures, a user decides that they want to start a new communication, so they select a "Compose message" option or user selectable icon presented to the user (e.g., shown on the output device 304 of system 300) as illustrated in FIG. 5A. System 300 then autonomously generates at least one (preferably multiple) candidate messages for the user to choose from based on an environmental context parameter and presents these candidate messages (e.g., displays the candidate messages on display 304) as shown in FIG. 5B. In the case illustrated in FIG. 5B, system 300 generates two messages related to the user's upcoming meeting, and one message related to lunch plans. In the implementation of FIGS. 5A, 5B, a recipient of each candidate message is determined autonomously by the system 300, and paired with the respective candidate message. In this way, the user can advantageously select both the candidate message and the recipient simultaneously, such that the user can conveniently perform a single selection to indicate both the message and the recipient.

A recipient for each candidate message may be determined autonomously by the at least one processor 301 based on at least the environmental context parameter and/or the content of the complete message. Determining the recipient based on environmental context parameter can use any of the hardware, sensors, and techniques discussed above regarding determining the environmental context parameter. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. Further, the sensor(s) could be carried by the system 300, or could be carried by an external device communicatively coupled to system 300. As an example, the at least one processor 301 may determine that the user is currently exercising, based on at least a heartrate of the user detected by an electrocardiography sensor or photoplethysmography sensor, blood pressure detected by a blood pressure sensor, muscle activations detected by an electromyography sensor and/or mechanomyography sensor, or state of arousal detected by an eye-tracking sensor detecting pupil dilation. As a result, the at least one processor 301 may determine that the recipient of the complete message should be the user's fitness trainer. Additionally or alternatively, determining a recipient for each candidate message can be based on the content of the respective candidate message. For example, if a message says "Can you please pick up the kids at school?", the at least one processor 301 may determine that the recipient of the message should be a spouse of the user, since the content of the message relates to the user's family. Discussion below related to determination of a recipient is fully applicable to automatic determination of a recipient, as in FIGS. 5A-5B and 6.

FIG. 6 shows a compact implementation in which the user can select both a message to be sent and a recipient of the message with a single input, without the need to first select a "Compose message" option. System 300 generates at least one candidate message, pairs the at least one candidate message with a recipient, and presents the pairing on a home page of the output device 304 of system 300. The user may simply select the paired message and recipient, quickly and efficiently.

Figure 7:
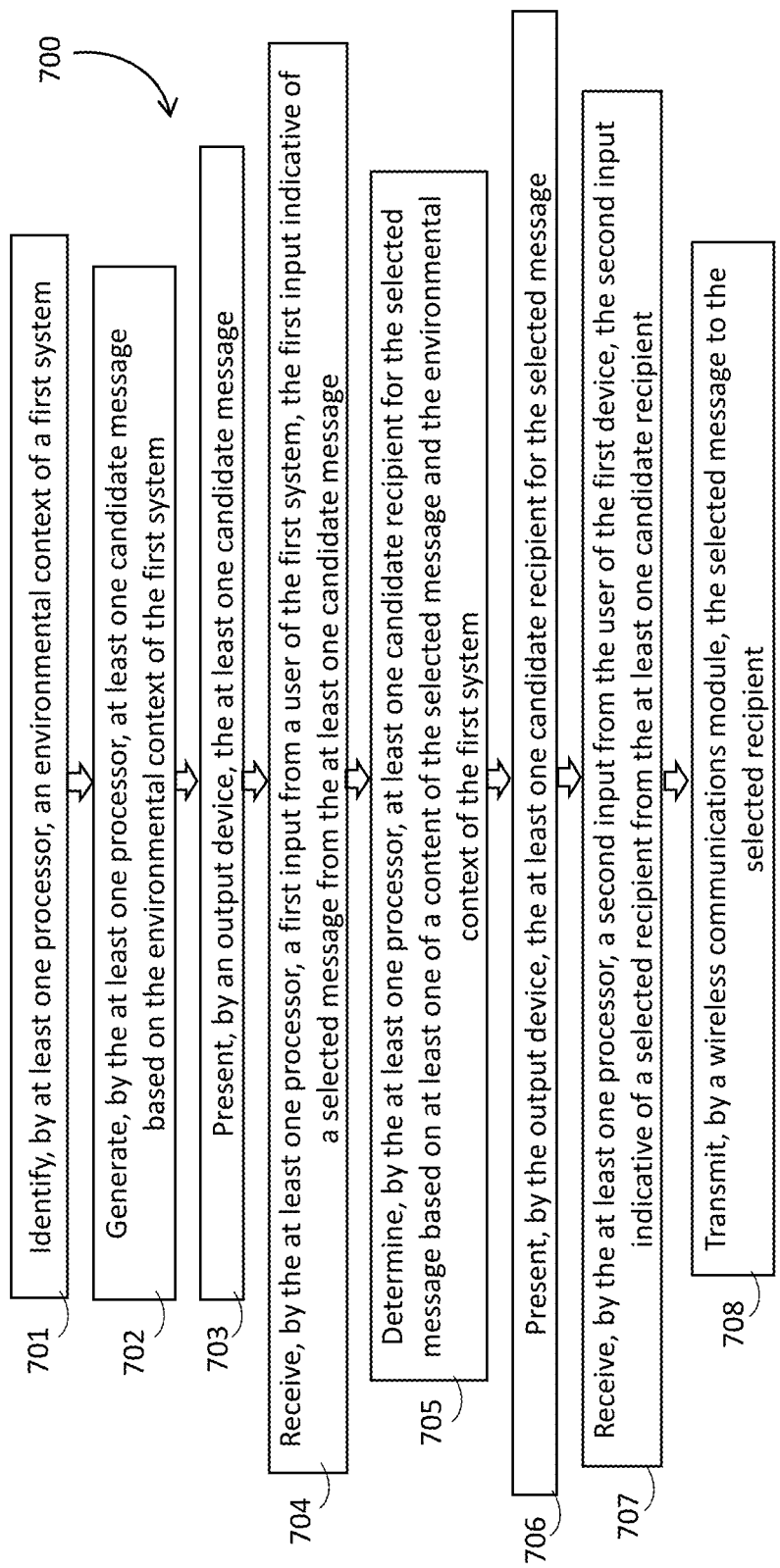
FIG. 7 is a flow diagram that illustrates an exemplary method for generating a message and generating candidate recipients for the message, according to at least one illustrated implementation.

FIG. 7 is a flowchart which illustrates an exemplary method 700 in accordance with the present disclosure. Although method 700 is described with reference to system 300 shown in FIG. 3, method 700 is equally applicable to any hardware arrangement having at least one processor, a non-transitory processor-readable storage medium, a wireless communications module, an output device, and a user input mechanism. Method 700 can be embodied as a set of processor-executable instructions stored on the non-transitory processor-readable storage medium 302, which can be executed by the at least one processor 301. Method 700 includes acts 701, 702, 703, 704, 705, 706, 707, and 708, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 700 is similar to method 400 but adds additional acts. Specifically, acts 701, 702, 703, and 704 of method 700 correspond to acts 401, 402, 403, and 404 of method 400, respectively, and thus the description above regarding acts 401, 402, 403, and 404 fully applies to method 700, and will not be repeated in the interest of brevity. The additional acts 705, 706 and 707 focus on determining a recipient for a selected message. Specifically, at 705, the at least one processor 301 determines at least one candidate recipient for the selected message based on at least one of a content of the selected message and the environmental context parameter. At 706, the output device 304 displays or presents the at least one candidate recipient for the selected message. At 707, the at least one processor 301 receives a second input from the user of system 300, the second input indicative of a selected recipient from the at least one candidate recipient. At 708, the wireless communications module 303 transmits the selected message from system 300 to the selected recipient.

As discussed above regarding FIG. 1B, although it is possible to perform all of the acts of method 700 on a single device, it is also possible to remove some of the hardware from the presentation device (such as a WHUD), and utilize a peripheral device comprising said hardware instead, in order to reduce bulk in the presentation device. In the case of method 700, acts 701, 702, 704, 705, and 707 could be performed by a processor of a WHUD, acts 703 and 706 could be performed by an output device of the WHUD, and act 708 could be performed by a wireless communications module of a peripheral device communicatively coupled to the WHUD, such that the processing and presenting acts are performed on the WHUD, and the peripheral device is used as a wireless transmission gateway. Alternatively, acts 701, 702, 704, 705, and 707 could be performed by at least one processor on a peripheral device, acts 703 and 706 could be performed by an output device on a WHUD communicatively coupled to the peripheral device, and act 708 could be performed by a wireless communications module on the peripheral device, such that the peripheral device performs processing and transmission, whereas the WHUD performs presenting.

Determining at least one candidate recipient based on the environmental context system 300, as in act 705, can utilize any of the data sources and sensors, as well as the techniques, discussed above with regards to generating at least one candidate message based on at least the environmental context parameter. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. Further, the sensor(s) could be carried by the system 300, or could be carried by an external device communicatively coupled to system 300.

Figure 8C:
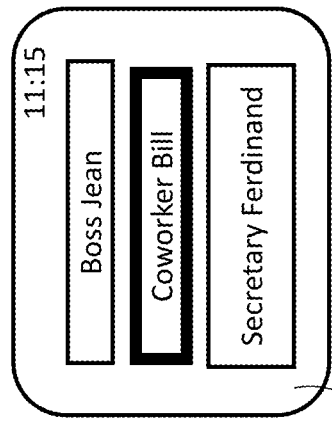
FIGS. 8A, 8B, 8C, 9A, and 9B are representations of user interfaces which present image representations including user selectable messages to a user in response to execution of the method of FIG. 7.
Figure 8B:
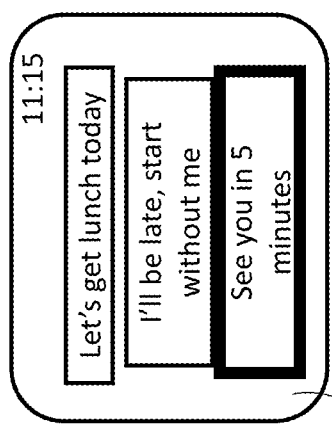

FIGS. 8A-8C and 9A-9B show exemplary implementations of user interfaces produced by the subject systems, devices, and methods which display or present image representations including messages to a user in response to execution of the method 700 (FIG. 7). In response to input received via the user interfaces, a user of system 300 can provide input through user input mechanism 305 to perform selection, such as in acts 704 and 707 of method 700. For background, in the system shown in FIGS. 8A-8B and 9A-9B, the user of system 300 has a calendar which has been synchronized with system 300, which includes an entry for a meeting with Boss Jean, Coworker Bill, and Secretary Ferdinand at 11:20. The current time is 11:15. In the implementation shown in FIGS. 8A-8C, a user decides that they want to start a new communication, so they select a "Compose message" user selectable icon shown on the output device 304 of system 300 in FIG. 8A. System 300 then autonomously generates at least one (preferably multiple) candidate messages for the user to choose from based on an environmental context parameter and displays or presents the generated candidate messages, e.g., displayed on display 304 as shown in FIG. 8B. In the case of FIG. 8B, system 300 generates two messages related to the user's upcoming meeting, and one message related to lunch plans. The user selects a message, and system 300 then displays a list of candidate recipients for the message on display 304. The list of recipients could be an alphabetical list of the user's contacts, but is preferably sorted and/or filtered based on the content of the selected message or the environmental context parameter in order to only display relevant recipients and/or display the most relevant recipients first. In the case of FIG. 8C, since the user chose a message related to the upcoming meeting, the candidate recipients are the people who are also scheduled for the upcoming meeting.

Figure 9B:
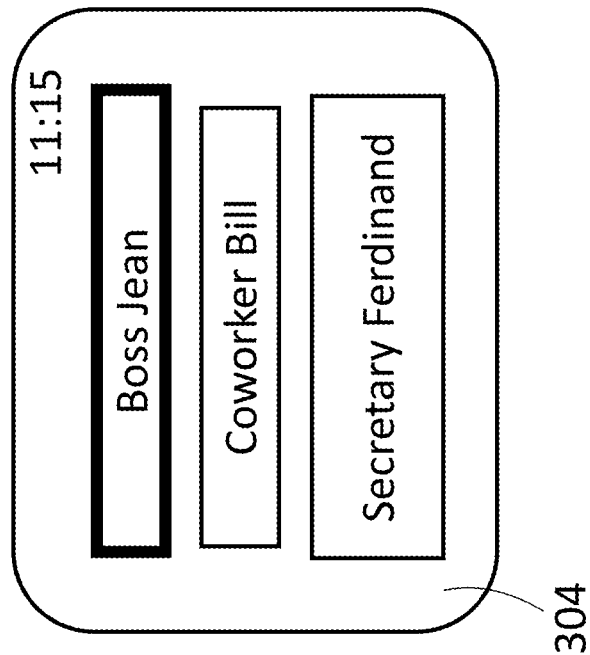
Figure 9A:
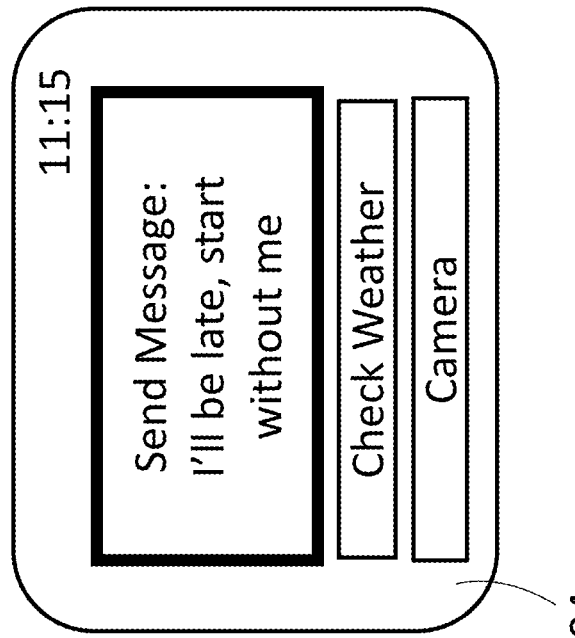

FIGS. 9A-B show a compact user interface in which the user can select a message to be sent without the need to first select a "Compose message" user selectable icon. Instead, at least one candidate message can be presented or displayed on a main or "home" page of the output device 304 of system 300 as shown in FIG. 9A, allowing the user to quickly select the message to send. Subsequently in FIG. 9B, at least one candidate recipient for the selected message is presented or displayed on the output device 304 for the user to select.

Specific examples of how the at least one candidate recipient can be determined based on the environmental context data of system 300 are discussed in more detail below, and are fully applicable to the determination of candidate recipients as in FIGS. 7, 8A-8C, and 9A-B.

If the acts of method 700 are performed in the order shown in FIG. 7, at 705, the at least one candidate recipient can be determined based on not only the environmental context parameter, but also on the content of the selected message, since the at least one recipient is determined after the message is selected. For example, with reference to FIG. 8B, if the user selects the "See you in 5 minutes" message, referring to a meeting scheduled in a calendar accessible by system 300, the at least one processor 301 of system 300 could determine that since the content of the message is related to the meeting, the most relevant recipients will be other people scheduled to attend the meeting. Thus, the at least one processor 301 accesses the calendar (i.e., data indicating environmental context parameter), determines who else is scheduled to attend the meeting, and displays a list of user selectable icons corresponding to respective candidate recipients which includes the other attendees of the meeting. As another example, if the user selects a message like "Driving now, see you soon", the at least one processor 301 can analyze which person or persons the user is heading towards, in order to determine at least one appropriate recipient or candidate recipients. For example, the at least one processor 301 could receive the outputs of at least a location sensor (e.g., GPS receiver), accelerometer, and a compass, to determine that the user is heading away from their workplace towards their home, and decide that residents of the user's home such as a spouse or children should be candidate recipients of the message.

One skilled in the art will appreciate that in the context of method 700, certain acts may be omitted and/or additional acts may be added. Those of skill in the art will also appreciate that the illustrated order of the acts is shown for exemplary purposes only and may be changed.

In one such reordered method, method 700 can be reordered such that the acts are performed in the order: 701, 705, 706, 707, 702, 703, 704, 708. This order of acts could correspond to the sequence of user interfaces shown in FIGS. 10A-10C, in which at least one candidate recipient will be determined, and a recipient selected by the user, before generation of at least one candidate message. In response to the user interfaces, a user of system 300 can provide input through user input mechanism 305 to perform selection, such as in acts 704 and 707 of method 700. For background, in the implementation illustrated in FIGS. 10A-10C, the user of system 300 has a calendar which has been synchronized with system 300, which includes an entry for a meeting with Boss Jean, Coworker Bill, and Secretary Ferdinand at 11:20. The current time is 11:15. Because the at least one candidate recipient must be determined before the at least one candidate message is generated, the at least one processor 301 will not be able to use content of the candidate message to determine at least one candidate recipient. The list of candidate recipients could be a list of all of the user's contacts, but is preferably filtered and/or sorted to display the most relevant candidate recipients first based on at least an environmental context parameter. In FIG. 10B, for example, since the user has a meeting scheduled in 5 minutes, other scheduled attendees of the meeting are displayed. Further, the user's husband Bert could be displayed, either because system 300 assigns a high priority to close contacts like spouses, and/or because the user tends to message their husband Bert frequently or recently. Once the user selects their husband Bert as the recipient of the new message, system 300 autonomously generates at least one, preferably multiple, candidate messages and presents these candidate messages on display 304 for the user to choose from. Since husband Bert was selected as the recipient of the new message, system 300 will generate messages that are pertinent to husband Bert, such as a lunch invitation, rather than irrelevant messages such as those that would be related to the user's upcoming meeting.

As further examples, the at least one candidate recipient can be determined based on the environmental context parameter. For example, if the at least one processor 301 determines that the user is currently exercising based on at least one of a heartrate of the user detected by an electrocardiography sensor or photoplethysmography sensor, blood pressure detected by a blood pressure sensor, muscle activations detected by an electromyography sensor and/or mechanomyography sensor, or state of arousal detected by an eye-tracking sensor detecting pupil dilation, the at least one processor 301 may determine that only people with non-professional relationships to the user may be candidate recipients for a message. For example, the at least one processor 301 may determine that only personal friends of the user, not work colleagues, are candidate recipients for a message. Further, the at least one processor 301 can make more accurate determinations of candidate recipients based on the amount of data available regarding the user's contacts. For example, if the user has a contact like "Personal Trainer Herbert", the at least one processor 301 could determine that Personal Trainer Herbert is very likely an appropriate recipient of a message when the user is exercising.

As an additional alternative, acts 703 and 706 may be performed substantially simultaneously or concurrently, and acts 704 and 707 may be performed substantially simultaneously or concurrently. This alternative implementation could correspond to the implementation shown in FIGS. 5A-5B or the implementation shown in FIG. 6, in which a candidate message is generated and a candidate recipient is determined, for simultaneous presentation or display to the user. The user can then select the paired message and recipient with a single input. One skilled in the art will appreciate that acts 702 and 705 do not necessarily have to be simultaneous or concurrent. Rather, the at least one processor 301 could generate the candidate messages first, and determine a recipient for each of the candidate messages based on at least one of a content of the candidate message and the environmental context parameter, then the output device 304 could present or display both the candidate messages and the paired recipients simultaneously or concurrently. The at least one processor 301 could then receive an input from the user simultaneously selecting both a message and recipient. Similarly, the at least one processor 301 could determine at least one candidate recipient first, then generate candidate messages for each candidate recipient based on at least one of the environmental context parameter and the relationship between the user and respective candidate recipient, then the output device 304 could present both the candidate recipients and the paired candidate messages simultaneously or concurrently. The at least one processor 301 could receive an input from the user simultaneously selecting both a recipient and a message.

In addition to the many possibilities which can be included in identifying the environmental context data of system 300, identifying the environmental context parameter may also include the at least one processor 301 analyzing a messaging history of system 300. For example, in the implementations where the message is generated before the recipient is determined, such as those shown in FIGS. 8A-8C and 9A-9B, after the user selects the message and the recipient, the at least one processor 301 may analyze the communication history between the user and the selected recipient. In particular, the at least one processor 301 may analyze the messages sent between the user and the recipient, to determine a communication vernacular typically used between the user and recipient. For example, if the user and recipient are close friends, the message history will likely include messages with a casual conversation tone. On the other hand, if the recipient is the user's employer, the message history will likely include messages with a professional tone. After analyzing the communication vernacular between the user and the recipient, the at least one processor 301 may autonomously modify the selected message based on the communication vernacular. For example, if the user selected a message which uses formal language like "Would you like to eat lunch together today?", and selected a recipient of "Best friend Willard", the at least one processor 301 could review the message history between the user and Willard, and discover that the user and Willard frequently communicate with casual slang or colloquially. The at least one processor 301 could then autonomously modify the message to use casual language like "Wanna grab some grub bro?".

Alternatively, in the implementations where the recipient is determined before the message is generated, such as those of FIGS. 10A-10C, the at least one processor 301 can analyze the message history between the user and the selected recipient to determine an appropriate communication vernacular, and can utilize the determined vernacular when generating the at least one candidate message.

Analyzing the message history between the user and a candidate or an intended recipient of a message as discussed above can include the at least one processor 301 analyzing a plurality or all of the messages previously sent between the user and the candidate or intended recipient, including messages sent from the user to the candidate or intended recipient, as well as messages sent from the candidate or intended recipient to the user. However, the at least one processor 301 can also determine that the message most recently received by the user should be ignored. For example, current messaging systems sometimes incorporate a "smart reply" feature, in which when a device receives a message, the device attempts to interpret the message and prepare a few replies which the user may want to use as a response. However, these systems are limited only to analyzing a single message, and also do not adjust the prepared replies based on how long ago the message was received. In the present systems, devices, and methods, the at least one processor 301 can selectively choose to disregard the most recently received message or plurality of messages when generating messages, for example by determining that the most recently received message or messages are too old to be relevant. This decision can be based on at least the content of the message or messages, and/or the environmental context parameter. For example, if a user receives a message like "Have a nice day!" at 8:30 AM from their spouse, a typical smart reply system would generate replies like "You too!" or "Thanks!", even if the user does not decide to send a message until 5:00 PM that night when they are heading home. At 5:00 PM, there is little meaning to responding to the message that was received at 8:30 AM, and the user will likely want to send a message related to a new topic, like "I'm heading home now, see you in 45 minutes." The at least one processor 301 in the present disclosure can achieve this, by identifying the amount of time that has lapsed since the last message was received based on an output of a clock of system 300. As an example, the at least one processor 301 could determine that a smart reply should not be generated for any message that was received more than four hours ago, and the at least one processor 301 should instead focus on generating new messages.

One skilled in the art would understand that four hours is merely an exemplary time frame, and that this time frame could be adjusted to any appropriate amount of time as determined by one skilled in the art for a specific application. Alternatively, the present systems, devices, and methods can also include a mechanism for evaluating a relevance persistency of the most recently received message, wherein the at least one processor 301 identifies at least a content of the most recently received message, and adjusts the time frame for which a smart reply will be generated based on at least the content of the most recently received message. As an example, if the at least one processor 301 identifies the content of the most recently received message as just being a simple greeting, the at least one processor 301 may generate smart replies to the greeting until two hours have elapsed since the greeting was received, after which the at least one processor 301 will disregard the greeting and generate new messages. As another example, if the at least one processor 301 identifies the content of the most recently received message as being a request to set up an appointment, the at least one processor 301 may generate smart replies indefinitely until the user has responded to the appointment request, or until the time and date for the requested appointment have passed.

Identifying the environmental context parameter may also include the at least one processor 301 identifying a relationship between the user of system 300 and the recipient of the message. For example, the at least one processor 301 may determine that the user has a casual or professional relationship with the recipient based on the determined communication vernacular as discussed above. Alternatively, the at least one processor 301 may determine the relationship between the user and the recipient based on a flag identifying the relationship. The flag could be a user assigned flag, such as by the user manually inputting the relationship to the recipient when saving the recipient's contact information. Alternatively, the flag could have been previously set by the at least one processor 301 when the user was sending a different message to the recipient, thus saving processor power by avoiding redundant analysis.

In the implementations where the message is generated before the recipient is determined, such as those shown in FIGS. 8A-8C and 9A-9B after the user selects the message and the recipient, the at least one processor 301 may autonomously modify the selected message based on the relationship. For example, if the user selected a message like "Would you like to go out for dinner?", and then selected a recipient of "Husband Bert", the at least one processor 301 may autonomously modify the selected message to instead say something more intimate and flirty, like "What's cooking, good looking?".

In the implementations where the recipient is determined before the message is generated, such as those of FIGS. 10A-10C, the at least one processor 301 can generate the at least one messages based on the relationship between the user and the recipient.

If the at least one processor 301 is unable to confidently identify a casual vernacular or a casual relationship between the user and the recipient, the at least one processor 301 can by default generate the candidate message based on a polite, non-casual vernacular.

To improve accuracy and functionality of the present systems, methods, and devices, machine learning can be employed to provide more data regarding the environmental context parameter. For example, if the user frequently messages their spouse around 5:00 PM saying "Heading home", the at least one processor 301 may analyze and learn this behavior, and generate "Heading Home" as a candidate message with the user's spouse as a recipient if the clock output is around 5:00 PM, such as for example between 4:00 PM and 6:00 PM Monday to Friday. As another example, the at least one processor 301 may learn over time what recipients the user messages the most and assign higher priority to these recipients. Further, the at least one processor 301 may analyze messages sent from different users to different recipients in order to build a more comprehensive database on which to base the generation of messages. Specifically, the present systems and methods could be implemented in a large range of systems, such that at least one processor of each system analyzes messages being sent from the systems to determine at least content, tone, format, and language use when sending messages from a user to a given recipient. The at least one processor of each system may analyze the determined content, tone, format, and language use in the context of the relationship between the user and the sender in order to build a dataset of machine knowledge on which to base the generation of messages. Each system on which the present systems and methods are implemented could have access this dataset, both to retrieve data on which to base messages, as well as to provide data to the dataset to improve the dataset. In this sense, many systems can act together and pool knowledge to enhance not only their own performance, but also the performance of every other system. Further, each system may also analyze external resources to improve message generation capability. For example, each system may access the Internet, and analyze at least forum posts, blog Websites, comments, dictionaries, and any other appropriate online resource in order to build a machine knowledge database on which to base the generation of messages.

Further, machine learning can be utilized to populate information about the user's habits based on the output of a location sensor of system 300. For example, although the systems, methods, and devices of the subject application allow for the user of system 300 to manually input important or relevant locations, such as a home or workplace, this information can also be determined autonomously. As an example, if the location sensor indicates that a user is at a first location corresponding to a first set of GPS coordinates 5 times per week, and is at a second location corresponding to a second set of GPS coordinates every day of the week, the at least one processor 301 may determine that the first set of GPS coordinates correspond to the user's workplace, and the second set of GPS coordinates correspond to the user's home. Further, this determination does not necessarily have to be made by the at least one processor 301, but instead can be made by a remote server or third party service, such as Pilgrim by Foursquare®.

Additionally, the at least one processor 301 of system 300 may incorporate deliberate variability in the generation of the messages. For example, if a user sends their spouse a cute or romantic message every day at 3:00, the at least one processor 301 may learn to generate different cute or romantic messages, to ensure that the spouse receives interesting variations of messages daily, thus preventing spouse boredom, and saving the marriage of the user and spouse. The at least one processor 301 may use machine learning to enable this variability. For example, the at least one processor 301 may analyze the user's previous messages to determine tone and recipient, analyze messages sent by other systems with similar tone and recipient, and build a library of message ideas and formats on which to base the messages. The at least one processor 301 may also connect to the Internet to analyze external resources to determine appropriate conversation tones, formats, and language use on which to base the messages.

When generating at least one candidate message or determining at least one candidate recipient, the environmental context can be any combination of the different examples discussed above, in addition to any other appropriate environmental context known to system 300. These combinations can be achieved by using weighted confidence scores. For example, if the location sensor alone is used to determine that the user is at work, it would be difficult for the at least one processor 301 to tell whether the user is scheduled for a meeting, or is heading home. However, by combining multiple types of environmental context data, the at least one processor 301 can more confidently determine the status of the user, and can thus generate more accurate candidate messages. In reference to the above example, if the location sensor indicates that the user is currently at their workplace, and this is the only environmental context data available to the at least one processor 301, then the at least one processor 301 will assign a low confidence score to the possibility that the user is about to leave work. However, if the at least one processor 301 also has access to data output from a clock of system 300 which says the current time is 5:00 PM, the at least one processor 301 can assign a higher confidence score to the possibility that the user is about to leave work. Further still, if the at least one processor 301 has access to a calendar of the user, and there are no meetings scheduled for the rest of the day, the at least one processor 301 can assign an even higher confidence score to the possibility that the user is about to leave work. On the other hand, if the at least one processor 301 has access to data captured by a camera on system 300 which shows that the user is currently in the middle of an impromptu meeting, the at least one processor 301 can assign a lower confidence score to the possibility that the user is about to leave work. The at least one processor 301 may use this strategy to analyze many different situations and possibilities, and then generate at least one candidate message based on the possibilities with the highest confidence scores.

If the at least one processor 301 is unable to assign a high confidence score to a possible situation or candidate message, the at least one processor 301 can resort to generating more generic candidate messages, such as generic greetings based on the current time of day or current date, e.g. "Good Morning" or "Happy Monday!".

Confidence scores can similarly be used when determining at least one candidate recipient for the message. For example, when a location sensor of system 300 indicates to the at least one processor 301 that the user is currently at a school attended by the user's children, the at least one processor 301 will assign a low confidence score to the possibility that the user's boss should be the recipient of the message, and will assign a high confidence score to the possibility that the user's spouse should be a recipient of the message. Further, if the content of the message relates to the user's children, the at least one processor 301 can assign an even lower confidence score to the possibility that the user's boss should be a recipient of the message, and will assign an even higher confidence score to the possibility that the user's spouse will be a recipient of the message.

If the at least one processor 301 is unable to assign a high confidence score to a possible recipient for the message, the at least one processor 301 can cause the output device 304 to display an alphabetical list or grouping of the user's contacts. Alternatively, the at least one processor 301 can list the contacts starting with the contacts with the highest confidence scores.

In addition or alternatively to confidence scores, the at least one processor 301 can generate the at least one candidate message using weighted priority scores. For example, if the user has a meeting scheduled in one hour, the at least one processor 301 may assign a high priority score to generation of messages relating to this meeting, and a low priority score to generation of messages relating to other topics.

Priority can be determined by, for example, by considering topics related to the user's professional and work life to be more important than topics related to the user's personal life, or vice-versa.

Priority scores can also be used by the at least one processor 301 when determining candidate recipients for a message. For example, if a location sensor of system 300 outputs that the user is currently at a hospital, the at least one processor 301 can assign a very high priority score to the user's spouse or other family members as being candidate recipients for a message.

Both confidence scores and priority scores can be influenced by a user's habits. For example, if the at least one processor 301 assigns a high confidence score to a user's spouse being a candidate recipient for a message as the user leaves work, but the user ignores this option and instead selects their friend as the recipient for a message after work, the at least one processor 301 can learn and assign a higher confidence score to the friend being a candidate recipient for a message after work, while assigning a lower confidence score to the user's spouse being a candidate recipient of a message when the user leaves work. As another example, consider a case where the at least one processor 301 assigns a high priority score to messages based on the user's professional life and a low priority score to messages related to the user's personal life, but the user frequently does not select candidate messages based on their professional life, and instead consistently selects candidate messages related to their personal life. In this example, the at least one processor 301 can learn and adapt to the user's habits, and assign a higher priority score to messages pertaining to the user's personal life, while assigning a low priority score to messages pertaining to the user's professional life.

Weighting of the confidence scores and priority scores can involve binary decision making. For example, the at least one processor 301 can determine that if the time is anywhere between 11:00 AM and 12:00 PM, the confidence score for generating messages related to lunch should be increased by a set amount. Conversely, the at least one processor can determine that if the time is anywhere outside of 11:00 AM and 12:00 PM, the confidence score for generating messages related to lunch should not be increased, or even should be decreased by a set amount. However, this creates a situation where at 10:59 AM, the confidence score for generating messages related to lunch will be low, even though the time is still close enough to lunch that the user might be considering sending lunch related messages. To improve accuracy of the confidence scores and priority scores, the scores can be generated using non-binary range-based weighting. Specifically, instead of increasing or decreasing the confidence or priority score by a set amount, the confidence or priority score can be adjusted based on how far the environmental context parameter of interest is from a "peak" value. In the above example, "peak" time for lunch related messages could be set at 11:55 AM. In this case the at least one processor 301 will increase the confidence score for generating messages related to lunch based on how close the time is to 11:55 AM. For example, the confidence score for generating messages related to lunch could be low at 10:00 AM, moderate at 11:00 AM, high at 11:30 AM, peak at 11:55 AM, high at 12:15 PM, moderate at 12:30 PM, and low at 1:00 PM. Additionally, the confidence or priority score can also be adjusted based on a "start" value below the "peak" value and an "end" value above the "peak" value. The confidence score or priority score can be decreased or held constant if the environmental context parameter is outside the range encompassed by the start value and the end value. In the above example, the start value could be set at 10:00 AM, the end value could be set at 1:00 PM, and the peak value could be set at 11:55 AM. The confidence score for generating a message related to lunch could be set to 0 (i.e., no messages related to lunch will be generated) if the time is outside the range of 10:00 AM to 1:00 PM, and could be increased if the time is within the range of 10:00 AM to 1:00 PM, reaching the highest value at the peak time of 11:55 AM. For example, the confidence score for generating messages related to lunch could be 0 at 9:30 AM, low at 10:00 AM, moderate at 11:00 AM, high at 11:30 AM, peak at 11:55 AM, high at 12:15 PM, moderate at 12:30 PM, low at 1:00 PM, and 0 at 1:30 PM. One skilled in the art will readily appreciate that all of the example times listed herein are merely exemplary, and any appropriate times could be chosen as appropriate for a specific application or for a specific user. Preferably, the at least one processor 301 can autonomously learn a user's habits and schedule over time, and adjust the start time, peak time, and end time of any given message type accordingly.

In some implementations, generation of messages can be based on at least one Bayesian inference model. In one such implementation, a library of phrases could be stored, along with at least one relevance score. Each phrase could have an accompanying time-relevance score, which models the relevance of the phrase based on the time of day. For example, a phrase "Heading home" could have a relevance score modelled by a Gaussian curve with a peak at 5:30 PM. Further, each phrase could also have a category-relevance score, which models the relevance of the phrase based on a category from the library of categories. For example, the phrase "Heading home" could have a category-relevance score which is high for a "commute" category, but low, zero, or no category-relevance score for a "meetings" category. Further, each phrase could also have a recipient-relevance score, which models the relevance of the phrase based on an intended recipient. For example, the phrase "Heading home" could have a recipient relevance score which is high for members of a user's family, but low for everyone else.

A total-relevance score can be calculated from the different relevance scores. In the above example for the phrase "Heading home", the time-relevance score, the category-relevance score, and the recipient-relevance score can be multiplied together to obtain a total-relevance score. For example, if it is 5:30 PM, for a message category of "commute", with an intended recipient of "Spouse", the resulting total-relevance score can be high, because each of the individual relevance scores are high.

A given implementation can utilize as many or as few different relevance scores as is desired or appropriate for a given application. Further, even if many different relevance scores are stored for each phrase, each relevance score does not necessarily have to be used to determine a total relevance score for the phrase. For example, if message content is selected before a recipient is determined, a recipient-relevance score can be left out of the calculation of the total relevance score.

Figure 11:
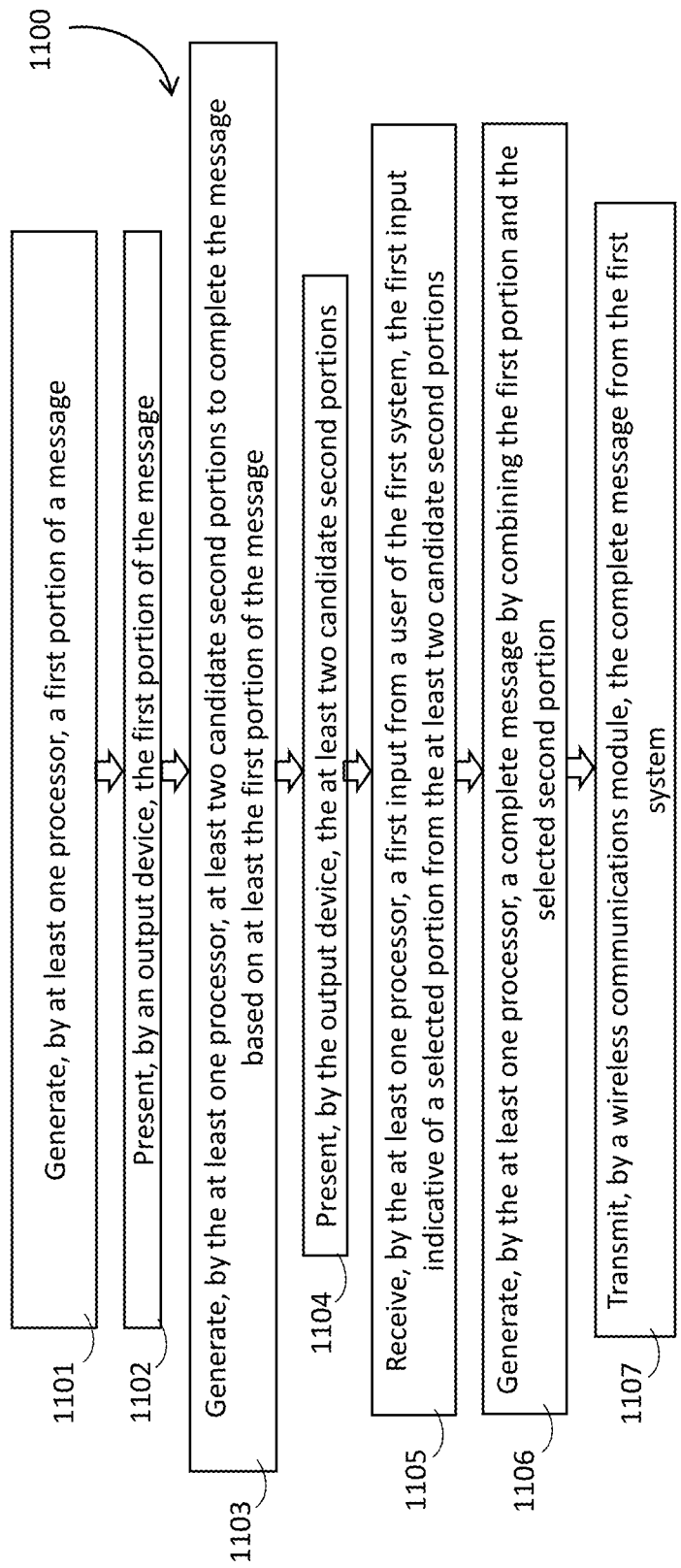
FIG. 11 is a flow diagram that illustrates an exemplary method for generating a message by combining first and second portions of a message, according to at least one illustrated implementation.

FIG. 11 is a flowchart which illustrates another exemplary method 1100 in accordance with the present systems, devices, and methods. The method 1100 utilizes a "fill in the blank" style of message generation. Although method 1100 is described with reference to system 300 shown in FIG. 3, method 1100 is equally applicable to any hardware arrangement having at least one processor, a non-transitory processor-readable storage medium, a wireless communications module, an output device, and a user input mechanism. Method 1100 can be embodied as a set of processor-executable instructions stored on the non-transitory processor-readable storage medium 302, which can be executed by the at least one processor 301. Method 1100 includes acts 1101, 1102, 1103, 1104, 1105, 1106, and 1107, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1101, at least one processor 301 generates a first portion of a message. Generation of the first portion of the message can be achieved by the at least one processor 301 identifying the environmental context parameter, and generating the first portion of the message based on the environmental context parameter, using any of the means discussed in detail above. For example, the environmental context can be determined at least in part based on the output from any one of or any combination of the following: a clock, entries in a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. One exemplary generation of a first portion of a message could be if the location sensor of system 300 outputs that the user is near a restaurant called "Yum Food", and the time is 11:00 PM, the at least one processor 301 could generate a first portion of a message that says "Let's eat at Yum Food_"

At 1102, an output device 304 displays or presents the first portion of the message. At 1103, the at least one processor 301 generates at least two candidate second portions to complete the message based on at least the first portion of the message, and optionally the environmental context parameter. In the above example where the first portion of the message is "Let's eat at Yum Food_", the at least one processor 301 may generate candidate second portions to complete the message like "tomorrow", "this weekend", or "sometime", for example. Generation of the at least two candidate second portions to complete the message can be achieved by the at least one processor 301 identifying the environmental context parameter, and generating the at least two candidate second portions to complete the message based on the environmental context parameter, using any of the criteria or algorithms discussed in detail above. For example, if the first portion of the message is "I'm feeling_", and if the at least one processor 301 determines that over 50% of the user's calendar for the day is full, the at least one processor 301 may generate "super busy" as one of the at least two candidate second portions to complete the message. One skilled in the art will appreciate that indicating that the user is super busy if 50% of the user's calendar is full is merely an exemplary number, and in practice this percentage could be adjusted to any amount based on the user's typical schedule and habits.

At 1104, the output device 304 displays or presents the at least two candidate second portions. The at least two candidate second portions can be text-based or be images. At 1105, the at least one processor 301 receives a first input from a user of system 300, the first input indicative of a selected portion from the at least two candidate second portions. At 1106, the at least one processor 301 generates a complete message by combining the first portion and the selected second portion. In the above example where the first portion of the message is "Let's eat at Yum Food", and the candidate second portions to complete the message are "tomorrow", "this weekend", or "sometime", if the user provides an input indicative of the second portion "this weekend", the at least one processor 301 can combine "Let's eat at Yum Food_" and "this weekend" to generate a complete message which says "Let's eat at Yum Food this weekend". At 1107, a wireless communications module 303 transmits the complete message from system 300 to one or a plurality of other systems or devices.

A candidate recipient for the complete message may be determined autonomously by the at least one processor 301 based on at least one of the environmental context parameter or the content of the complete message, using any of the hardware, sensors, and techniques discussed above regarding determining recipients for a message. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. Further, the sensor(s) could be carried by the system 300, or could be carried by an external device communicatively coupled to system 300. As an example, the at least one processor 301 may determine that the user is currently exercising, based on at least a heartrate of the user detected by an electrocardiography sensor or photoplethysmography sensor, blood pressure detected by a blood pressure sensor, muscle activations detected by an electromyography sensor and/or mechanomyography sensor, or state of arousal detected by an eye-tracking sensor detecting pupil dilation. Additionally, if the content of the complete message is "I'm feeling pumped!", the at least one processor 301 may determine that the recipient of the complete message should be the user's fitness trainer. As another example, if the complete message says "Can you please pick up the kids at school?", the at least one processor 301 may determine that the recipient of the message should be a spouse of the user, since the complete message pertains to the family of the user.

As discussed above regarding FIG. 1B, although it is possible to perform all of the acts of method 1100 on a single device, it is also possible to remove some of the hardware from a presentation device (such as a WHUD), and utilize a peripheral device comprising said hardware instead, in order to reduce bulk in the presentation device. In the case of method 1100, acts 1101, 1103, 1105, and 1106 could be performed by a processor of a WHUD, acts 1102 and 1104 could be performed by an output device of the WHUD, and act 1107 could be performed by a wireless communications module of a peripheral device communicatively coupled to the WHUD, such that the processing and presenting acts are performed on the WHUD, and the peripheral device is used as a wireless transmission gateway. Alternatively, acts 1101, 1103, 1105, and 1106 could be performed by at least one processor on a peripheral device, acts 1102 and 1104 could be performed by an output device on a WHUD communicatively coupled to the peripheral device, and act 1107 could be performed by a wireless communications module on the peripheral device, such that the peripheral device performs processing and transmission, whereas the WHUD performs presenting.

Figure 12C:
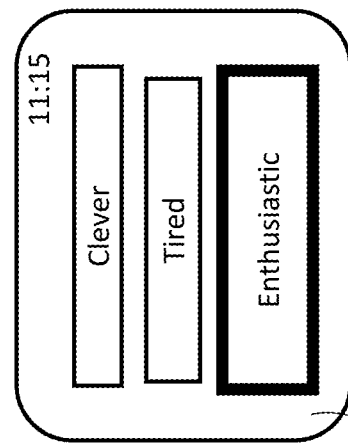
FIGS. 12A, 12B and 12C are representations of user interfaces which display or present image representations including user selectable messages in response to execution of the method of FIG. 11.
Figure 12B:
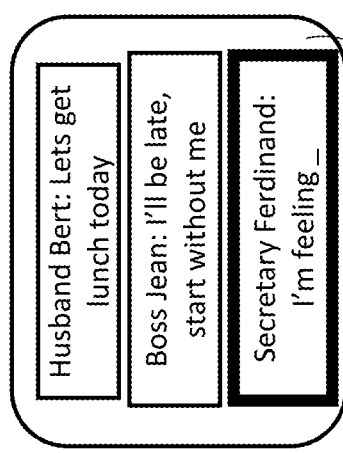
Figure 12A:
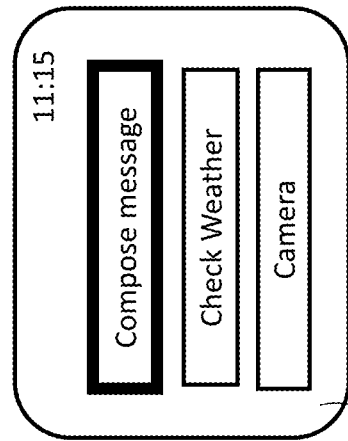

FIGS. 12A-12C show exemplary implementations of user interfaces produced by the system 300 which employ a "fill in the blank" structure to compose a message, which is displayed or presented to a user of system 300. In response input (e.g., selections) made via the user interfaces, a user of system 300 can provide input through user input mechanism 305 to perform selection, such as in act 1105 of method 1100. In FIG. 12A, a user decides they want to send a message, and so selects the "Compose Message" user selectable icon presented (e.g., displayed on display 304 of system 300) or projected to a retina of the user. FIG. 12B shows a presentation or display of a number of user selectable messages, including an "I'm Feeling_" option. When the user selects the "I'm feeling_" candidate message, an additional user interface 12C is presented in which the user can select an option to fill in the blank in the selected candidate message. In the case of FIG. 12C, the options include a variety of different feelings which may be appropriate for the situation. This implementation is not limited to feelings, but can be used to provide many options for the user to fill in the blank. For example, the user could select a message option of "Heading home, be home by_", and the output device 304 shown in FIG. 12C would present several options for times instead of options for feelings. As another example, the user could select a message icon that states: "Can you please pick up the kids at_", and the output device 304 shown in FIG. 12C would display options for places where the kids might be instead of feelings.

Figure 13:
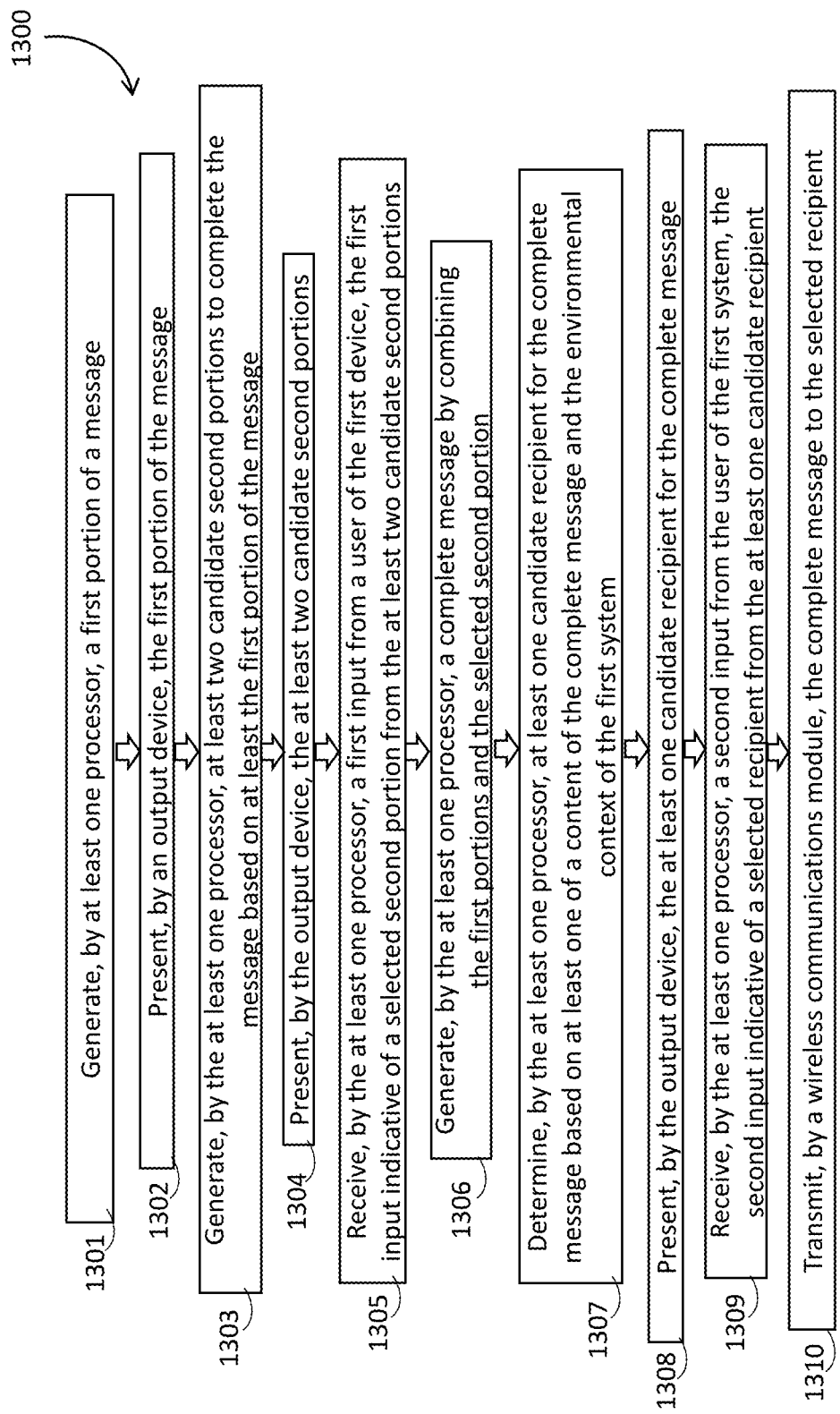
FIG. 13 is a flow diagram that illustrates an exemplary method for generating a message by combining first and second portions of a message, and determining at least one candidate recipient for the message, according to at least one illustrated implementation.

FIG. 13 is a flowchart which illustrates an exemplary method 1300 in accordance with the present disclosure. Although method 1300 is described with reference to the system 300 shown in FIG. 3, method 1300 is equally applicable to any hardware arrangement having at least one processor, a non-transitory processor-readable storage medium, a wireless communications module, an output device, and a user input mechanism. Method 1300 can be embodied as a set of processor-executable instructions stored on the non-transitory processor-readable storage medium 302, which can be executed by the at least one processor 301. Method 1300 includes acts 1301, 1302, 1303, 1304, 1305, 1306, 1307, 1308, 1309, and 1310 though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 1300 is similar to method 1100 but adds additional acts. Specifically, acts 1301, 1302, 1303, 1304, 1305, and 1306 of method 1300 correspond to acts 1101, 1102, 1103, 1104, 1105, and 1106 of method 1100, respectively, and thus the disclosure above regarding acts 1101, 1102, 1103, 1104, 1105, and 1106 fully applies to method 1300 and the discussion will not be repeated here in the interest of brevity. The additional acts 1307, 1308, 1309, and 1310 focus on determining a recipient for the complete message and sending the complete message to the determined or intended recipient. Specifically, at 1307, the at least one processor 301 determines at least one candidate recipient for the complete message based on at least one of a content of the complete message and the environmental context parameter. At 1308, the output device presents or displays the at least one candidate recipient for the complete message. At 1309, the at least one processor 301 receives a second input from the user of the system 300, the second input indicative of a selected recipient from the at least one candidate recipient. At 1310, the wireless communications module transmits the complete message from system 300 to the selected recipient.

These additional acts 1307, 1308, 1309, and 1310 are very similar to acts 705, 706, 707, and 708 in method 700, and thus acts 1307, 1308, 1309, and 1310 can utilize any of the data sources and sensors, as well as the techniques, discussed above with regards to determining at least one candidate recipient based on at least the environmental context parameter and/or the content of the message in the implementation shown in FIG. 7. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a location sensor, a global positioning system sensor, a compass, and an eye-tracking sensor. Further, the sensor(s) could be carried in system 300, or could be carried by a peripheral device communicatively coupled to system 300.

As discussed above regarding FIG. 1B, although it is possible to perform all of the acts of method 1300 on a single device, it is also possible to remove some of the hardware from a presentation device (such as a WHUD), and utilize a peripheral device comprising said hardware instead, in order to reduce bulk in the presentation device. In the case of method 1300, acts 1301, 1303, 1305, 1306, 1307, and 1309 could be performed by a processor of a WHUD, acts 1302, 1304, and 1308 could be performed by an output device of the WHUD, and act 1310 could be performed by a wireless communications module of a peripheral device communicatively coupled to the WHUD, such that the processing and presenting acts are performed on the WHUD, and the peripheral device is used as a wireless transmission gateway. Alternatively, acts 1301, 1303, 1305, 1306, 1307, and 1309 could be performed by at least one processor on a peripheral device, acts 1302, 1304, and 1308 could be performed by an output device on a WHUD communicatively coupled to the peripheral device, and act 1310 could be performed by a wireless communications module on the peripheral device, such that the peripheral device performs processing and transmission, whereas the WHUD performs presenting.

FIGS. 14A-14D show exemplary implementations of user interfaces produced by the system 300 which employ a "fill in the blank" structure to compose a message, which is displayed or presented to a user of system 300. In response to input (e.g., selections) provided via the user interfaces, a user of system 300 can provide input through user input mechanism 305 to perform selection, such as in acts 1305 and 1309 of method 1300. The user interfaces of FIGS. 14A-14D are, similar in some respects to those to FIGS. 12A-12C, but include an additional interface which allows the user to select an intended recipient of the message. In FIG. 14A, a user interface allows a user to select or indicate that they want to send a message by selecting the "Compose Message" user selectable icon presented or displayed on display 304 of system 300. FIG. 14B shows a user interface which presents or displays a number of messages, including, e.g., "I'm Feeling_" user selectable message. When the user selects the "I'm feeling_" candidate message, an additional user interface 14C is presented which allows the user to select an option to fill in the blank in the (previously) selected message. In the case of FIG. 14C, the user selectable icons correspond to a variety of different feelings which may be appropriate for the situation. This implementation is not limited to feelings, but can be used to provide many options for the user to fill in the blank. For example, the user could select a message option of "Heading home, be home by_", and the user interface (FIG. 14C) would display several user selectable icons corresponding to respective times (e.g., 5:30 PM; 6 PM; 6:30 PM, PM) instead of options for feelings. As another example, the user could select a message icon that corresponds to the message: "Can you please pick up the kids at _", and the subsequent user interface (FIG. 14C) may present or display a number of user selectable icons that correspond to various different places where the kids might be located. In FIG. 14D, the user interface 304 presents or displays a list of candidate intended recipients for the complete message, from which the user can choose.

FIGS. 15A-15D show exemplary implementations of user interfaces produced by system 300 which employ a "fill in the blank" structure to compose a message, which is displayed or presented to a user of system 300. The user interfaces of FIGS. 15A-15D are similar in some respects to those of FIGS. 12 and 14, and further allow the user to select images for the second portion of the message. Particularly, the user interface of FIG. 14C is replaced with a user interface illustrated in FIG. 15C which displays images for filling in the blank instead of text. The user interface of FIG. 15C could display emoji's, emoticons, drawings, computer-generated renderings, photographs, or any other appropriate form of image, e.g., an image without any characters or text; or an image that includes or is combined with characters. This is particularly effective when a user selects a message icon that corresponds to a message such as: "I'm feeling_", but could also be implemented for any other appropriate message type. For example, in the example where the user selects a message icon that corresponds to a message: "Can you please pick up the kids at_", the user interface illustrated in FIG. 15C could display images of places where the kids could be, such as a piano, a swimming pool, a soccer ball, a school, or any other appropriate image. Again, the selection of the provided choices of possible locations can be informed by, for instance appointments in a calendar, a set of stored contact information, a weekly scheduled discerned from previous messages, recent messages, current location(s), current date, current day of the week, current time of day, current season, holidays, special events in the geographic area, etc.

The present systems, devices, and methods also include an "explore" mode, for generating activity suggestions based on the user's location. As an illustrative example, in the implementations of FIGS. 11 and 13, the at least one processor 301 could generate a first portion of a message like "Let's meet at_". As candidate second portions to complete the message, the at least one processor 301 could generate portions based on the names of venues within the region of the user. For example, the at least one processor 301 could generate candidate second portions based on the names of restaurants within a 500 meter radius of the user. As an example, if the user is within 500 meters of restaurants called "Yummy Pasta", "Delicious Tacos", and "Amazing Barbeque", as indicated by a location sensor in system 300, the at least one processor 301 could generate candidate second portions of "Yummy Pasta", "Delicious Tacos", and "Amazing Barbeque". If the user selects the second portion "Delicious Tacos", the at least one processor 301 can generate the complete message of "Let's meet at Delicious Tacos" by combining the first and second portions. This implementation advantageously can expose the user to new and interesting options that they may not have been aware of. Further, a similar "explore" mode could be implemented in the methods illustrated in FIGS. 4 and 7, except instead of generating a first portion of a message like "Let's meet at_", and requiring a user to select a second portion to complete the message, the at least one processor 301 could generate a message like "Let's get dinner at Amazing Barbeque tonight" from the outset, if the user is near a restaurant called "Amazing Barbeque".

One skilled in the art will appreciate that the above implementations are not limited to restaurants, but could include any other venues and locations such as art galleries, theatres, nature parks, museums, concerts, festivals, or any other type of venue or event. Additionally, one skilled in the art will appreciate that the radius of 500 meters is exemplary, and any radius could be selected as appropriate for and application. Alternatively, strictly a radius does not have to be used, but instead the at least one processor 301 could generate second portions based on venues within specified geographic regions, such as for example the city limits of the current city which the user is located. The at least one processor 301 could also determine a range in which to search for venues based on a nature or type of the venue for which the using is searching. For example, if the at least one processor 301 is looking for restaurants, the at least one processor 301 could limit the search area to a one-kilometer radius around the user. On the other hand, if the at least one processor 301 is searching for concerts, the at least one processor 301 could limit the search area to the city limits of the city which the user is presently located or in which the user is scheduled to be located (e.g., calendared appointments, electronic ticketing) during the period in question. Data regarding the venues which the at least one processor 301 searches through can be stored on a non-transitory processor-readable storage medium 302 on system 300, or can be stored on a remote server accessible to the at least one processor 301 of system 300.

Further, the above implementations may also take a user's previous engagements and venue choices into account when determining what venues and events to suggest. For example, if the user regularly eats Mediterranean food, the at least one processor 301 could search for and suggest Mediterranean restaurants around a user's current location. Additionally, the above implementations may also take time of day into account when determining what venues and events to suggest. As an example, the at least one processor 301 may be more likely to suggest breakfast and coffee cafes in the morning, fast-food diners or take-out around midday for lunch, upscale restaurants in the evening for dinner, and bars or shows at nighttime. Similarly, the at least one processor 301 may limit restaurant and food venue suggestions to be only around the user's typical eating hours.

Figure 16:
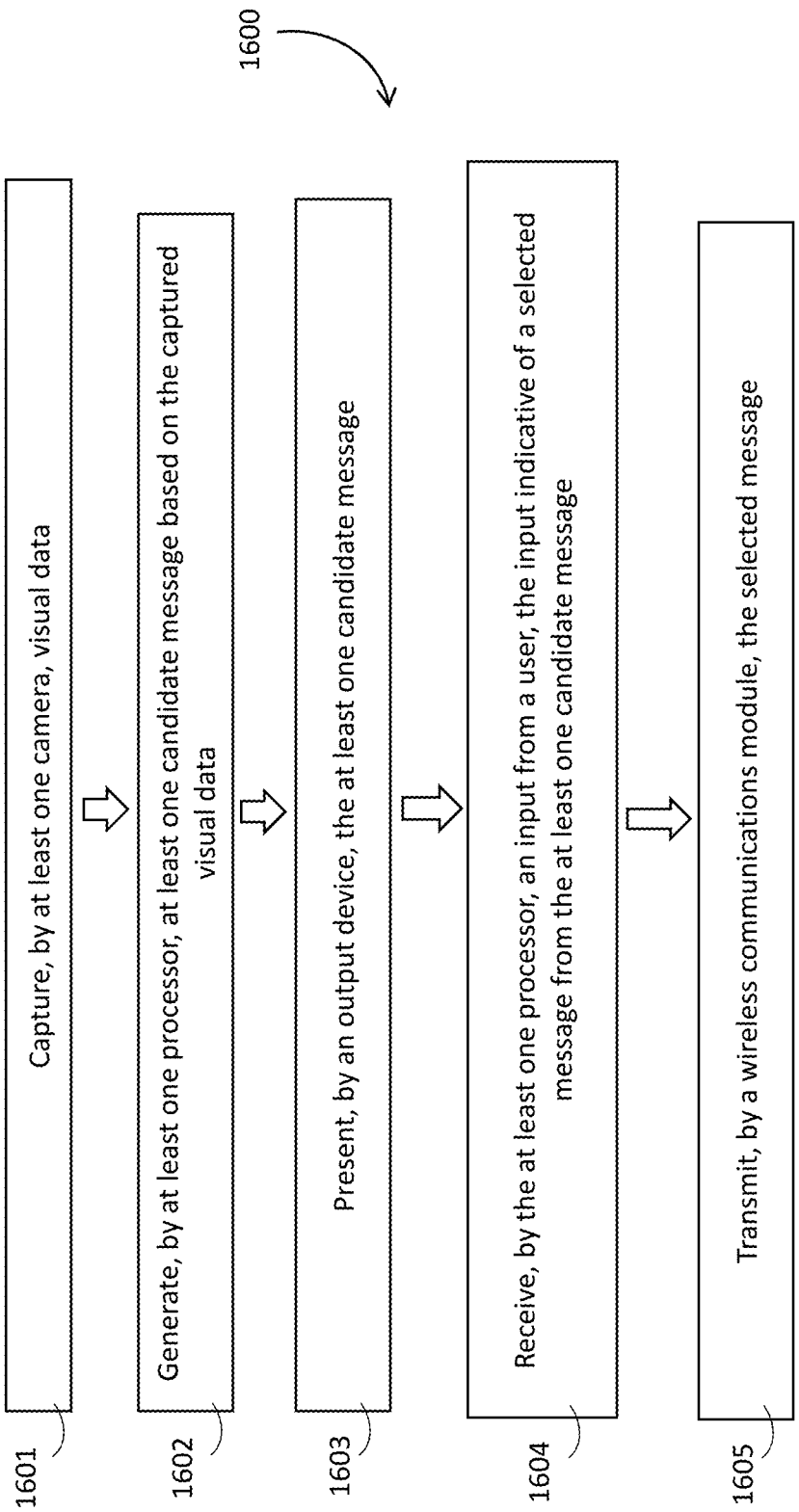
FIG. 16 is a flow diagram that illustrates an exemplary method for generating a message based on captured visual data according to at least one illustrated implementation.

FIG. 16 is a flowchart which illustrates another exemplary method 1600 in accordance with the present systems, devices, and methods. Although method 1600 is described with reference to the system 300 shown in FIG. 3, method 1600 is equally applicable to any hardware arrangement having at least one processor, a non-transitory processor-readable storage medium, a wireless communications module, an output device, and a user input mechanism. Method 1600 can be embodied as a set of processor-executable instructions stored on the non-transitory processor-readable storage medium 302, which can be executed by the at least one processor 301. Method 1600 includes acts 1601, 1602, 1603, 1604, and 1605, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1601, at least one camera of system 300 captures visual data. At 1602, the at least one processor 301 generates at least one candidate message based on the captured visual data. At 1603, the output device 304 presents the at least one candidate message to the user. At 1604, the at least one processor 301 receives an input from the user indicative of a selected message from the at least one candidate message. At 1605, the wireless communications module 303 transmits the selected message from the first system 300, to be received by one or a plurality of other systems or devices.

The acts of method 1600 can be similar in at least some respects to the acts of method 400 in FIG. 4 and method 700 in FIG. 7, and thus the acts of method 1600 in FIG. 16 can utilize any of the data sources and sensors, as well as the techniques, discussed above with regards to generating at least one candidate message based on at least the environmental context parameter and/or an intended recipient (if recipient is determined first) in the implementations shown in FIGS. 4 and 7. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a location sensor, a global positioning system sensor, a compass, and an eye-tracking sensor. Further, the sensor(s) could be carried in system 300, or could be carried by a peripheral device communicatively coupled to system 300.

Specific implementations of method 1600 are discussed in more detail below with reference to FIGS. 18-24.

Figure 17:
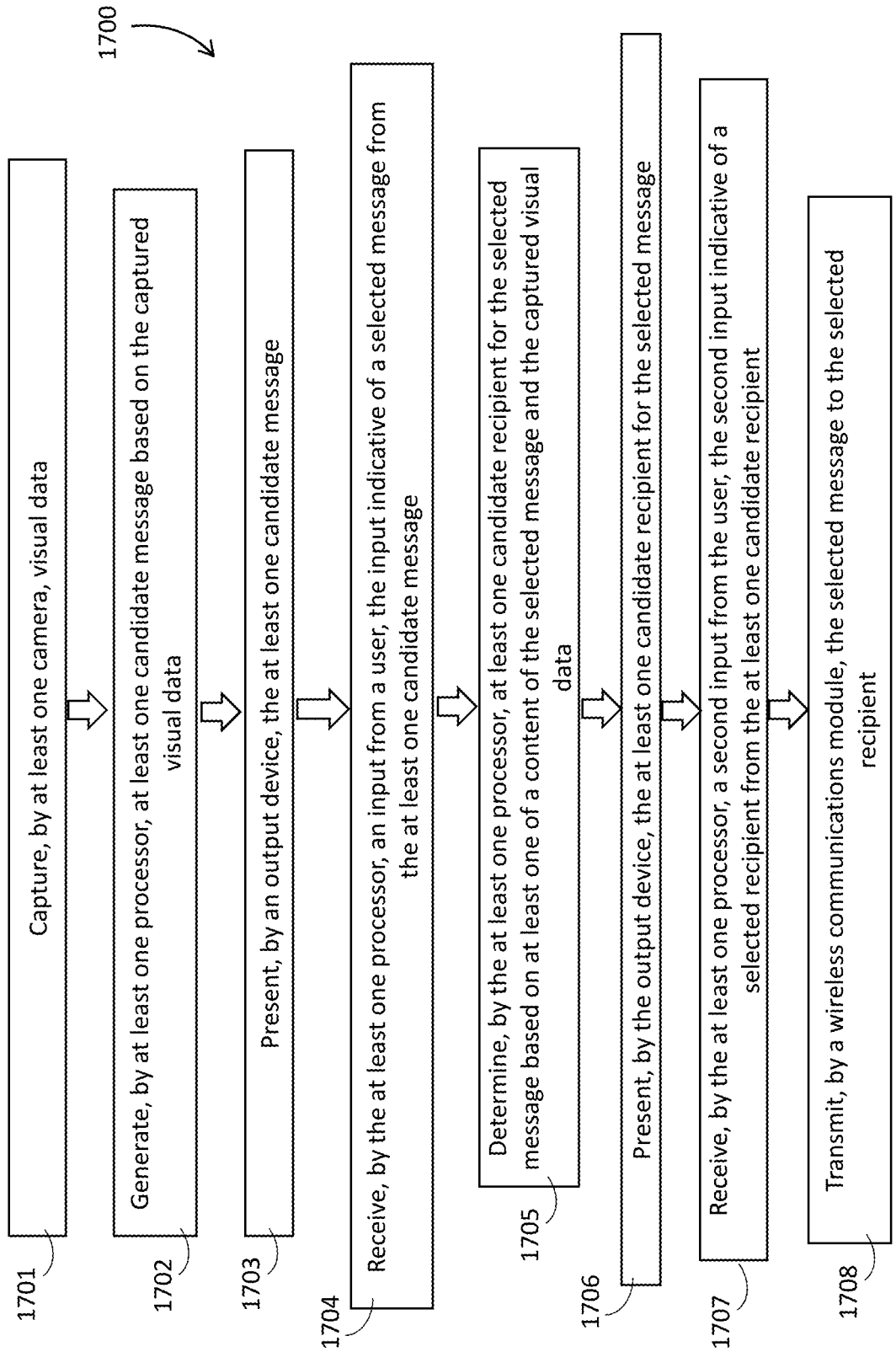
FIG. 17 is a flow diagram that illustrates an exemplary method for generating a message based on captured visual data, and determining at least one candidate recipient for the message, according to at least one implementation.

FIG. 17 is a flowchart which illustrates an exemplary method 1700 in accordance with the present disclosure. Although method 1700 is described with reference to the system 300 shown in FIG. 3, method 1700 is equally applicable to any hardware arrangement having at least one processor, a non-transitory processor-readable storage medium, a wireless communications module, an output device, and a user input mechanism. Method 1700 can be embodied as a set of processor-executable instructions stored on the non-transitory processor-readable storage medium 302, which can be executed by the at least one processor 301. Method 1700 includes acts 1701, 1702, 1703, 1704, 1705, 1706, 1707, and 1708, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Method 1700 is similar to method 1600 but adds additional acts. Specifically, acts 1701, 1702, 1703, 1704, and 1708 of method 1700 correspond to acts 1601, 1602, 1603, 1604, and 1605 of method 1600, respectively, and thus the disclosure regarding acts 1601, 1602, 1603, 1604, and 1605 fully applies to method 1700 and the discussion will not be repeated here in the interest of brevity. The additional acts 1705, 1706, and 1707 focus on determining a recipient for the message and sending the message to the determined or intended recipient. Specifically, at 1705, the at least one processor 301 determines at least one candidate recipient for the message based on at least one of a content of the message and the captured visual data. At 1706, the output device presents or displays the at least one candidate recipient for the complete message. At 1707, the at least one processor 301 receives a second input from the user of the system 300, the second input indicative of a selected recipient from the at least one candidate recipient. At 1708, the wireless communications module transmits the complete message from system 300 to the selected recipient.

These additional acts 1705, 1706, and 1707 may be similar to acts 705, 706, and 707 in method 700, and thus acts 1705, 1706, and 1707 can utilize any of the data sources and sensors, as well as the techniques, discussed above with regards to determining at least one candidate recipient based on at least the environmental context parameter and/or the content of the message in the implementation shown in FIG. 7. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a location sensor, a global positioning system sensor, a compass, and an eye-tracking sensor. Further, the sensor(s) could be carried in system 300, or could be carried by a peripheral device communicatively coupled to system 300.

As discussed above regarding FIG. 1B, although it is possible to perform all of the acts of method 1600 and method 1700 on a single device, it is also possible to remove some of the hardware from a presentation device (such as a WHUD), and utilize a peripheral device comprising said hardware instead, in order to reduce bulk in the presentation device. As an example, in the case of methods 1600 and 1700, acts 1601 and 1701 could be performed by a camera of a WHUD, acts 1602, 1604, 1702, 1704, 1705, and 1707 could be performed by a processor of the WHUD, acts 1603, 1703, and 1706 could be performed by an output device of the WHUD, and acts 1605 and 1708 could be performed by a wireless communications module of a peripheral device communicatively coupled to the WHUD, such that the processing and presenting acts are performed on the WHUD, and the peripheral device is used as a wireless transmission gateway. Alternatively, acts 1601 and 1701 could be performed by a camera of a WHUD, acts 1602, 1604, 1702, 1704, 1705, and 1707 could be performed by a processor of a peripheral device communicatively coupled to the WHUD, acts 1603, 1703, and 1706 could be performed by an output device of the WHUD, and acts 1605 and 1708 could be performed by a wireless communications module of the peripheral device, such that the peripheral device performs processing and transmission, whereas the WHUD performs data collection and output presentation.

FIGS. 18A-18D represent a sequence of displays or presentations of user interfaces including messages which can be shown or presented to the user, starting from FIG. 18A, proceeding to FIG. 18B, proceeding to FIG. 18C, proceeding to FIG. 18D. In these Figures, a user decides that they want to capture visual data, so they select a "Camera Capture" option or user selectable icon presented to the user (e.g., presented on the output device 304 of system 300) as illustrated in FIG. 18A. This interface is exemplary, and could be replaced for example by a shortcut to a camera capture mode, such as a hardware camera button. System 300 can then enter a camera capture mode as shown in FIG. 18B, enabling the user to capture visual data. In the case of FIG. 18B, the user can capture visual data representing a chalkboard or whiteboard on which notes were taken during a meeting.

The at least one processor 301 of system 300 can then use at least one automated image analysis algorithm to analyze the captured visual data and autonomously generate at least one (preferably multiple) candidate messages for the user to choose from based on at least the captured visual data, and present the at least one generated message to the user as shown in FIG. 18C. Optionally, the at least one generated message can also be based on an environmental context parameter of the system 300. In the case of FIG. 18C, the at least one processor 301 can analyze the captured visual data to identify the chalkboard or whiteboard, which are commonly used to take notes and discuss ideas. Consequently, the at least one processor 301 can generate at least one candidate message which pertains to the concept of sharing meeting notes. For example, the at least one processor 301 may access at least one of a clock and/or calendar accessible to system 300, to generate a candidate message which indicates at least one of a time, date, location, topic, or other relevant information. In the example shown in FIG. 18C, the at least one processor 301 could access a clock of system 300 to assign a time and/or date stamp to the message, and the at least one processor 301 could access a calendar to determine that the user was/is in a meeting with the Hardware Team at the time of capturing the visual data or shortly thereafter. Using this information, the at least one processor 301 can generate a message like "Jun. 10, 2019 Hardware Team meeting notes". As another example, the at least one processor 301 could identify the presence of the chalkboard or the whiteboard in the captured visual data, and could thus generate messages which pertain to soliciting dialogue. For example, the at least one processor 301 could generate a candidate message like "Any thoughts on this?" as shown in FIG. 18C. As shown in FIG. 18C, the at least one candidate message can be presented to the user by output device 304, optionally alongside a preview 1810 of the captured visual data.

The system 300 can then receive an input from the user indicating a selection of a message of the at least one candidate message. The at least one processor 301 can then determine at least one candidate recipient for the selected message based on at least one of the captured visual data, content of the selected message, and at least one environmental context parameter of the system 300. A candidate recipient for a message may be determined autonomously by the at least one processor 301 based on at least one of the captured visual data, the environmental context parameter, and/or the content of the message. Determining the recipient based on environmental context parameter can use any of the hardware, sensors, and techniques discussed above regarding determining the environmental context parameter. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. Further, the sensor(s) could be carried by the system 300, or could be carried by an external device communicatively coupled to system 300. Additionally or alternatively, determining a recipient for each candidate message can be based on the content of the respective candidate message. For example, if a message says "Jun. 10, 2019 Hardware Team Meeting Notes", the at least one processor 301 may determine that candidate recipients of the message should be people who attended the Hardware Team meeting, or people related to the Hardware Team, such as the user's boss Jean, as illustrated in FIG. 18D.

FIG. 18D also illustrates an important concept: that a "message" in the context of the present systems, devices and methods is not limited to a message which is sent from one user to another user. Instead, a "message" can also include content submissions, such as to content hubs which are not tied to a single user. In the example of FIG. 18D, the at least one processor 301 could determine that since the visual data was captured during or shortly after the Hardware Team meeting, the message could be shared to the Hardware Team drive, such as a cloud-based drive stored on a remote server. This is illustrated in FIG. 18D by a candidate recipient of "Share to Hardware Team Drive". As another example, the at least one processor 301 could determine that since the visual data includes a representation of a chalkboard or whiteboard, the visual data likely contains notes that the user wishes to retain, and thus may determine a user's personal drive as an appropriate recipient of the message. This is illustrated in FIG. 18D as a candidate recipient of "Store on personal drive". Such a personal drive could be a cloud-based drive on a remote server, or could be a local drive in system 300.

The user can then select a desired recipient or recipients, and the message, including the captured visual data and the text generated by the at least one processor 301, can be transmitted by the wireless communications module 303, to be received by the desired recipient.

Similar to the examples illustrated in at least FIGS. 5A, 5B, and 6 above, the user interface in FIG. 18A-18D could be made more compact by joining multiple steps taken by the user together. For example, the user may be able to select both a message to be sent and a recipient of the message with a single input. In such an example, the at least one processor 301 can generate at least one candidate message, pair the at least one candidate message with a recipient, and output device 304 can output the pair of candidate message and recipient. The user may simply select the paired message and recipient, quickly and efficiently.

FIGS. 19A-19D represent a sequence of displays or presentations of user interfaces including messages which can be shown or presented to the user, starting from FIG. 19A, proceeding to FIG. 19B, proceeding to FIG. 19C, proceeding to FIG. 19D. In these Figures, a user decides that they want to capture visual data, so they select a "Camera Capture" option or user selectable icon presented to the user (e.g., shown on the output device 304 of system 300) as illustrated in FIG. 19A. This interface is exemplary, and could be replaced for example by a shortcut to a camera capture mode, such as a hardware camera button. System 300 can then enter a camera capture mode as shown in FIG. 19B, enabling the user to capture visual data. In the case of FIG. 19B, the user can capture visual data representing people.

The at least one processor 301 of system 300 can then use at least one automated image analysis algorithm to analyze the captured visual data and autonomously generate at least one (preferably multiple) candidate messages for the user to choose from based on at least the captured visual data, and output device 304 can present the at least one generated message to the user as shown in FIG. 19C, optionally alongside a preview 1910 of the captured visual data. Optionally, the at least one generated message can also be based on an environmental context parameter of the system 300. In the case of FIG. 19C, the at least one processor 301 can analyze the captured visual data to identify that the captured visual data includes representations of people. The at least one processor 301 can also use a facial recognition algorithm to determine the identities of the people in the picture, and could also use an algorithm which analyzes the emotional expression of the people in the picture. The at least one processor 301 can then generate at least one candidate message which pertains to the people in the captured visual data. In the example shown in FIG. 19C, the at least one processor 301 could determine that the people in the picture are the user's Uncle George and Aunt Tina, and could generate a message which includes this information, such as "Having fun with Uncle George and Aunt Tina!". If the at least one processor 301 analyzes the emotional expression of the people in the picture, this information can be used to generate more accurate content. In the example of FIG. 19C, the at least one processor 301 could determine that both Uncle George and Aunt Tina are smiling, and thus everyone in the picture is 'Having Fun'. Further, the at least one processor could determine that the user is smiling or happy by analyzing emotional expression of the user's eyes using an eye tracking sensor such as eye-tracking system 184, and/or by analyzing emotional expression of the user's eyebrows or cheeks using facial expression detection sensors such as proximity sensors 185. Accordingly, the at least one processor 301 can generate a candidate message like 'Having fun with Uncle George and Aunt Tina'.

The system 300 can then receive an input from the user indicating a selection of a message of the at least one candidate message. The at least one processor 301 can then autonomously determine at least one candidate recipient for the selected message based on at least one of the captured visual data, the content of the selected message, and at least one environmental context parameter of the system 300. Determining the recipient based on environmental context parameter can use any of the hardware, sensors, and techniques discussed above regarding determining the environmental context parameter. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. Further, the sensor(s) could be carried by the system 300, or could be carried by an external device communicatively coupled to system 300.

Additionally or alternatively, determining a recipient for each candidate message can be based on the content of the respective candidate message. For example, if a message says "Having fun with Uncle George and Aunt Tina", the at least one processor 301 may determine that candidate recipients of the message should be people who would know Uncle George and Aunt Tina, such as members of the family of the user. For example, the at least one processor 301 could determine that the user's Dad, or the user's husband Bert are appropriate candidate recipients for the message, as illustrated in FIG. 19D as candidate recipients "Dad" and "Husband Bert". Additionally, the message itself refers to Uncle George and Aunt Tina, which would be unusual content if the message were to be sent to Uncle George or Aunt Tina. Thus, the at least one processor 301 may exclude Uncle George and Aunt Tina as recipients for the message if the content of the message would be unusual to send to them.

Similar to FIG. 18D above, FIG. 19D also illustrates the concept that a "message" can also include a content submission, such as to a content hub which is not tied to a single user. In the example of FIG. 19D, the at least one processor 301 could determine that the content of the captured visual data and the generated text for the message are suitable for public sharing, such as to a social network like Facebook®. Consequently, system 300 may present "Upload to social media" as a candidate recipient for the message, as shown in FIG. 19D. Further, a subsequent interface can be presented which enables the user to select which social network the message should be shared to, in the even the user is a member of multiple social networks.

The user can then select a desired recipient or recipients, and the message, including the captured visual data and the text generated by the at least one processor 301, can be transmitted by the wireless communications module 303, to be received by the desired recipient.

Similar to the examples illustrated in at least FIGS. 5A, 5B, and 6 above, the user interface in FIGS. 19A-19D could be made more compact by joining multiple steps taken by the user together. For example, the user may be able to select both a message to be sent and a recipient of the message with a single input. In such an example, the at least one processor 301 can generate at least one candidate message, pair the at least one candidate message with a recipient, and the output device 304 can output the pair of the candidate message and recipient. The user may simply select the paired message and recipient, quickly and efficiently.

FIGS. 20A-20D represent a sequence of displays or presentations of user interfaces including messages which can be shown or presented to the user, starting from FIG. 20A, proceeding to FIG. 20B, proceeding to FIG. 20C, proceeding to FIG. 20D. FIGS. 20A and 20B are similar to FIGS. 19A and 19B discussed above, and thus the description of FIGS. 19A and 19B is also applicable to FIGS. 20A and 20B.

In FIG. 20C, the at least one processor 301 may determine that since the captured visual data contains representations of people, the user may wish to share the captured visual data with the people in the picture. To this end, the at least one processor 301 could generate a simple message like "Here is today's picture." as illustrated in FIG. 20C. As shown in FIG. 20D, the at least one processor 301 can determine candidate recipients which include people identified in the captured visual data, in this case "Uncle George" and "Aunt Tina", as illustrated in FIG. 20D presented by output device 304. Further, the user may not wish to share the picture, but may instead simply want to store it for later review, and so the at least one processor 301 may also identify data storage, such as the user's cloud storage drive, as being a candidate recipient for the message, as illustrated in FIG. 20D as candidate recipient "Upload to cloud storage".

The user can then select a desired recipient or recipients, and the message, including the captured visual data and the text generated by the at least one processor 301, can be transmitted by the wireless communications module 303, to be received by the desired recipient.

Similar to the examples illustrated in at least FIGS. 5A, 5B, and 6 above, the user interface in FIG. 20A-20D could be made more compact by joining multiple steps taken by the user together. For example, the user may be able to select both a message to be sent and a recipient of the message with a single input. In such an example, system 300 can generate at least one candidate message, pair the at least one candidate message with a recipient, and output the pair on output device 304 of system 300. The user may simply select the paired message and recipient, quickly and efficiently. As an example, with reference to the case of FIGS. 20A-20D, the at least one processor 301 may pair the message content "Here is today's picture" with the recipients "Uncle George" and "Aunt Tina".

FIGS. 21A-21E represent a sequence of displays or presentations of user interfaces including messages which can be shown or presented to the user, starting from FIG. 21A, proceeding to FIG. 21B, proceeding to FIG. 21C, proceeding to FIG. 21D, proceeding to FIG. 21E. FIGS. 21A and 21B are similar to FIGS. 19A and 19B discussed above, and thus the description of FIGS. 19A and 19B is also applicable to FIGS. 21A and 21B.

In FIG. 21C, system 300 may present an option for the user to customize or personalize content of a message, such as to provide a more personal or "human" feel to the message. This is illustrated by the "Personalize" option illustrated in FIG. 21C. FIG. 21D shows an exemplary interface for customizing the message. At least some of the content may be autonomously generated by the at least one processor 301, and the user may be presented with the ability to edit or customize the content. For example, as shown in FIG. 21D, the at least one processor 301 may generate a caption like "Great day with Uncle George and Aunt Tina at the Calgary Zoo!". Such a message could be based on analysis of the captured visual data, such as for example a facial recognition algorithm identifying people in the image, and could also be based on an environmental context parameter of system 300 obtained using any of the techniques discussed herein. In the above example, a location of system 300 can be obtained from a location sensor, which can then be used to determine content for the message, in this case that the user captured the visual data at the Calgary Zoo. Further, an interface can be provided which enables the user to customize the generated content. For example, the user may be able to select words or phrases in the text content, and select alternative words or phrases. As one example, the user could select "Great day", and the system could present alternative phrases like "Had fun", "Fun family day", or similar. Additionally, an interface could be presented for personalizing the captured visual data as well. In the example of FIG. 21D, an interface could be presented which allows the user to apply stamps, emojis, catchphrases, frames, filters, and more to the captured image, alongside a preview 2110 of the customized visual data. For example, the user could select a flower stamp from a customization panel 2120, and then could click on any number of points of the captured visual data to apply the flower stamp thereto. A similar procedure could be performed for emojis or catchphrases, such as "So much fun!" and "Happy times" as shown in FIG. 21D. Filters and color adjustment could also be presented which, when selected by the user, apply a filter or color adjustment to the image. The stamps, emojis, catchphrases, frames, filters and other customization options presented to the user can be automatically determined, such as for example presenting the most popular options to the user, or options which the user themselves frequently use. Further, the options presented could also be based on analysis of the captured visual data and/or an environmental context parameter of system 300. For example, if the at least one processor analyzes the captured visual data and determines that the captured visual data is too dark, the at least one processor 301 can suggest applying brightening filters to the captured visual data. Additionally, the at least one processor 301 could determine a time or date when the visual data was captured, and suggest appropriate options based on this time or date. For example, if the visual data was captured on or around October 31, Halloween, the system 300 could present spooky or pumpkin themed emojis. Further, system 300 could autonomously decorate the captured visual data using the above options, and present the user the option to customize the decorations, such as by moving or changing stamps or other decorations. Further, the system 300 could present multiple autonomously generated decorated and/or captioned messages, and allow the user to select a desired message, which could optionally be further customized by the user.

The system 300 can receive an input from the user indicating a selection or completion of a customized message. The at least one processor 301 can then autonomously determine at least one candidate recipient for the selected message as shown in FIG. 21E based on at least one of the captured visual data, the content of the selected message, and at least one environmental context parameter of the system 300. Determining the recipient based on environmental context parameter can use any of the hardware, sensors, and techniques discussed above regarding determining the environmental context parameter. For example, the environmental context can be determined at least in part based on the output from any one of or any combination of the following: a clock, a calendar accessible by system 300, a location sensor, a camera, a microphone, an electromyography sensor, a mechanomyography sensor, an accelerometer, a gyroscope, an electrocardiography sensor, a photoplethysmography sensor, a blood pressure sensor, a global positioning system sensor, a compass, and an eye-tracking sensor. Further, the sensor(s) could be carried by the system 300, or could be carried by an external device communicatively coupled to system 300.

Additionally or alternatively, determining a recipient for each candidate message can be based on the content of the respective candidate message. For example, if a message says "Great day with Uncle George and Aunt Tina at the Calgary Zoo", the at least one processor 301 may determine that candidate recipients of the message should be people who would know Uncle George and Aunt Tina, such as members of the family of the user. For example, the at least one processor 301 could determine that the user's Dad, or the user's husband Bert are appropriate candidate recipients for the message, illustrated as candidate recipients "Dad" and "Husband Bert" in FIG. 21E.

Similar to FIG. 18D above, FIG. 21E also illustrates the concept that a "message" can also include a content submission, such as to a content hub which is not tied to a single user. In the example of FIG. 21E, the at least one processor 301 could determine that since the message content is personalized with stamps or similar, the at least one processor can determine that the message is suitable to share on a social network like Facebook®. Consequently, system 300 may present social media as a candidate recipient for the message, as shown in FIG. 21E.

The user can then select a desired recipient or recipients, and the message, including the captured visual data, the text (caption) generated by the at least one processor 301, and any customization or personalization can be transmitted by the wireless communications module 303, to be received by the desired recipient.

Figure 22A:
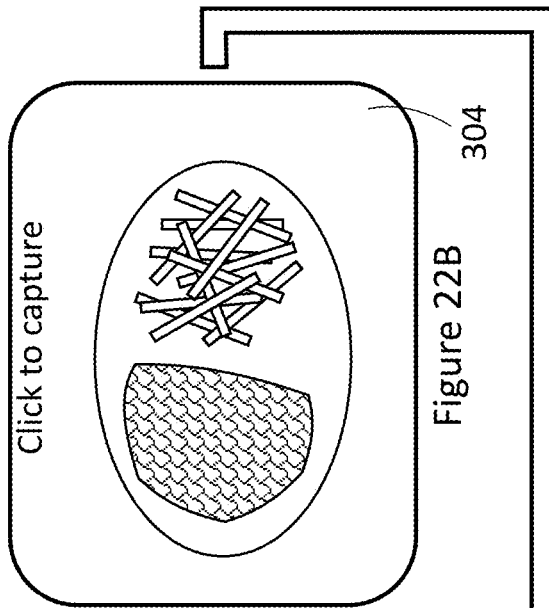
Figure 22B:
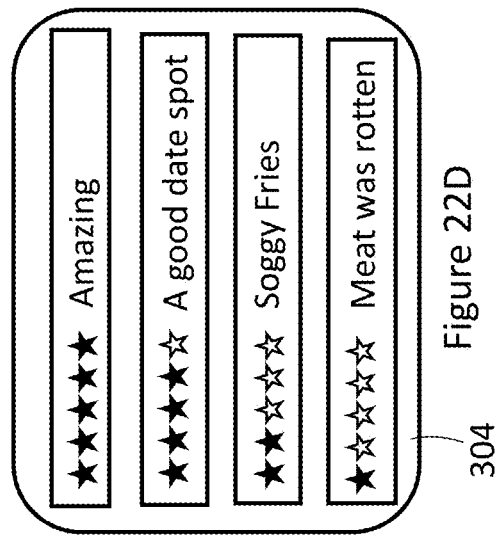
Figure 22C:
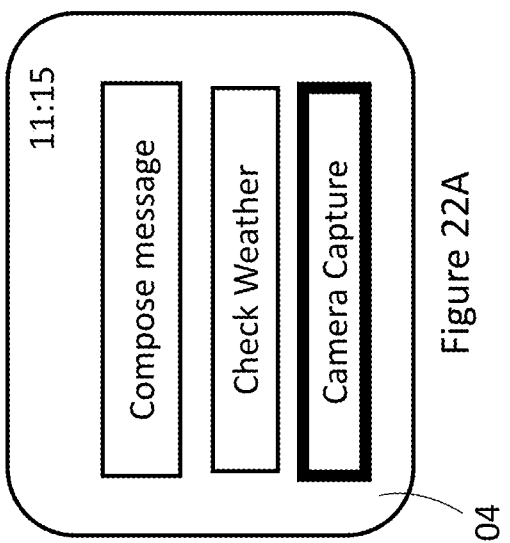
Figure 22D:
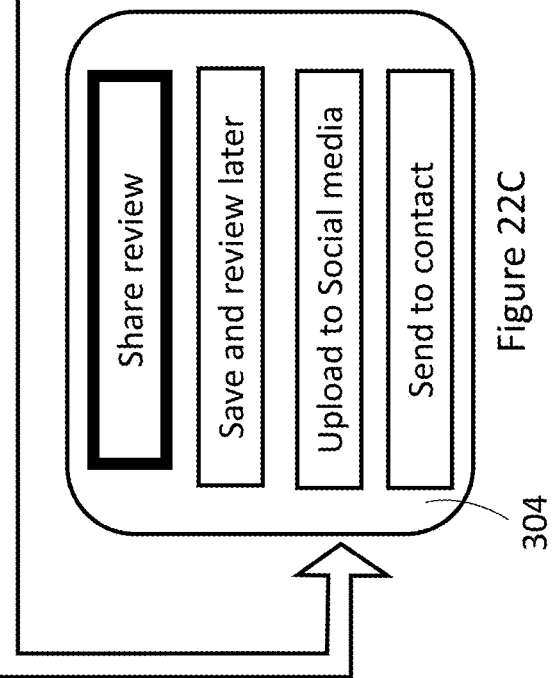

FIGS. 22A-22D represent a sequence of displays or presentations of user interfaces including messages which can be shown or presented to the user, starting from FIG. 22A, proceeding to FIG. 22B, proceeding to FIG. 22C, proceeding to FIG. 22D. In these Figures, a user decides that they want to capture visual data, so they select a "Camera Capture" option or user selectable icon presented to the user (e.g., shown on the output device 304 of system 300) as illustrated in FIG. 22A. This interface is exemplary, and could be replaced for example by a shortcut to a camera capture mode, such as a hardware camera button. System 300 can then enter a camera capture mode as shown in FIG. 22B, enabling the user to capture visual data. In the case of FIG. 22B, the user can capture visual data representing food.

The at least one processor 301 can then use at least one automated image analysis algorithm to analyze the captured visual data, and determine appropriate action options to present to the user based on the analysis. In the example of FIG. 22C, the at least one processor 301 may identify that the captured visual data includes a representation of food, and may autonomously generate action options for the user, including options to submit a review of the food, or save the captured visual data to submit a review later, once the food has been eaten. Other options could include sharing the captured visual data to social media or sending the captured visual data to a contact, similar to the implementations discussed above.

If the user selects to share a review, the at least one processor 301 may autonomously generate at least one (preferably multiple) candidate messages for the user to choose from, and present the at least one candidate message to the user as shown in FIG. 22D. In the case of FIG. 22D, the at least one processor 301 can generate several "star" ratings, such as 1 star, 2 star, 3 star, 4 star, and 5 star, as shown by star icons/emojis in FIG. 22D. The at least one processor 301 can also autonomously generate message content appropriate to each star rating, which can be selected and optionally customized by the user. The generated message content could be based on generic review templates, the captured visual data, or an environmental context parameter of the system 300, as examples. For example, the at least one processor 301 could use generic review content, like "Amazing" or "A good date spot" as shown in FIG. 22D. As another example, the at least one processor 301 could analyze the content of the captured visual data to identify objects represented in the data, and generate message content based on the identified objects, such as "Soggy fries" or "Meat was rotten" as shown in FIG. 22D. If the object detection is sufficiently sophisticated, the at least one processor 301 could make a determination of the food quality based on the appearance of the food. For example, if the fries have a soggy appearance, the at least one processor 301 could generate message content for low-star ratings like "Soggy fries". Further, even if the at least one processor 301 cannot accurately identify specific objects in the captured visual data, the at least one processor 301 can use at least one environmental context parameter to infer what the user might be eating, and generate corresponding message content. For example, if a location sensor of system 300 indicates that the user is at a steakhouse, the at least one processor 301 could generate review content which makes reference to items typically served at a steakhouse, such as meat. Further, if a menu for the restaurant at which the user is located is available to system 300, such as on a website of the restaurant, the at least one processor 301 may generate message content based on popular menu items or menu themes. As examples of the above, the at least one processor 301 could determine that if the user is dining at "Friendly Steakhouse", the user is likely eating meat. This could be further reinforced if the at least one processor 301 analyzes the menu for Friendly Steakhouse and determines that there are no vegetarian entrees. Consequently, that at least one processor 301 could generate message content like "Meat was rotten" as shown in FIG. 22D.

If the user selects an option such as "Save and review later" shown in FIG. 22C, a similar process for generating message content can be performed when the user later decides to complete the review.

The system 300 can then receive an input from the user indicating a selection of a message of the at least one candidate message. The at least one processor 301 can then autonomously determine at least one candidate recipient for the selected message based on at least one of the captured visual data, the content of the selected message, and at least one environmental context parameter of the system 300. For example, if available, the at least one processor 301 may identify the restaurant itself maintains a review board or submission address, and thus may identify such a board or address as a candidate recipient for the review. Alternatively, the at least one processor may identify aggregate review sites such as TripAdvisor® or Yelp® as candidate recipients for the review.

The user can then select a desired recipient or recipients, and the message, including the review content generated by the at least one processor 301, and optionally the captured visual data, can be transmitted by the wireless communications module 303, to be received by the desired recipient.

Similar to the examples illustrated in at least FIGS. 5A, 5B, and 6 above, the user interface in FIGS. 22A-22D could be made more compact by joining multiple steps taken by the user together. For example, selection of the "Share review" option by the user may also be paired with a recipient of the review, such as for example a "Share review to TripAdvisor" option.

FIGS. 23A-23D represent a sequence of displays or presentations of user interfaces including messages which can be shown or presented to the user, starting from FIG. 23A, proceeding to FIG. 23B, proceeding to FIG. 23C, proceeding to FIG. 23D. FIGS. 23A, 23B, and 23C are similar to FIGS. 22A, 22B, and 22C discussed above, and thus the description of FIGS. 22A, 22B, and 22C is also applicable to FIGS. 23A, 23B, and 23C. One difference between FIG. 23C and FIG. 22C is that in FIG. 23C, the user selects the "Upload to social media" option or the "Send to contact" option.

In FIG. 23D, the at least one processor 301 may generate candidate messages based on at least one of the captured visual data, an environmental context parameter of the system 300. For example, the at least one processor 301 can analyze the captured visual data to identify a representation of Steak Frites in the captured visual data, and generate appropriate candidate messages based on this identification, such as "Steak frites are the best!" or "Meat eater's delight!" as shown in FIG. 23D. Even if the at least one processor 301 is not able to identify specific food objects in the captured visual data, the at least one processor 301 may identify that the captured visual data includes a representation of food in general. The at least one processor 301 may consequently generate a food-based candidate message like "Yummy!" as shown in FIG. 23D. Further, any of the generated candidate messages may also include emojis generated or retrieved by the at least one processor 301, such as for example the star-eyed emoji with a protruding tongue as shown in FIG. 23D.

The at least one processor 301 may receive an input from the user indicating a selection of a candidate message, and the at least one processor 301 may determine at least one candidate recipient for the message. Such candidate recipients could be determined using any of the exemplary techniques discussed herein. For example, if the user selected that the "Upload to social media" option in FIG. 23C, the candidate recipients may be different social media networks which the user is a member of. As another example, if the user selected the "Send to contact" option in FIG. 23C, the at least one processor 301 may identify some close friends or family of the user who may be interested in food-related messages.

The user can then select a desired recipient or recipients, and the message, including the captured visual data and the text generated by the at least one processor 301, can be transmitted by the wireless communications module 303, to be received by the desired recipient.

Similar to the examples illustrated in at least FIGS. 5A, 5B, and 6 above, the user interface in FIG. 23A-23D could be made more compact by joining multiple steps taken by the user together. For example, the "Upload to social media" option may instead be an "Upload to Facebook" option, which can be selected with a single input from the user and indicates both the desired action and the intended recipient.

In many of the above discussed implementations, a user first selects "Camera Capture", captures visual data, and then candidate messages and candidate recipients are determined. However, this order of operations could be changed, as illustrated by the implementations shown in FIGS. 24A-24D. FIGS. 24A-24D represent a sequence of displays or presentations of user interfaces including messages which can be shown or presented to the user, starting from FIG. 24A, proceeding to FIG. 24B, proceeding to FIG. 24C, proceeding to FIG. 24D.

In FIG. 24A, a user decides that they want to send a message, and thus selects the "Compose Message" option. In FIG. 24B, the at least one processor 301 generates at least one candidate message based on an environmental context parameter of the device. The at least one processor 301 can generate the at least one candidate message using any of the techniques discussed herein, based on environmental context data from any of the sensors discussed herein. In the example of FIG. 24B, data from a location sensor of system 300 can indicate that the user is at "Friendly Steakhouse", and can generate candidate messages related to this location, such as "I'm at Friendly Steakhouse" or "Trying a new steak restaurant" as shown in FIG. 24B.

The user can select one of the candidate messages, and the system 300 can present an option for the user to share the selected message, or to share the selected message with a capture, as shown in FIG. 24C. If the user selects "Share with capture", a camera capture interface can be presented, which allows the user to capture visual data to be sent with the message. The at least one processor 301 can then determine at least one candidate recipient for the message using any of the techniques for determining candidate recipients discussed herein, and receive an input from a user indicating a selection of a recipient of the message. Subsequently, system 300 can send the message with the captured visual data to the selected recipient. If the user selects the "Share" option in FIG. 24C, the camera capture step of FIG. 24D can be skipped.

FIGS. 25A-25C represent a sequence of displays or presentations of user interfaces for generating a message to share, starting from FIG. 25A, proceeding to FIG. 25B, proceeding to FIG. 25C.

In FIGS. 25A-25C, a user decides that they want to capture visual data, so they select a "Camera Capture" option or user selectable icon presented to the user (e.g., shown on the output device 304 of system 300) as illustrated in FIG. 25A. This interface is exemplary, and could be replaced for example by a shortcut to a camera capture mode, such as a hardware camera button. System 300 can then enter a camera capture mode as shown in FIG. 25B, enabling the user to capture visual data. In the example of FIG. 25B, the at least one processor 301 can infer the intent of the user based on the content visible to the camera and/or at least one environmental context parameter. In the example of FIG. 25B, a location sensor of system 300 could indicate that the user is in a grocery store. Further, the at least one processor 301 could analyze visual data captured by the camera to determine that the user is holding an object in their hand (a can of soda pop 2540 in FIG. 25B) to be the subject of the captured visual data. From this, the at least one processor 301 can infer that the user is considering purchasing the held item, but wants to confirm with another person whether the purchase is appropriate. Based on this inference, the at least one processor 301 can generate a candidate message. In the example FIG. 25B, the at least one processor 301 can do this in a streamlined, visual manner, where emojis 2550 are overlayed on the captured visual data, and the emojis themselves represent the content of the message. In FIG. 25B, this is illustrated by a smiley-face emoji, a question mark, and a disgusted-face emoji, which implies a question of "Is this good or bad?", or "Do you want this?".

Further, the capture process illustrated in FIG. 25B can be carried out in different ways. In a first implementation, the at least one processor 301 can be analyzing visual data from the camera before the user actually selects to capture the visual data. For example, the at least one processor 301 could analyze a video feed from the camera before the user clicks a button to take a photograph. Based on this analysis, the at least one processor 301 could generate the message content shown in FIG. 25B (the emojis 2550 and question mark), and output device 304 could output this content to the user before the user has even clicked to take a photograph. This effectively allows the user to preview the generated message content before capturing an image. After system 300 receives user input to capture an image, the generated content could be automatically added to the image as it was presented to the user, and the at least one processor 301 could generate candidate recipients for the message based on the captured visual data and/or an environmental context parameter of the device, such that the output device 304 can immediately present a recipient selection interface to the user. From the user's perspective, this could result in a smooth flow where they select camera capture, capture visual data which automatically includes the desired content, and then proceed to select a recipient.

In a second implementation, the user can capture visual data, such as by clicking to take a photograph, and the at least one processor 301 can then analyze the captured visual data to generate candidate message content. The message content can then be overlayed on the captured visual data, and presented by output device 304 as a candidate message to the user for confirmation/selection. The system 300 can simultaneously or subsequently present at least one candidate recipient to the user for selection. This second implementation is less smooth and requires more steps from the user, but will advantageously reduce the processing required, and thus will reduce power consumption.

In some implementations, at least one candidate recipient can be presented to the user for selection simultaneously with selection of the candidate message, for more streamlined operation. For example, in the first implementation above, a candidate recipient could be presented to the user in FIG. 25B before the user provides input to capture a photograph. As another example, in the second implementation above, a candidate recipient could be presented to the user simultaneously with the candidate message, such that the user need only make one selection for both the message and the recipient.

Determining at least one candidate recipient in the above implementations of FIGS. 25A-25C can be performed using any of the techniques for determining candidate recipients discussed herein, and can be based on data from any of the sensors for acquiring environmental context parameters described herein. For example, the at least one processor 301 could determine that since the user is at a grocery store and is asking about a product to buy, candidate recipients will likely be people living in the same household as the user, such as the user's family. FIG. 25C illustrates candidate recipients as "Dad", "Husband Bert", and "Daughter Mildred" for example. As another example, the at least one processor 301 could access a calendar of the user, and determine that the user is attending a party later in the evening. Consequently, the at least one processor 301 may identify the host of the party as a candidate recipient.

FIGS. 26A-26C represent a sequence of displays or presentations of user interfaces for generating a message to share, starting from FIG. 26A, proceeding to FIG. 26B, proceeding to FIG. 26C.

In FIGS. 26A-26C, a user decides that they want to capture visual data, so they select a "Camera Capture" option or user selectable icon presented to the user (e.g., shown on the output device 304 of system 300) as illustrated in FIG. 26A. This interface is exemplary, and could be replaced for example by a shortcut to a camera capture mode, such as a hardware camera button. System 300 can then enter a camera capture mode as shown in FIG. 26B, enabling the user to capture visual data.

The user can then perform a gesture in front of the camera of system 300, for conversion to at least one emoji. In the example of FIG. 26B, the user can perform a thumbs-up gesture in front of the camera. The camera can capture visual data of this gesture, and the at least one processor 301 can generate an emoji message based on this gesture.

Generation of the message could be performed in multiple ways. In a first implementation, the at least one processor 301 could analyze the captured image data to match the gesture performed by the user to a database of gestures. In practice, such a database could include a great number of gestures, such as an "OK" gesture, a "thumbs-down" gesture, a "devil-horns" gesture, or many more. The at least one processor 301 could then retrieve an emoji corresponding to the gesture that the user is performing. In a second implementation, the at least one processor 301 could make the emoji from the captured visual data. For example, the at least one processor 301 could recognize the bounds of the user's hand or hands, and render an emoji which only includes the user's hands. This could be achieved by the at least one processor removing data representing parts of the captured visual data which do not represent the user's hands, and/or reducing size of the visual data, and/or reducing the number of colors represented in the visual data. For example, the captured visual data could be cropped to only include the user's hands, and background data could be deleted or replaced with a solid background color. In this way, an emoji can be rendered based on the captured visual data, which only includes a representation of the user hand or hands for simplicity. This option would provide a flexible solution which can generate an emoji-based message even if the gesture performed by the user does not match a gesture in a database.

It is also possible for the above gestures to be dynamic gestures, i.e. gestures which change over time. For example, 'clapping' could be considered a dynamic gesture, where the user claps their hands together. If the at least one processor recognizes such a dynamic gesture, such as by analyzing multiple frames of captured visual data over time, the at least one processor 301 can generate an animated emoji, either retrieving such an emoji from a database, or rendering a new one. Further, a dynamic gesture could also be represented by a static emoji, and does not necessarily require multiple animation frames. For example, for the clapping gesture, an emoji could include a single image of two hands together, with motion lines around the hands which imply that the hands are moving, even if the emoji itself does not contain animation or movement.

Before sending the message, a sample of the emoji 2630 can be presented to the user for confirmation, as illustrated in FIG. 26C. The at least one processor 301 can also determine at least one candidate recipient for the generated message using any of the techniques discussed herein, and any environmental context parameters from any of the sensors discussed herein. The system 300 can receive input from the user indicating a selection of a recipient, and the message can be transmitted by wireless communications module 303 to be received by the desired recipient.

Figure 27:
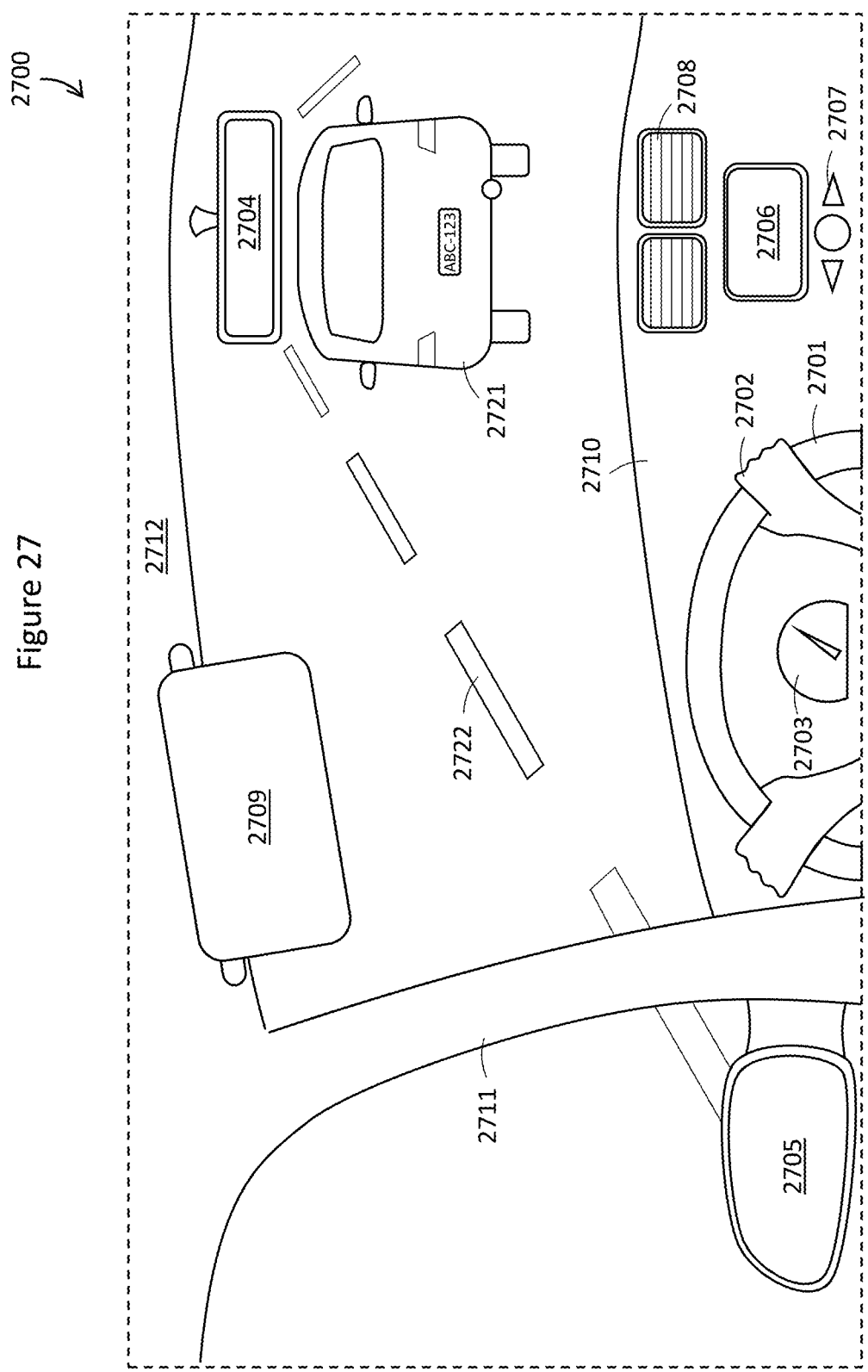
FIGS. 27, 28, and 29 are exemplary scenes as seen from a camera, which can be analyzed to generate messages according to the methods of FIGS. 16 and 17.
Figure 28:
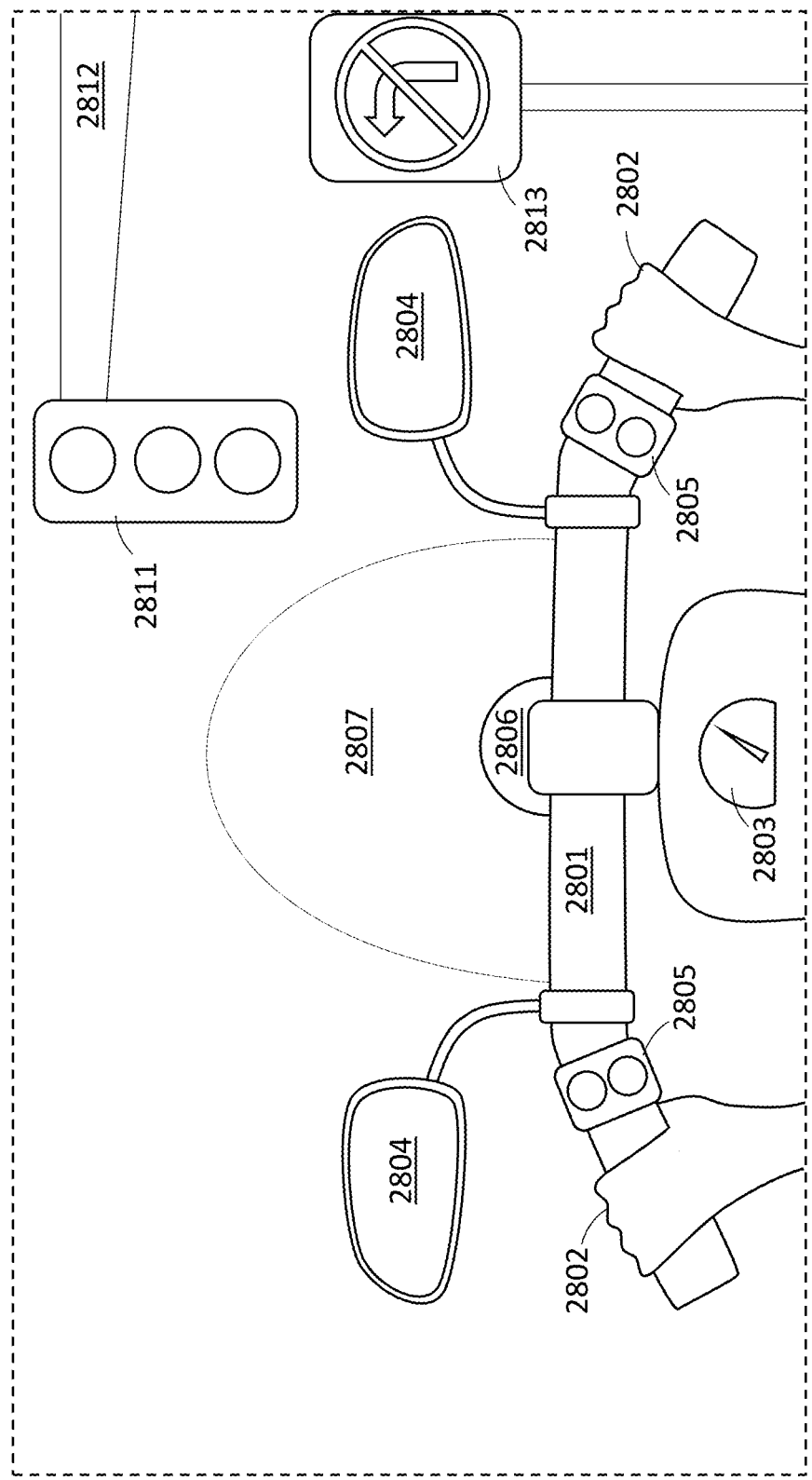
Figure 29:
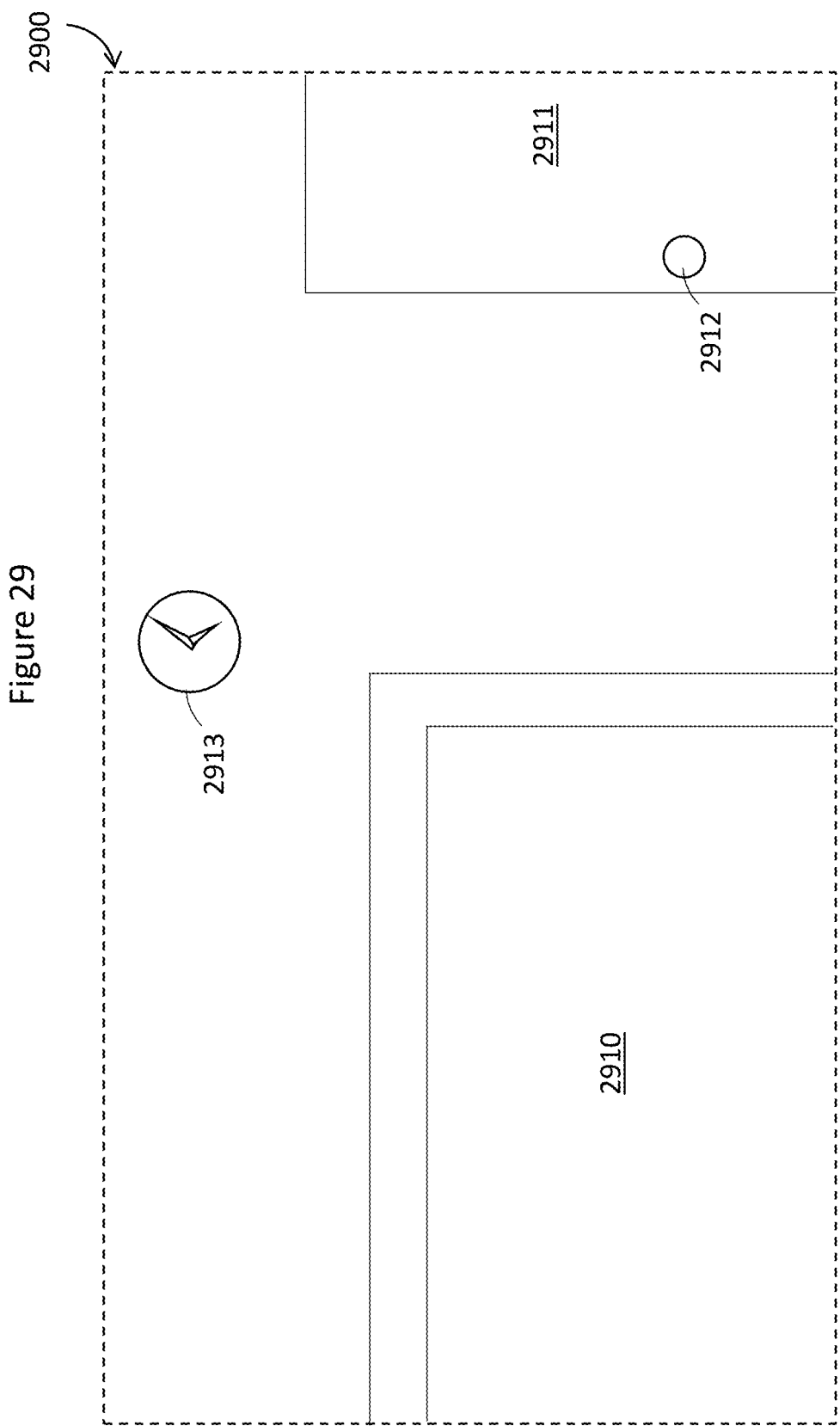

The present systems, device, and methods may also infer an activity of the user based on partial objects viewable within a scene, instead of relying on identification of single whole objects. FIGS. 27, 28, and 29 are exemplary scenes which illustrate this concept.

FIG. 27 illustrates an example scene 2700 as might be captured by a camera included on a WHUD system worn by a user operating a vehicle. The at least one processor 301 included in the WHUD system can analyze visual data captured by the camera to detect vehicle features, vehicle accessories, or vehicle infrastructure represented in the visual data which indicate whether a user is operating a vehicle. For example, the at least one processor could identify equipment and features which can be found in a vehicle, such as a steering wheel 2701 and at least one user hand 2702 thereon, at least one information indicator 2703, rear-view mirror 2704, side-view mirror 2705, display screen 2706, controls 2707, air vents 2708, sun visor 2709, dashboard 2710, frame-pillar 2711, roof 2712, or any other vehicle interior feature as appropriate. Information indicator 2703 could include for example a speedometer, engine RPM gauge, engine temperature gauge, odometer, fuel gauge, status indication lights, warning lights, vehicle information screen, or any other indicator appropriate for a given application. Display screen 2706 could include for example a stereo display, a back-up camera display, a GPS or map display, an entertainment display, or any other display as appropriate. Controls 2707 could include at least one user input interface for providing user control of any features of the vehicle, such as buttons, knobs, switches, levers, touch-sensitive inputs, or any other user interface as appropriate for a given application. The at least one processor 301 may also identify features external to the vehicle which can indicate whether a user of the WHUD system is operating a vehicle, such as at least one other vehicle 2721, at least one road line 2722, or any other appropriate external feature. The at least one other vehicle 2721 could be identified by identifying features of the at least one other vehicle 2721, such as a general vehicular shape of the other vehicle, a license plate, windows, wheels, mirrors, at least one exhaust pipe, and indicator lights, or any other appropriate features. Indicator lights of the other vehicle could include taillights, brake lights, turn signals, back-up lights, headlights, or any other appropriate lights. One skilled in the art will appreciate that the present systems, devices, and methods can utilize identification of the above described features external to the vehicle to determine whether the user is operating a vehicle, regardless of the type of vehicle the user is driving. That is, features external to the vehicle are independent of the vehicle, and thus can be identified to determine whether a user is operating a vehicle in any of the implementations discussed herein.

Further, identified features such as those listed above may not be completely represented in the visual data. As an example, the captured visual data does not include a whole representation of the vehicle which the user is operating. As another example, the captured visual data only partially represents steering wheel 2701. As another example, the captured visual data only represents the user's hands 2702, and does not represent an entire body of the user. Nonetheless, the at least one processor 301 can identify that the user is operating a vehicle based on identification of these partially visible features.

After identification that the user is operating a vehicle, the at least one processor 301 can generate at least one candidate message, optionally based on additional environmental context parameters of the device, using any of the techniques discussed herein, based on data from any of the sensors discussed herein. The at least one processor 301 can also determine at least one candidate recipient using any of the techniques discussed herein, based on data from any of the sensors herein. As an example, if the at least one processor 301 determines that the user is operating a vehicle, and the time is currently within a time range that the user typically goes from a workplace to home, the at least one processor may generate a candidate message like "Heading home", and a candidate recipient of the user's spouse. However, it should be noted that there can be potential safety risks by enabling a user to operate a mobile device while operating a vehicle, especially if such operation is taxing on the user's focus and concentration. This is discussed in more detail in U.S. Provisional Patent Application Ser. No. 62/750,060. In view of this, it may be preferable to make the user interaction to send the above interaction very streamlined and simple, such as by presenting a single option like "Send 'Heading home' in a message to spouse?", which requires only a single click from the user to do. In other implementations, generation and sending of the message could be performed completely autonomously.

Although FIG. 27 shows the present systems, devices, and methods as being utilized in a passenger car, one skilled in the art will appreciate that the present systems, devices, and methods are applicable to any appropriate vehicle, including but not limited to vans, trucks, buses, tractors, scooters, mopeds, motorcycles, airplanes, helicopters, boats, ships, other vessels, bicycles, and unicycles. FIG. 28 illustrates an example scene 2800 as might be captured by a camera included on a WHUD system worn by a user operating a motorcycle. At least one processor 301 included in the WHUD system can analyze visual data captured by the camera to detect features represented in the visual data which indicate whether a user is operating a vehicle. For example, the at least one processor 301 could identify equipment and features which can be found on a motorcycle or similar vehicle, such as handlebars 2801 and at least one user hand 2802 thereon, at least one information indicator 2803, at least one side-view mirror 2804, controls 2805, headlight 2806, windscreen 2807, or any other vehicle feature as appropriate. Information indicator 2803 could include for example a speedometer, engine RPM gauge, engine temperature gauge, odometer, fuel gauge, status indication lights, warning lights, vehicle information screen, or any other indicator appropriate for a given application. Controls 2805 could include at least one user input interface for providing user control of any features of the vehicle, such as buttons, knobs, switches, levers, touch-sensitive inputs, or any other user interface as appropriate for a given application. In addition, the at least one processor may also identify features external to the vehicle which can indicate whether a user of the WHUD system is operating a vehicle, such as those described above with reference to FIG. 27, in addition to traffic light 2811, light post 2812, and road sign 2813. One skilled in the art will appreciate that these additional features external to the vehicle are independent of the vehicle, and thus can be identified to determine whether a user is operating a vehicle in any of the implementations discussed herein.

Similarly to as discussed with reference to FIG. 27 above, the identified features such as those listed above may not be completely represented in the visual data. As an example, the captured visual data does not include a whole representation of the motorcycle which the user is operating. As another example, the captured visual data only partially represents light post 2812. As another example, the captured visual data only represents the user's hands 2802, and does not represent an entire body of the user. Nonetheless, the at least one processor 301 can identify that the user is operating a motorcycle based on identification of partially visible features.

After identification that the user is operating a motorcycle, the at least one processor can generate at least one candidate message, optionally based on additional environmental context parameters of the device, using any of the techniques discussed herein, based on data from any of the sensors discussed herein. The at least one processor 301 can also determine at least one candidate recipient using any of the techniques discussed herein, based on data from any of the sensors herein. Similar messages and recipients could be determined as discussed with reference to FIG. 27 above, but message content and recipient determination could also be based on what vehicle the user is operating. As an example, motorcycles for many people can be a leisure vehicle, such as for driving through the countryside. In such an example, after capturing visual data of a country road, the at least one processor 301 may determine that the user's cloud storage is an appropriate recipient for a message, and may generate message content like a simple time and/or location stamp. Such a process may be performed completely autonomously, so that the user may review their captured visual data after they are finished their ride, thus improving safety.

FIG. 29 is another exemplary scene 2900 as captured by a camera. For example, the camera could be carried by a WHUD worn by a user, such that the view of the camera closely approximates the view seen by the user. Scene 2900 can represent a user's workspace, such as in their office. The at least one processor 301 can determine that the user is currently in their workspace based on analysis of the captured visual data, such as by identifying known features like monitor 2910, door 2911, doorknob 2912 and clock 2913. The user may have previously registered the features of their workspace by performing a camera capture of the area, or system 300 may have built a database of identifiable features autonomously over time since the user is regularly in their workspace. Preferably, autonomous construction of a database of identifiable features would require permission of the user, in the interests of maintaining privacy of the user and privacy of the user's employer. As can be seen in FIG. 29, monitor 2910 and door 2911 are only partially represented in the captured visual data, but even these partial representations can be used by the at least one processor 301 to identify the scene as a whole. Additionally, the at least one processor may also identify the location and activity of the user based on data from environmental context sensors beyond just a camera. For example, the at least one processor 301 may determine that the user is at their place of work based on location data from a location sensor. Further the at least one processor may be able to determine that the user is unfocused on work (e.g. bored), for example by an IMU of system 300 detecting nodding motions of the user's head, or an eye-tracking device of system 300 detecting that the user's eyes are barely open or keep shutting for long periods of time as if falling asleep. The at least one processor could also for example determine based on data from the IMU and/or the eye tracking device that the user's gaze is directed towards clock 2913 as opposed to their monitor 2910.

Based on at least one of the determined location and/or activity of the user, the at least one processor may generate candidate messages like "Bored at work" or "Can't wait to get home and see you!". Further, the at least one processor 301 could also determine at least one candidate recipient based on the determined location, activity, message content, or any other environmental context data. In the above example, the at least one processor 301 could determine that the content of the message is inappropriate for sending to work colleagues, and thus instead determine close friends or family as candidate recipients for the message. As another example, if the user selects a message like "Can't wait to get home and see you!", the at least one processor 301 can determine that the most appropriate candidate recipients for the message are people who live in the same home as the user.

Further, although in the above examples candidate messages are generated then candidate recipients are determined, this order of operations could be changed, such that candidate recipients are determined, then candidate messages are generated. In some implementations, generation of candidate message and determination of candidate recipients can be substantially simultaneous.

As is evident from the above discussion regarding FIGS. 4, 5A, 5B, 6, 7, 8A-8C, 9A, 9B, 10A-10C, 11, 12A-12C, 13, 14A-14D, 15A-15D, 16, 17, 18A-18D, 19A-19D, 20A-20D, 21A-21E, 22A-22D, 23A-23D, 24A-24D, 25A-25C, 26A-26C, 27, 28, and 29, it is within the scope of the present application to reorder, combine, or remove any acts related to generation of candidate messages and candidate recipients, as well as any acts of receiving user input and selection as is appropriate for a specific application.

Figure 8A:
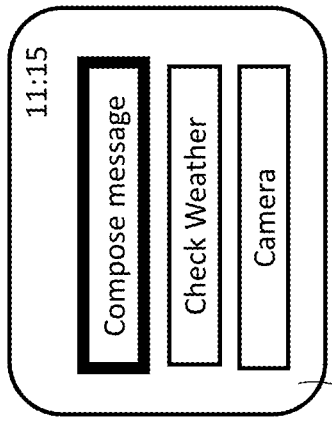
Figure 15A:
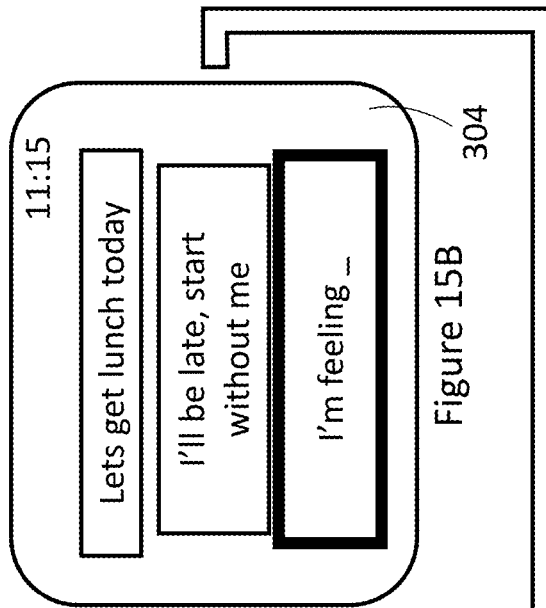
Figure 15B:
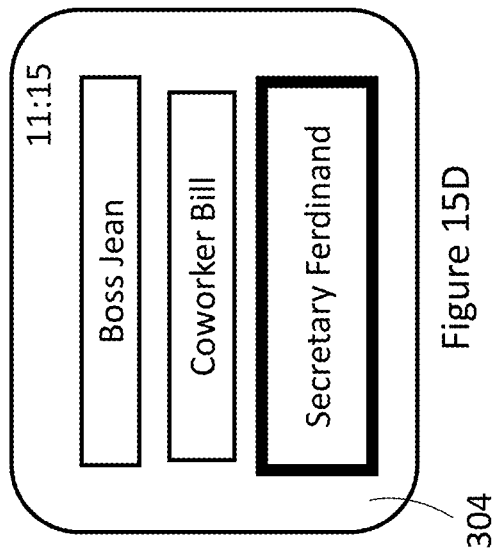
Figure 15C:
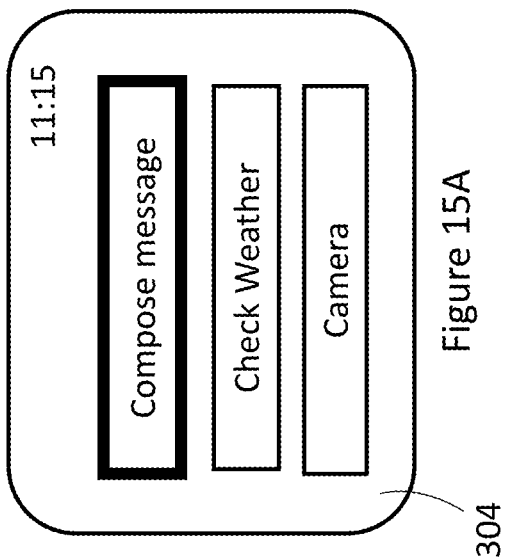
Figure 15D:
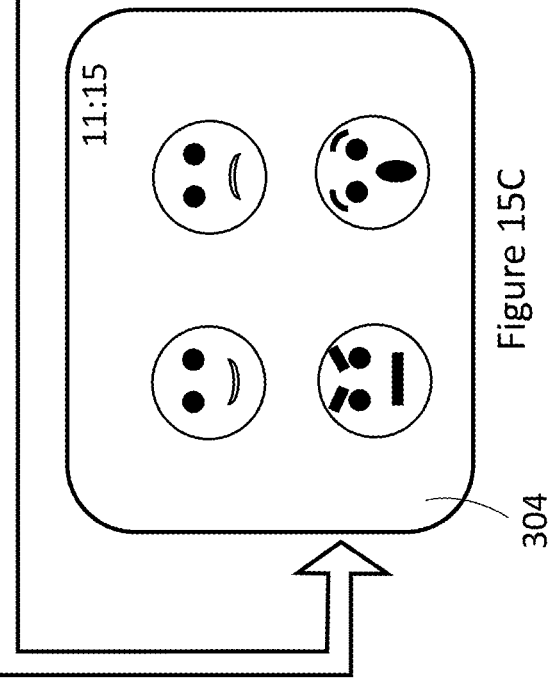

In the above discussed implementations of FIGS. 5A-5B, 8A-8C, 9A-9B, 10A-10C, 12A-12C, 14A-14D, 15A-15D, 18A-18D, 19A-19D, 20A-20D, 21A-21E, 22A-22D, 23A-23D, 24A-24D, 25A-25C, and 26A-26C, the letter-labelled sub-figures represent a sequence of user interfaces which can be presented or displayed to the user, starting from A onwards, however the order of interfaces could be changed as appropriate for a given application. FIG. 5A represents a first user interface presented to a user, and FIG. 5B represents a subsequent second user interface presented to the user subsequent to presentation the first user interface. FIG. 8A represents a first user interface presented to a user, FIG. 8B represents a subsequent second user interface presented to the user after presentation of the first user interface, and FIG. 8C represents a subsequent third user interface presented to the user after presentation of the second user interface. FIG. 9A represents a first user interface presented to a user, and FIG. 9B represents a subsequent second user interface presented to the user after presentation of the first user interface. FIG. 12A represents a first user interface presented to a user, FIG. 12B represents a second subsequent user interface presented to the user after presentation of the first user interface, and FIG. 12C represents a subsequent third user interface presented to the user after presentation of the second user interface. FIG. 14A represents a first user interface presented to a user, FIG. 14B represents a subsequent second user interface presented to the user after presentation of the first user interface, FIG. 14C represents a subsequent third user interface presented to the user after presentation of the second user interface, and FIG. 14D represents a subsequent fourth user interface presented to the user after presentation of the third user interface. FIG. 15A represents a first user interface presented to a user, FIG. 15B represents a subsequent second user interface presented to the user after presentation of the first user interface, FIG. 15C represents a subsequent third user interface presented to the user after presentation of the second user interface, and FIG. 15D represents a subsequent fourth user interface presented to the user after presentation of the third user interface. FIG. 18A represents a first user interface presented to a user, FIG. 18B represents a subsequent second user interface presented to the user after presentation of the first user interface, FIG. 18C represents a subsequent third user interface presented to the user after presentation of the second user interface, and FIG. 18D represents a subsequent fourth user interface presented to the user after presentation of the third user interface. FIG. 19A represents a first user interface presented to a user, FIG. 19B represents a subsequent second user interface presented to the user after presentation of the first user interface, FIG. 19C represents a subsequent third user interface presented to the user after presentation of the second user interface, and FIG. 19D represents a subsequent fourth user interface presented to the user after presentation of the third user interface. FIG. 20A represents a first user interface presented to a user, FIG. 20B represents a subsequent second user interface presented to the user after presentation of the first user interface, FIG. 20C represents a subsequent third user interface presented to the user after presentation of the second user interface, and FIG. 20D represents a subsequent fourth user interface presented to the user after presentation of the third user interface. FIG. 21A represents a first user interface presented to a user, FIG. 21B represents a subsequent second user interface presented to the user after presentation of the first user interface, FIG. 21C represents a subsequent third user interface presented to the user after presentation of the second user interface, FIG. 21D represents a subsequent fourth user interface presented to the user after presentation of the third user interface, and FIG. 21E represents a subsequent fifth user interface presented to the user after presentation of the fourth user interface. FIG. 22A represents a first user interface presented to a user, FIG. 22B represents a subsequent second user interface presented to the user after presentation of the first user interface, FIG. 22C represents a subsequent third user interface presented to the user after presentation of the second user interface, and FIG. 22D represents a subsequent fourth user interface presented to the user after presentation of the third user interface. FIG. 23A represents a first user interface presented to a user, FIG. 23B represents a subsequent second user interface presented to the user after presentation of the first user interface, FIG. 23C represents a subsequent third user interface presented to the user after presentation of the second user interface, and FIG. 23D represents a subsequent fourth user interface presented to the user after presentation of the third user interface. FIG. 24A represents a first user interface presented to a user, FIG. 24B represents a subsequent second user interface presented to the user after presentation of the first user interface, FIG. 24C represents a subsequent third user interface presented to the user after presentation of the second user interface, and FIG. 24D represents a subsequent fourth user interface presented to the user after presentation of the third user interface. FIG. 25A represents a first user interface presented to a user, FIG. 25B represents a subsequent second user interface presented to the user after presentation of the first user interface, and FIG. 25C represents a subsequent third user interface presented to the user after presentation of the second user interface. FIG. 26A represents a first user interface presented to a user, FIG. 26B represents a subsequent second user interface presented to the user after presentation of the first user interface, and FIG. 26C represents a subsequent third user interface presented to the user after presentation of the second user interface.

Further, FIGS. 5A-5B, 8A-8C, 9A-9B, 10A-10C, 12A-12C, 14A-14D, 15A-15D, 18A-18D, 19A-19D, 20A-20D, 21A-21E, 22A-22D, 23A-23D, 24A-24D, 25A-25C, and 26A-26C each show visual interfaces which could be presented to the user; however, any of these interfaces could be replaced by alternative presentation schemes, as appropriate for a given application. As an example, instead of presenting the interfaces in the above figures visually using a display, system 300 could instead present each interface as an audio interface, in which options, candidate messages, candidate recipients, and any other important information is read out to the user as audio.

One skilled in the art will appreciate that each of the described hardware, sensors, and techniques used for identifying an environmental context parameter, and generating messages based on the environmental context, are applicable to all described implementations of the subject systems, devices, and methods. For example, one skilled in the art will recognize that the hardware, sensors, and techniques used for generating candidate messages as described with relation to FIGS. 4, 5A-5B, 6, 7, 8A-8C, 9A-9B, and 10A-10C are fully applicable to the generation of a first portion of a message and at least one second portion to complete the message as described with regards to FIGS. 11, 12A-12C, 13, 14A-14D, and 15A-15D, and are fully applicable to implementations where visual data is captured and used to generate a message as described with regards to FIGS. 16, 17, 18A-18D, 19A-19D, 20A-20D, 21A-21E, 22A-22D, 23A-23D, 24A-24D, 25A-25C, 26A-26C, 27, 28, and 29. Further, one skilled in the art will appreciate that each of the described hardware, sensors, and techniques for determining a recipient to send a message to are fully applicable to all implementations of the subject systems, devices, and methods. For example, the hardware, sensors, and techniques for determining a recipient as described with relation to the method of FIG. 4 are fully applicable to the methods of FIGS. 7, 11, 13, 16, and 17. Similarly, the hardware, sensors, and techniques for determining a recipient as described with relation to the method of FIG. 7 are fully applicable to the methods of FIGS. 4, 11, 13, 16, and 17. Similarly, the hardware, sensors, and techniques for determining a recipient as described with relation to the method of FIG. 11 are fully applicable to the methods of FIGS. 4, 7, 13, 16, and 17. Similarly, the hardware, sensors, and techniques for determining a recipient as described with relation to the method of FIG. 13 are fully applicable to the methods of FIGS. 4, 7, 11, 16, and 17. Similarly, the hardware, sensors, and techniques for determining a recipient as described with relation to the methods of FIGS. 16 and 17 are fully applicable to the methods of FIGS. 4, 7, 11, and 13.

One skilled in the art will appreciate that all of the generated candidate message or all of the determined candidate recipients, when displayed, do not need to be displayed on a single display, but rather the user may be able to scroll or click or otherwise iterate or navigate through multiple user interfaces presenting different candidate messages or different determined candidate recipients. Further still, in any of the above implementations, the user interfaces presented on output device 304 may also include user selectable icons or options to generate different candidate messages or determine different candidate recipients for the message. In this way, if a user is unsatisfied with the currently presented candidate messages or the currently presented candidate recipients, the user may provide input to generate different candidate messages or determine different candidate recipients. Additionally, in implementations where a user selects an icon that corresponds to an action such as "Compose message" to enter the message composition process or mode, the "Compose message" option as displayed on the main user interface presented via a display of system 300 may include a preview of one of the candidate messages or candidate recipients as generated by the at least one processor 301.

Some significant advantages to using messaging schemes like those illustrated in FIGS. 4, 5A-5B, 6, 7, 8A-8C, 9A-9B, 10A-10C, 11, 12A-12C, 13, 14A-14D, 15A-15D, 16, 17, 18A-18D, 19A-19D, 20A-20D, 21A-21E, 22A-22D, 23A-23D, 24A-24D, 25A-25C, 26A-26C, 27, 28, and 29 is speed, ease, and privacy for the user. Specifically, all of the above schemes perform most of the text creation for the user, with the user only being required to select at least one or maybe a small number of options. This enables the user to quickly create and send messages, with minimal time and thought investment, and without requiring the user to use a convoluted or inefficient text input scheme as many portable electronic devices require. Further, these schemes can be implemented without the need for voice commands, thus maintaining the privacy of text-based communication. One skilled in the art would appreciate, however, that the present systems, methods, and devices could employ voice commands if desired, at the expense of privacy. Further, the messaging schemes above advantageously enable the user to send messages largely or completely hands free. For example, the user may only need to click a button on a ring a few times (or even just one time) to send a message, instead of having to pull out a smartphone, open a messaging application, type a message, choose a recipient, and send the message. In some implementations, input can be completely hands-free, such as by receiving a voice command like "send message 1", where message 1 corresponds to a message shown to the user on a display. Such an interface can maintain some privacy of the user, since they are not required to say the content of the message, while also enabling completely hands-free input.

In any of the above discussed implementations, an optional act may be added where a user inputs a theme of a message before the at least one processor 301 generates a message. For example, an output device of system 300 may present to the user a number of different options for message theme generated by the at least one processor 301, and the user may select one of the options before the at least one processor 301 generates candidate messages. As an example, in the above discussed "explore" mode, the output device could present to the user a list of different venue types, such as "restaurants", "art galleries", "theatres", "nature parks", "museums", "concerts", and "festivals". If the user selects "restaurants", the at least one processor 301 may search for restaurants within a one-kilometer radius for the user to select. If the user selects "art galleries", the at least one processor 301 may search for art galleries within a 20-kilometer radius of the user. As another example, in the implementations of FIGS. 11 and 12, the output device could present a number of message themes like "Work", "Home", "Kids", or any other appropriate theme. In response to a user selection of a theme, the at least one processor 301 can generate candidate messages which are highly relevant to the selected theme. Further, the options for message themes may be a text strings stating themes, or may be images representing themes such as emojis, emoticons, photographs, computer generated renderings, or any other type of image as appropriate for a specific application.

In any of the above discussed implementations, an option can be available to the user to view more candidate messages and/or more candidate recipients. For example, all of the generated candidate messages may not fit on a single page of the display, and the user may be provide the option to scroll through a list or set of all of the potential candidate messages. As an example, if the at least one processor 301 generates ten candidate messages, but the display can only show three candidate messages at a time in a vertical list, the user could provide a "down" directional input (e.g., select down arrow icon, swipe up) to move through candidate messages in the list. Once the user reaches the bottom of the displayed candidate messages (in this case, the third message), the user may continue to provide a "down" direction input (e.g., select down arrow icon again, continue to swipe up) to switch to another page of three different candidate messages. As another example, if the display can only display three candidate messages in a vertical list, the user could provide a "right" or "left" input to switch to other pages showing different candidate messages.

Further, an option may be provided to generate new candidate messages, for example, if the user is unsatisfied with all of the already generated candidate messages. For example, the display may display a "Generate more" user selectable icon, which the user can select and/or click on to cause generation or a presentation of additional candidate messages. Alternatively, the system may be receptive to a voice command from the user such as "Generate more". In response to a user instruction to generate more candidate messages, the at least one processor 301 may log the previously generated messages, and repeat the generation processes, excluding the options that were already generated. Further, the at least one processor 301 may also analyze trends among the rejected messages to improve the relevance of the candidate messages generated in the second round. As an example, if the at least one processor 301 generates a first round of candidate messages which are all related to the user's professional life, and the at least one processor 301 receives an input indicating that the user wants different candidate messages, the at least one processor 301 may change the theme for generation and generate candidate messages pertaining to the user's personal life.

In the present systems, devices and methods, most of the acts can be performed autonomously, without the need for user input, unless explicitly specified otherwise. For example, in method 700, the at least one processor can autonomously perform acts 701, 702, and 705; the output device can autonomously perform acts 703 and 706; and the wireless communications module can autonomously perform act 708. Regarding acts 704 and 707, input from the user is required, but reception and handling of this input is performed autonomously by the at least one processor. This discussion also applies to the implementations shown in FIGS. 4, 11, 13, 16, and 17, such that the hardware which performs each act can perform the respective act autonomously.

Many of the figures and descriptions herein pair a candidate recipient with the relationship between the recipient and the user. For example, recipients "Husband Bert", "Boss Jean", "Coworker Bill", "Secretary Ferdinand", "Dad", "Uncle George", "Aunt Tina", and "Daughter Mildred" all include a specification of the relationship between the user and the recipient, to make the description more clear. However, such a relationship does not necessarily need to be included in the presentation of the recipient as a candidate recipient. For example, "Boss Jean" could instead be presented as "Jean Willow", which is Boss Jean's first and last name. Data regarding the relationship between a candidate recipient and the user can be stored as meta-data for the recipient. Such metadata could be input by the user, or could be inferred by the at least one processor 301 over time. Further, in some implementations the relationship between a candidate recipient and the user does not need to be explicitly specified.

Throughout this specification and the appended claims the term "communicative" as in "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the systems and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable storage medium for use by or in connection with any processor-related system or method. In the context of this disclosure, a memory is a processor-readable storage medium that is an electronic, magnetic, optical, or other physical device or means that contains or stores a computer and/or processor program. Logic and/or the information can be embodied in any processor-readable storage medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable storage medium" can be any element that can store the program associated with logic and/or information for use by or in connection with the instruction execution system, apparatus, and/or device. The processor-readable storage medium can be, for example, but is not limited to, an electronic, magnetic, optical, electromagnetic, infrared, or semiconductor system, apparatus or device. More specific examples (a non-exhaustive list) of the processor-readable storage medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the following are incorporated herein by reference in their entirety: U.S. Provisional patent application Ser. No. 62/692,484, U.S. Non-Provisional patent application Ser. No. 15/145,576, U.S. Non-Provisional patent application Ser. No. 15/167,458, U.S. Non-Provisional patent application Ser. No. 15/046,254, U.S. Provisional Patent Application Ser. No. 62/607,816, U.S. Provisional Patent Application Ser. No. 62/607,819, U.S. Provisional Patent Application Ser. No. 62/671,248, U.S. Non-Provisional patent application Ser. No. 14/520,081, U.S. Non-Provisional patent application Ser. No. 14/567,826, U.S. Non-Provisional patent application Ser. No. 14/737,081, U.S. Non-Provisional patent application Ser. No. 15/167,458, U.S. Non-Provisional patent application Ser. No. 15/827,667, U.S. Provisional Patent Application Ser. No. 62/658,436, and U.S. Provisional Patent Application Ser. No. 62/750,060. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first system which initiates a communication between the first system and a second system, the first system comprising:
   at least one processor;
   a camera communicatively coupled to the at least one processor;
   an output device communicatively coupled to the at least one processor;
   a wireless communications module communicatively coupled to the at least one processor; and
   a non-transitory processor-readable storage medium communicatively coupled to the at least one processor;
   wherein the non-transitory processor-readable storage medium stores processor-executable instructions that, when executed by the at least one processor, cause the first system to:
      identify, by the at least one processor, a first environmental context parameter indicative of a user's surroundings or activity based on identification of partial objects viewable in one or more images captured by the camera;
      generate, by the at least one processor, at least two candidate messages based on the first environmental context parameter;
      cause a presentation, by the output device, of the at least two candidate messages;
      receive, by the at least one processor, a first input from a user of the first system, the first input indicative of a selected message from the at least two candidate messages;
      after the at least one processor receives the first input indicative of the selected message, determine, by the at least one processor, at least one candidate recipient for the selected message based on at least one of a content of the selected message and the first environmental context parameter;
      cause a presentation, by the output device, of the at least one candidate recipient for the selected message;
      receive, by the at least one processor, a second input from the user of the first system, the second input indicative of a selected recipient from the at least one candidate recipient;
      determine, by the at least one processor, a communication vernacular based on a communication history between the user of the first system and the selected recipient;
      modify, by the at least one processor, the selected message based on the selected recipient and the communication vernacular; and
      cause a transmission, by the wireless communications module, of the modified selected message to the selected recipient.

2. The first system of claim 1, further comprising:
   a wearable heads-up display ("WHUD") which comprises the at least one processor, a display communicatively coupled to the at least one processor, a first wireless communications module communicatively coupled to the at least one processor, and the non-transitory processor-readable storage medium communicatively coupled to the at least one processor; and
   a peripheral device comprising a second wireless communications module;
   wherein the processor-executable instructions that, when executed by the at least one processor, cause the first system to transmit, by the wireless communications module, the modified selected message, cause the first system to:
      transmit, by the first wireless communications module of the WHUD, the modified selected message;
      receive, by the second wireless communications module of the peripheral device, the modified selected message; and
      transmit, by the second wireless communications module of the peripheral device, the modified selected message.

3. The first system of claim 1 wherein:
   the processor-executable instructions that, when executed by the at least one processor, cause the first system to identify, by the at least one processor, a first environmental context parameter cause the at least one processor to analyze images of the user's surroundings captured by the camera to detect features indicative of the user's activity, and wherein the at least two candidate messages are based on the user's activity.

4. The first system of claim 1, further comprising a clock communicatively coupled to the at least one processor, wherein:
   the processor-executable instructions that, when executed by the at least one processor, cause the first system to identify, by the at least one processor, a first environmental context parameter cause the at least one processor to identify a second environmental context parameter comprising at least one of a time of day or a date based on an output of the clock; and
   the processor-executable instructions that, when executed by the at least one processor, cause the first system to generate, by the at least one processor, at least two candidate messages cause the at least one processor to generate at least one greeting appropriate for the at least one of the time of day or the date.

5. The first system of claim 1, further comprising a clock communicatively coupled to the at least one processor, wherein:
   the processor-executable instructions that, when executed by the at least one processor, cause the first system to identify, by the at least one processor, a first environmental context parameter cause the at least one processor to identify a second environmental context parameter comprising a time of day and a date based on an output of the clock and identify at least one relevant calendar entry in a calendar based on the time of day and the date; and the processor-executable instructions that, when executed by the at least one processor, cause the first system to generate, by the at least one processor, at least two candidate messages cause the at least one processor to generate at least two candidate messages based on the at least one relevant calendar entry.

6. The first system of claim 1 wherein:

the processor-executable instructions that, when executed by the at least one processor, cause the first system to identify, by the at least one processor, a first environmental context parameter cause the at least one processor to identify a second environmental context parameter comprising an activity performed by the user of the first system based on input sensor data received from a sensing device; and the processor-executable instructions that, when executed by the at least one processor, cause the first system to generate, by the at least one processor, at least two candidate messages cause the at least one processor to generate at least two candidate messages based on the activity performed by the user of the first system.

7. The first system of claim 6 wherein the sensing device includes at least one input sensor communicatively coupled to the at least one processor, and the at least one input sensor includes at least one sensor selected from a group consisting of: an electromyography sensor, a mechanomyography sensor, an accelerometer, a gyroscope, an electrocardiography sensor, a photoplethysmography sensor, a blood pressure sensor, a global positioning system sensor, a compass, and an eye tracking sensor.

8. The first system of claim 1, further comprising a location sensor communicatively coupled to the at least one processor, wherein:

the processor-executable instructions that, when executed by the at least one processor, cause the first system to identify, by the at least one processor, a first environmental context parameter cause the at least one processor to identify a second environmental context parameter comprising a location of the first system based on an output of the location sensor; and the processor-executable instructions that, when executed by the at least one processor, cause the first system to generate, by the at least one processor, at least two candidate messages cause the at least one processor to generate at least two candidate messages based on the location of the first system.

9. The first system of claim 1, further comprising at least one physical environment sensor communicatively coupled to the at least one processor, wherein:

the processor-executable instructions that, when executed by the at least one processor, cause the first system to identify, by the at least one processor, a first environmental context parameter cause the at least one processor to identify a second environmental context parameter comprising at least a physical environment of the first system based on an output of the physical environment sensor; and the processor-executable instructions that, when executed by the at least one processor, cause the first system to generate, by the at least one processor, at least two candidate messages cause the at least one processor to generate at least two candidate messages based on the physical environment of the first system.

10. The first system of claim 9 wherein the at least one physical environment sensor includes a microphone.

11. The first system of claim 1 wherein the processor-executable instructions, when executed by the at least one processor, cause the first system to:

determine, by the at least one processor, the at least one candidate recipient for the selected message based on at least content of the selected message.

12. The first system of claim 1 wherein the non-transitory processor-readable storage medium stores further processor-executable instructions that, when executed by the at least one processor, cause the first system to determine, by the at least one processor, a relationship between the user of the first system and the selected recipient, wherein the processor-executable instructions that, when executed by the at least one processor, cause the first system to generate, by the at least one processor, at least two candidate messages cause the at least one processor to generate at least two candidate messages based on the determined relationship.

13. The first system of claim 1 wherein:

the non-transitory processor-readable storage medium stores further processor-executable instructions that, when executed by the at least one processor, cause the first system to generate, by the at least one processor, a first portion of a message;

the processor-executable instructions which cause the first system to generate, by the at least one processor, at least two candidate messages cause the at least one processor to generate at least two candidate second portions to complete the message based on at least the first portion of the message;

the processor-executable instructions which cause the first system to receive, by the at least one processor, a first input from a user of the first system cause the at least one processor to receive a first input from a user of the first system indicative of a selected second portion from the at least two candidate second portions; and the non-transitory processor-readable storage medium stores further processor-executable instructions that, when executed by the at least one processor, cause the first system to generate, by the at least one processor, a complete message by combining the first portion and the selected second portion.

* * * * *